(12) United States Patent
Ophardt et al.

(10) Patent No.: US 11,545,011 B2
(45) Date of Patent: Jan. 3, 2023

(54) FLUID PUMP WITH WHISTLE

(71) Applicant: OP-Hygiene IP GmbH, Niederbipp (CH)

(72) Inventors: Heiner Ophardt, Arisdorf (CH); Andrew Jones, St. Anns (CA)

(73) Assignee: OP-Hygience IP GmbH, Niederbipp (CH)

( * ) Notice: Subject to any disclaimer, the term of this patent is extended or adjusted under 35 U.S.C. 154(b) by 945 days.

(21) Appl. No.: 16/373,899

(22) Filed: Apr. 3, 2019

(65) Prior Publication Data
US 2019/0311587 A1 Oct. 10, 2019

(30) Foreign Application Priority Data
Apr. 4, 2018 (CA) ................. CA 3000244

(51) Int. Cl.
| | |
|---|---|
| *G08B 3/06* | (2006.01) |
| *F04B 19/00* | (2006.01) |
| *B05B 11/00* | (2006.01) |
| *A47K 5/12* | (2006.01) |
| *A47K 5/14* | (2006.01) |
| *G01F 13/00* | (2006.01) |

(Continued)

(52) U.S. Cl.
CPC .............. *G08B 3/06* (2013.01); *A47K 5/1207* (2013.01); *A47K 5/1217* (2013.01); *A47K 5/14* (2013.01); *B05B 1/002* (2018.08); *B05B 11/0059* (2013.01); *B05B 11/3001* (2013.01); *B05B 11/3087* (2013.01); *F04B 19/00* (2013.01); *G01F 11/021* (2013.01); *B05B 11/308* (2013.01); *F04B 23/02* (2013.01); *F04B 2201/0202* (2013.01); *F04B 2201/0206* (2013.01); *G01F 13/00* (2013.01)

(58) Field of Classification Search
CPC ...... G08B 3/06; A47K 5/1207; A47K 5/1217; A47K 5/14; B05B 11/3087; F04B 19/00; G01F 13/00
See application file for complete search history.

(56) References Cited

U.S. PATENT DOCUMENTS

| 110,547 A | * | 12/1870 | Capron | ................... G08B 3/06 116/2 |
| 2,199,404 A | * | 5/1940 | House | ..................... G08B 3/06 181/125 |

(Continued)

FOREIGN PATENT DOCUMENTS

| CA | 2790366 | 9/2013 |
| EP | 0112035 | 6/1984 |

*Primary Examiner* — Jeremy Carroll
(74) *Attorney, Agent, or Firm* — Thorpe North & Western, LLP; Peter M. de Jonge; Kurt Hendricks

(57) ABSTRACT

A fluid dispenser with a fluid pump for dispensing fluid on movement of an actuator, and an air pump for delivering a stream of air through at least one sound generator on movement of the actuator. The sound generator produces at least two sounds as the actuator is moved from a first position to a second position, with each sound produced in a different time period during a cycle of operation, or differing from the other sound in respect of one or more detectable sound characteristics, such as duration, frequency, temporal alignment, amplitude, and/or timbre. The time period of each sound is a function of the relative location of the actuator between the first and second positions.

20 Claims, 61 Drawing Sheets

(51) Int. Cl.
*G01F 11/02* (2006.01)
*B05B 1/00* (2006.01)
*F04B 23/02* (2006.01)

(56) References Cited

U.S. PATENT DOCUMENTS

| | | | |
|---|---|---|---|
| 4,674,654 | A | 6/1987 | Fujii et al. |
| 5,373,970 | A | 12/1994 | Ophardt |
| 5,836,482 | A | 11/1998 | Ophardt et al. |
| 6,065,639 | A * | 5/2000 | Maddox ............... A47K 5/1202 |
| | | | 222/638 |
| 7,267,251 | B2 | 9/2007 | Ophardt |
| 7,984,825 | B2 | 7/2011 | Ophardt et al. |
| 8,113,388 | B2 | 2/2012 | Ophardt et al. |
| 8,684,236 | B2 | 4/2014 | Ophardt |
| 8,816,860 | B2 | 8/2014 | Ophardt et al. |
| 8,976,031 | B2 | 3/2015 | Ophardt |
| 10,709,300 | B2 | 7/2020 | Mahaffey et al. |
| 2006/0249530 | A1* | 11/2006 | Ho ......................... A63H 23/10 |
| | | | 222/39 |
| 2009/0261123 | A1 | 10/2009 | McNiff |
| 2012/0212344 | A1 | 8/2012 | Forsberg et al. |
| 2015/0190827 | A1 | 7/2015 | Ophardt et al. |
| 2016/0097386 | A1 | 4/2016 | Ophardt et al. |
| 2016/0256015 | A1 | 9/2016 | Ophardt et al. |
| 2018/0080807 | A1* | 3/2018 | Singh ................... A47K 5/1217 |

* cited by examiner

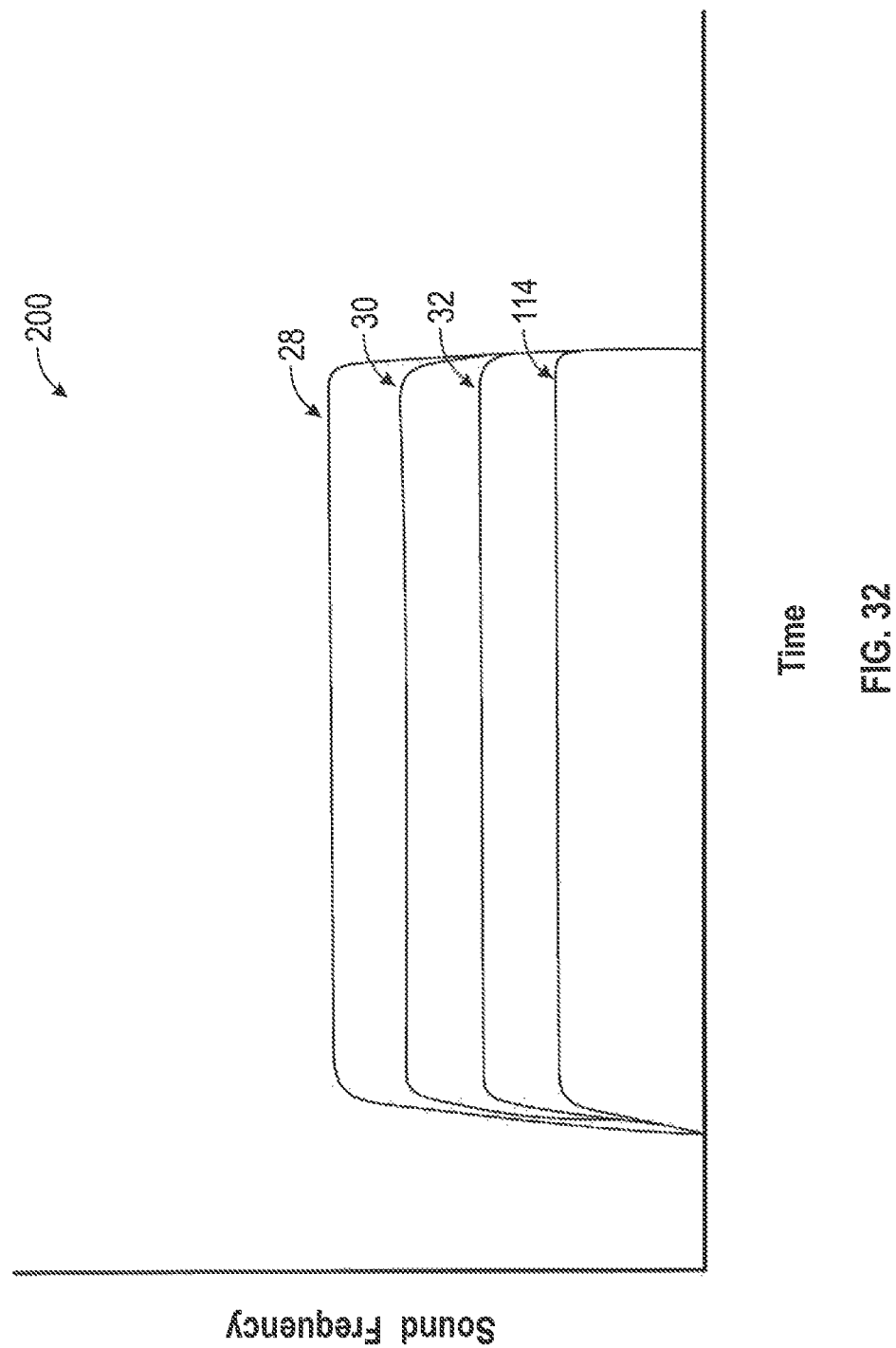

FLUID PUMP WITH WHISTLE

FIELD OF THE INVENTION

This invention relates to dispensers, and more particularly to hand cleaning fluid dispensers that generate sounds for the purpose of compliance monitoring.

BACKGROUND OF THE INVENTION

The present inventors have appreciated that proper compliance monitoring of hand washing requires monitoring of all hand cleaning dispensers within any particular facility or environment to be monitored, including dispensers that are not connected to a power source. To at least partially overcome the disadvantages of previously known devices, the inventors previously disclosed in U.S. Pat. No. 8,816,860 to Ophardt et al., which is hereby incorporated by reference, a fluid dispenser having a sound generator that generates a sound when the dispenser is activated. The sound is then sensed by a sound sensor, and data representative of the sensed sound is transmitted to a computer for compliance monitoring.

SUMMARY OF THE INVENTION

The present invention is an improvement over the fluid dispenser and compliance monitoring system as disclosed in U.S. Pat. No. 8,816,860. The improvements include providing at least two sounds in a cycle of operation by providing pressurized air to the same sound generator in temporally separated blasts and/or by providing two or more sound generators each to receive pressurized air in a cycle of operation. Further improvements include enhancing the operation of one or more sound generators by providing pressure stabilizing components towards preventing air pressures in an air pump chamber from exceeding a maximum pressure, as by providing a pressure relief valve and/or to reduce air pressures in an air pump chamber when a threshold pressure is reached, as by providing an air accommodating bellows open to the air chamber and/or to controlling air pressure delivered to a sound generator by providing a pressure opening valve upstream of the sound generator which prevents air from passing to the sound generator unless the air pressure exceeds a threshold pressure. The inventors have appreciated that having a fluid dispenser which produces at least two sounds when activated permits the sounds to be more readily identified and distinguished from other environmental sounds. This is useful for improving the accuracy of the compliance monitoring data. Producing at least two sounds also creates a richer sound profile, which can be used in at least some embodiments of the invention to calculate the dosage of fluid that was dispensed, and the distance and speed of movement of the actuator. This is useful for improving the detail and comprehensiveness of the compliance monitoring data, and may be useful for other purposes as well.

The inventors have furthermore appreciated that the at least two sounds can be usefully generated, without requiring an electric power source, by providing an air pump that delivers a first stream of air through the sound generator during a first time period and delivers a second stream of air through the sound generator during a second time period, each time period being a function of the relative location of an actuator between a first position and a second position. Optionally, the sound generator may be provided in the form of an air whistle, with the actuator configured to force compressed air through the air whistle to produce the at least two sounds during movement from the first position to the second position. The air pump may incorporate a sealable air passage that allows the compressed air to discharge directly from the air pump when the passage is open, thus bypassing the air whistle. The air pump may furthermore be configured to seal the air passage during both the first time period and the second time period, and to unseal the air passage during a first intermediate time period between the first time period and the second time period. The discharge of compressed air through the unsealed air passage reduces or eliminates the air flow through the air whistle during the first intermediate time period, resulting in distinct first and second sounds being produced by the air whistle during the first and second time periods, respectively, with little or no sound being produced in between.

The invention also provides fluid dispensers that incorporate multiple sound generators to produce multiple sounds during movement of the actuator. The sounds differ from each other in detectable ways, such as by having a different duration, frequency, temporal alignment, amplitude, and/or timbre. This results in the fluid dispensers producing unique sound profiles that can be used for compliance monitoring, for uniquely identifying different fluid dispensers within a facility, and for collecting additional information about the operation and use patterns of those dispensers.

The invention furthermore provides dispensers that incorporate pressure stabilizing components that maintain air pressures within air chambers and/or sound generators of the dispensers within a preferred range, so as to moderate fluctuations in the sound profiles that are produced. This helps to ensure that the sound profiles can be recognized by a computer, such as for compliance monitoring, even when components of the dispenser, such as the actuator, are moved differently, for example when operated at a wide variety of different speeds.

In some embodiments, the fluid dispensers of the present invention are configured to generate foam as well as sounds when activated. The inventors have appreciated that a single air chamber can be used for both of these purposes, with the air entering the chamber being used to generate one or more sounds, and the air exiting the chamber being used to generate foam. In other embodiments, the air exiting the air chamber can be used to generate sounds and to generate foam. The fluid dispensers can also incorporate multiple air chambers, with the air from some chambers being used to generate sounds and the air from other chambers being used to generate foam.

In still other embodiments, the invention provides dispensers that include one or more sound generators permanently installed within a housing of the dispenser, the housing being configured to receive a replaceable fluid pump and reservoir. One or more additional sound generators may be incorporated into the replaceable fluid pump. The inventors have appreciated that this arrangement of sound generators permits additional information to be collected from the resulting sound profile, including the kind or identity of the dispenser being activated, the kind or identity of the replaceable fluid pump that is installed in the housing, and whether or not an unauthorized fluid pump has been installed.

Accordingly, in one aspect the present invention resides in a fluid dispenser comprising:

a fluid pump for drawing fluid from a reservoir and dispensing the fluid on movement of an actuator in a cycle of operation;

a sound generator mechanism which generates two sounds on movement of the actuator in the cycle of operation, the sound generator mechanism being configured to produce each sound from a respective one of two streams of air passing through the sound generator mechanism; and an air pump mechanism for delivering the two streams of air through the sound generator mechanism on movement of the actuator in the cycle of operation.

In some embodiments, in the cycle of operation to dispense a dose of the fluid, the actuator is moved between a first position and a second position; and the sound generator mechanism produces the two sounds as the actuator is moved from the first position to the second position, with each sound produced in a different time period during the cycle of operation than the other sound, the time period of each sound in the cycle of operation being a function of the relative location of the actuator between the first position and the second position.

In some preferred embodiments, the air pump mechanism delivers one of the streams of air through the sound generator mechanism as a first air stream during a first time period when the actuator moves between the first position and a first intermediate position between the first position and the second position; and the air pump mechanism delivers one of the streams of air through the sound generator mechanism as a second air stream during a second time period different than the first time period when the actuator moves between the first intermediate position and a second intermediate position between the first intermediate position and the second position.

The air pump mechanism may optionally comprise:

an air chamber forming body in fluid communication with the sound generator mechanism;

an air passage for carrying air between the air chamber forming body and an air source; and a sealing body configured to seal the air passage during the first time period and during the second time period, and to unseal the air passage during a first intermediate time period between the first time period and the second time period.

In some embodiments, the actuator is configured to reduce a volume of air contained within the air chamber forming body during movement from the first position to the second position, forcing at least some of the air to discharge from the air chamber forming body;

wherein:

during the first time period the air is discharged through the sound generator mechanism as the first air stream;

during the first intermediate time period at least some of the air is discharged through the unsealed air passage, thereby reducing or eliminating air flow through the sound generator mechanism; and during the second time period the air is discharged through the sound generator mechanism as the second air stream.

Optionally, the sound generator mechanism may produce a first sound during the first time period, produce little or no sound during the first intermediate time period, and produce a second sound during the second time period.

In some embodiments, the actuator may comprise a piston body, wherein movement of the actuator from the first position to the second position comprises an instroke movement of the piston body within the air chamber forming body, thereby pressurizing the air contained within the air chamber forming body and forcing at least some of the air to discharge from the air chamber forming body.

The air passage is optionally defined between the piston body and the air chamber forming body;

wherein the air chamber forming body comprises a sealing zone and an unsealing zone;

wherein the piston body is configured to sealingly engage with the air chamber forming body when positioned within the sealing zone, thereby sealing the air passage; and wherein the piston body is configured to at least partially disengage from the air chamber forming body when positioned within the unsealing zone, thereby unsealing the air passage.

In some embodiments, the air chamber forming body comprises a cylindrical outer wall, the outer wall having a first diameter in the sealing zone and a second diameter in the unsealing zone, the second diameter being larger than the first diameter;

wherein the piston body comprises an outer edge that is configured to sealingly engage with the air chamber forming body when positioned within the sealing zone, and to at least partially disengage from the air chamber forming body when positioned within the unsealing zone.

The sealing zone may optionally comprise a first sealing area and a second sealing area, and wherein the unsealing zone comprises a first unsealing area;

wherein the instroke movement of the piston body comprises:

a first segment of movement in which the outer edge of the piston body moves along and sealingly engages with the first sealing area of the air chamber forming body, thereby compressing the air contained within the air chamber forming body and forcing the first air stream through the sound generator mechanism;

a second segment of movement in which the outer edge of the piston body moves past the first unsealing area of the air chamber forming body, thereby unsealing the air passage and allowing the air contained within the air chamber forming body to discharge through the air passage, reducing or eliminating the air flow through the sound generator mechanism; and a third segment of movement in which the outer edge of the piston body moves along and sealingly engages with the second sealing area of the air chamber forming body, thereby compressing the air contained within the air chamber forming body and forcing the second air stream through the sound generator mechanism.

The sealing zone may further comprise a third sealing area, and wherein the unsealing zone further comprises a second unsealing area;

wherein the instroke movement of the piston body further comprises:

a fourth segment of movement in which the outer edge of the piston body moves past the second unsealing area of the air chamber forming body, thereby unsealing the air passage and allowing the air contained within the air chamber forming body to discharge through the air passage, reducing or eliminating the air flow through the sound generator mechanism; and a fifth segment of movement in which the outer edge of the piston body moves along and sealingly engages with the third sealing area of the air chamber forming body, thereby compressing the air contained within the air chamber forming body and forcing a third air stream through the sound generator, causing the sound generator mechanism to produce a third sound.

Optionally, the sound generator mechanism comprises an air whistle.

In some embodiments, the fluid dispenser is a manually operated dispenser in which the actuator is moved by a user to dispense fluid, and the fluid is a hand cleaning fluid.

In another aspect, the present invention resides in a system for monitoring activation of a fluid dispenser, comprising:

the aforementioned fluid dispenser; and a sound sensing mechanism spaced from the fluid dispenser, comprising:

a sound sensor to sense the two sounds produced by the sound generator mechanism; and a communication mechanism to transmit data representative of the sounds sensed by the sound sensor to a remote computer.

In some embodiments, the computer may be configured to calculate a volume of the fluid dispensed from the fluid dispenser based on a sound profile of the two sounds; to identify the fluid dispenser based on a sound profile of the two sounds; to distinguish the two sounds from other sounds based on a sound profile of the two sounds; to calculate a movement speed of the actuator based on a sound profile of the two sounds; or to calculate a movement distance of the actuator based on a sound profile of the two sounds.

In another aspect, the present invention resides in a fluid dispenser comprising:

a fluid pump for dispensing fluid on movement of an actuator activated by a user;

a first sound generator which generates a first sound when the fluid dispenser is activated by the user, the first sound generator being configured to produce the first sound from a first stream of air passing through the first sound generator;

a second sound generator which generates a second sound when the fluid dispenser is activated by the user, the second sound generator being configured to produce the second sound from a second stream of air passing through the second sound generator; and at least one air pump for passing the first stream of air through the first sound generator and the second stream of air through the second sound generator on movement of the actuator;

wherein in a cycle of operation to dispense a dose of the fluid, the actuator is moved between a first position and a second position; and wherein the first sound generator produces the first sound as the actuator is moved from the first position to the second position, and the second sound generator produces the second sound as the actuator is moved from the first position to the second position.

Preferably, the first sound differs from the second sound in respect of at least one detectable sound characteristic. The at least one detectable sound characteristic may comprise, for example, at least one of: duration, frequency, temporal alignment, amplitude, and timbre.

Optionally, the first sound generator produces the first sound during a first time period and the second sound generator produces the second sound during a second time period, the first time period being different than the second time period, the time period of each sound in the cycle of operation being a function of the relative location of the actuator between the first position and the second position.

In some embodiments, the at least one air pump delivers the first stream of air through the first sound generator during the first time period when the actuator moves from a first sound start position to a first sound end position; and the at least one air pump delivers the second stream of air through the second sound generator during the second time period when the actuator moves from a second sound start position to a second sound end position.

The first sound start position may, for example, be the first position, and the first sound end position may, for example, be the second position. The second sound start position may, for example, be between the first position and the second position, and the second sound end position may, for example, be the second position.

In some embodiments, the at least one air pump comprises:

a first air chamber forming body in fluid communication with the first sound generator;

a second air chamber forming body in fluid communication with the second sound generator;

an air passage for carrying air between the second air chamber forming body and an air source; and a sealing body configured to seal the air passage during the second time period.

The sealing body may be configured to unseal the air passage during an intermediate time period in which the actuator moves from the first sound start position to the second sound start position.

In some embodiments, the actuator is configured to reduce a volume of air contained within the first air chamber forming body during movement from the first position to the second position, forcing at least some of the air to discharge from the first air chamber forming body through the first sound generator as the first stream of air;

wherein the actuator is also configured to reduce a volume of air contained within the second air chamber forming body during movement from the first position to the second position, forcing at least some of the air to discharge from the second air chamber forming body;

wherein during the second time period the air is discharged from the second air chamber forming body through the second sound generator as the second air stream; and wherein during the intermediate time period at least some of the air is discharged from the second air chamber forming body through the air passage, thereby reducing or eliminating air flow through the second sound generator and causing the second sound generator to produce little or no sound during the intermediate time period.

The actuator may, for example, comprise a piston body, wherein movement of the actuator from the first position to the second position comprises an instroke movement of the piston body within the first air chamber forming body and the second air chamber forming body, thereby pressurizing the air contained within the first air chamber forming body and the second air chamber forming body and forcing at least some of the air to discharge from the first air chamber forming body and the second air chamber forming body.

The air passage may, for example, be defined between the piston body and the second air chamber forming body;

wherein the second air chamber forming body comprises a sealing zone and an unsealing zone;

wherein the piston body is configured to sealingly engage with the second air chamber forming body when positioned within the sealing zone, thereby sealing the air passage; and wherein the piston body is configured to at least partially disengage from the second air chamber forming body when positioned within the unsealing zone, thereby unsealing the air passage.

In some embodiments, the second air chamber forming body comprises a cylindrical outer wall, the outer wall having a first diameter in the sealing zone and a second diameter in the unsealing zone, the second diameter being larger than the first diameter;

wherein the piston body comprises an outer edge that is configured to sealingly engage with the second air chamber forming body when positioned within the sealing zone, and to at least partially disengage from the second air chamber forming body when positioned within the unsealing zone.

The outer edge of the piston body may be positioned within the unsealing zone when the piston body is between the first position and the second sound start position, and is positioned within the sealing zone when between the second sound start position and the second position.

The at least one air pump may comprise an air chamber forming body in fluid communication with the first sound generator and the second sound generator;

wherein the actuator is configured to reduce a volume of air contained within the air chamber forming body during movement from the first position to the second position, forcing at least some of the air to discharge from the air chamber forming body through the first sound generator as the first stream of air and through the second sound generator as the second stream of air.

The actuator may, for example, comprise a piston body, wherein movement of the actuator from the first position to the second position comprises an instroke movement of the piston body within the air chamber forming body, thereby pressurizing the air contained within the air chamber forming body and forcing at least some of the air to discharge from the air chamber forming body.

Optionally, the piston body comprises a first modular port, a second modular port, and a third modular port, each in fluid communication with the air chamber forming body;

wherein the first sound generator is received within the first modular port;

wherein the second sound generator is received within the second modular port; and wherein the third modular port is configured to receive at least one of: a third sound generator, a pressure stabilizer, and a plug.

In some embodiments, the third sound generator is received within the third modular port, the third sound generator being configured to generate a third sound when the fluid dispenser is activated by the user; and wherein the first sound, the second sound, and the third sound each have a different sound frequency.

The third modular port may be configured to receive the third sound generator in both a forwards orientation and a backwards orientation;

wherein the third sound generator is configured to generate the third sound during the instroke movement when in the forwards orientation; and wherein the third sound generator is configured to generate the third sound during an outstroke movement when in the backwards orientation.

In some embodiments, the fluid dispenser further comprises a pressure stabilizer in fluid communication with the air chamber forming body, the pressure stabilizer being configured to maintain air pressure within the air chamber forming body below a preselected maximum pressure.

The preselected maximum pressure is preferably selected to moderate fluctuations in a sound profile produced by the first sound generator and the second sound generator when the fluid dispenser is activated by the user at different velocities.

The pressure stabilizer may, for example, comprise a pressure relief valve that is configured to release air from the air chamber forming body when the air pressure within the air chamber forming body exceeds a preselected threshold.

In other embodiments, the pressure stabilizer comprises an air accumulator that is configured to receive air from the air chamber forming body when the air pressure within the air chamber forming body exceeds a preselected threshold.

The air accumulator is optionally configured to return to the air chamber forming body at least some of the air received from the air chamber forming body when the air pressure within the air chamber forming body falls below the preselected threshold.

The air accumulator may, for example, comprise a resiliently expandable bellows having an expanded state and a contracted state, the bellows defining an internal volume that is greater in the expanded state than in the contracted state, the bellows being resiliently biased towards the contracted state.

In some embodiments, the fluid dispenser further comprises a first pressure opening valve that is configured to prevent the first stream of air from passing through the first sound generator until the air within the air chamber forming body exceeds a first preselected minimum pressure.

The fluid dispenser may further comprise a second pressure opening valve that is configured to prevent the second stream of air from passing through the second sound generator until the air within the air chamber forming body exceeds a second preselected minimum pressure.

In some embodiments, the at least one air pump comprises an air chamber forming body in fluid communication with the first sound generator and the second sound generator;

wherein the actuator is configured to increase a volume of air contained within the air chamber forming body during movement from the first position to the second position, drawing atmospheric air through the first sound generator as the first stream of air and through the second sound generator as the second stream of air.

The actuator may, for example, comprise a piston body, wherein movement of the actuator from the first position to the second position comprises an outstroke movement of the piston body within the air chamber forming body, thereby producing a vacuum within the air chamber forming body and drawing atmospheric air into the air chamber forming body.

In some embodiments the fluid dispenser further comprises:

a fluid chamber containing the fluid to be dispensed; and a fluid outlet in fluid communication with the fluid chamber, for dispensing the fluid from the fluid chamber;

wherein movement of the actuator from the first position to the second position pressurizes the fluid contained within the fluid chamber, forcing an allotment of the fluid to be expelled from the fluid outlet.

The fluid dispenser may further comprise a resistance generator configured to increase the pressure of the fluid contained within the fluid chamber to provide resistance against movement of the actuator from the first position to the second position, the actuator resisting movement from the first position to the second position as the pressure of the fluid contained within the fluid chamber increases.

The resistance generator is preferably configured to moderate fluctuations in a sound profile produced by the first sound generator and the second sound generator when the fluid dispenser is activated.

The resistance generator may, for example, comprise a pressurizing valve that prevents the fluid from being expelled from the fluid outlet until the pressure within the fluid chamber exceeds a minimum fluid pressure. Optionally, the resistance generator comprises a narrowing body that narrows a fluid pathway between the fluid chamber and the fluid outlet or at the fluid outlet. The narrowing body may comprise a plate with one or more apertures, the apertures being sized based on a predetermined fluid viscosity of the fluid, to provide resistance against a flow of the fluid through the apertures.

In a further aspect, the present invention resides in a fluid dispenser comprising:

a fluid pump for dispensing fluid on movement of an actuator activated by a user;

a sound generator which generates a sound when the fluid dispenser is activated by the user, the sound generator being configured to produce the sound from a stream of air passing through the sound generator;

an air pump for delivering the stream of air through the sound generator on movement of the actuator, the air pump comprising an air chamber forming body in fluid communication with the sound generator; and a pressure stabilizer in fluid communication with the air chamber forming body, the pressure stabilizer being configured to maintain air pressure within the air chamber forming body below a preselected maximum pressure;

wherein in a cycle of operation to dispense a dose of the fluid, the actuator is moved between a first position and a second position; and wherein the actuator is configured to reduce a volume of air contained within the air chamber forming body during movement from the first position to the second position, forcing at least some of the air to discharge from the air chamber forming body through the sound generator as the stream of air and causing the sound generator to produce the sound.

The preselected maximum pressure is preferably selected to moderate fluctuations in a sound profile produced by the sound generator when the fluid dispenser is activated by the user at different velocities.

The pressure stabilizer may, for example, comprise a pressure relief valve that is configured to release air from the air chamber forming body when the air pressure within the air chamber forming body exceeds a preselected threshold.

In other embodiments, the pressure stabilizer comprises an air accumulator that is configured to receive air from the air chamber forming body when the air pressure within the air chamber forming body exceeds a preselected threshold.

The air accumulator is optionally configured to return to the air chamber forming body at least some of the air received from the air chamber forming body when the air pressure within the air chamber forming body falls below the preselected threshold.

The air accumulator may comprise a resiliently expandable bellows having an expanded state and a contracted state, the bellows defining an internal volume that is greater in the expanded state than in the contracted state, the bellows being resiliently biased towards the contracted state.

In another aspect, the present invention resides in a fluid dispenser comprising:

a fluid pump for dispensing fluid on movement of an actuator activated by a user;

a fluid chamber containing the fluid to be dispensed;

a fluid outlet in fluid communication with the fluid chamber, for dispensing the fluid from the fluid chamber;

a sound generator which generates a sound when the fluid dispenser is activated by the user, the sound generator being configured to produce the sound from a stream of air passing through the sound generator; and an air pump for delivering the stream of air through the sound generator on movement of the actuator;

wherein in a cycle of operation to dispense a dose of the fluid, the actuator is moved between a first position and a second position; and wherein the air pump is configured to deliver the stream of air through the sound generator when the actuator is moved from the first position to the second position;

wherein movement of the actuator from the first position to the second position pressurizes the fluid contained within the fluid chamber, forcing an allotment of the fluid to be expelled from the fluid outlet;

wherein the actuator resists movement from the first position to the second position as the pressure of the fluid contained within the fluid chamber increases; and wherein the fluid dispenser further comprises a resistance generator configured to increase the pressure of the fluid contained within the fluid chamber to provide resistance against movement of the actuator from the first position to the second position.

The resistance generator is preferably configured to moderate fluctuations in a sound profile produced by the sound generator when the fluid dispenser is activated.

The resistance generator may, for example, comprise a pressurizing valve that prevents the fluid from being expelled from the fluid outlet until the pressure within the fluid chamber exceeds a minimum fluid pressure.

In a still further aspect, the present invention resides in a fluid dispenser comprising:

a fluid chamber containing fluid to be dispensed as foam;

an air chamber containing air for mixing with the fluid to generate the foam;

a foam generator for receiving and mixing the fluid from the fluid chamber and the air from the air chamber to generate the foam;

a fluid outlet for dispensing the foam produced by the foam generator;

at least one pump for dispensing the foam on movement of an actuator activated by a user;

a sound generator in fluid communication with the air chamber, the sound generator being configured to produce a sound from a stream of air passing through the sound generator; and a one-way air inlet valve that permits atmospheric air to enter the air chamber through the sound generator, and prevents the air contained within the air chamber from exiting the air chamber through the sound generator;

wherein movement of the actuator from a first position to a second position reduces a volume of the air contained within the air chamber, forcing at least some of the air to pass from the air chamber to the foam generator; and wherein movement of the actuator from the second position to the first position increases the volume of the air contained within the air chamber, drawing the atmospheric air through the sound generator as the stream of air and causing the sound generator to produce the sound.

The fluid dispenser may further comprise a one-way air outlet valve that permits the air contained within the air chamber to pass from the air chamber to the foam generator, and prevents the air and the fluid contained within the foam generator from passing from the foam generator to the air chamber.

The actuator may, for example, comprises a piston body, wherein movement of the actuator from the first position to the second position comprises an instroke movement of the piston body within the air chamber; and wherein movement of the actuator from the second position to the first position comprises an outstroke movement of the piston body within the air chamber.

Optionally, the foam generator comprises:

a mixing chamber that receives the fluid from the fluid chamber and the air from the air chamber; and a solid foam plug that is positioned between the mixing chamber and the fluid outlet, so that the air and the fluid must pass through the foam plug to generate the foam when dispensed.

In another aspect, the present invention resides in a fluid dispensing device comprising:

a replaceable fluid pump operable to dispense fluid; and a housing configured to releasably receive the replaceable fluid pump, the housing comprising:

an actuator configured to dispense the fluid from the fluid pump when activated by a user;

a sound generator configured to produce a sound from a stream of air passing through the sound generator; and an air pump configured to deliver the stream of air through the sound generator when the actuator is activated.

Optionally, the sound generator comprises a first sound generator, the air pump comprises a first air pump, and the sound comprises a first sound; and the replaceable fluid pump comprises:

a second sound generator which generates a second sound from a second stream of air passing through the second sound generator; and a second air pump configured to deliver the second stream of air through the second sound generator when the actuator is activated.

Preferably, the first sound differs from the second sound in respect of at least one detectable sound characteristic. The at least one detectable sound characteristic may, for example, comprise at least one of: duration, frequency, temporal alignment, amplitude, and timbre.

The fluid pump optionally comprises the aforementioned fluid dispenser.

In some embodiments, the first air pump comprises a resiliently compressible chamber that has an expanded state and a contracted state, the chamber defining an internal volume of air that is greater in the expanded state than in the contracted state, the chamber being biased towards the expanded state; and wherein the actuator is configured to compress the chamber from the expanded state to the contracted state when activated, forcing at least some of the air contained within the chamber out through the first sound generator to generate the first sound.

The actuator may be configured to move from a first position to a second position when activated. The actuator is optionally movable from the first position to the second position by manually pressing the actuator towards the second position; and wherein the actuator is biased to return to the first position when the manual pressure is removed.

The sound generator may, for example, comprise an air whistle.

The fluid dispenser is optionally a manually operated dispenser in which the actuator is moved by the user to dispense fluid.

The fluid may, for example, be a hand cleaning fluid.

In another aspect, the present invention resides in a system for monitoring activation of a fluid dispenser, comprising:

the aforementioned fluid dispenser or fluid dispensing device; and a sound sensing mechanism spaced from the fluid dispenser, comprising:

a sound sensor to sense the sounds produced by the fluid dispenser; and a communication mechanism to transmit data representative of the sounds sensed by the sound sensor to a remote computer.

The computer may, for example, be configured to calculate a volume of the fluid dispensed from the fluid dispenser based on a sound profile of the fluid dispenser; to identify the fluid dispenser based on a sound profile of the fluid dispenser; to distinguish the sounds produced by the fluid dispenser from other sounds based on a sound profile of the fluid dispenser; to calculate a movement speed of the actuator based on a sound profile of the fluid dispenser; and/or to calculate a movement distance of the actuator based on a sound profile of the fluid dispenser.

In a further aspect, the invention resides in a method comprising:

detecting the sounds produced when the aforementioned fluid dispenser is activated; and generating data representing a sound profile of the detected sounds.

The method may further comprise:

determining whether the sound profile falls within a predetermined range of expected sound profiles; and if the sound profile falls within the predetermined range, recording that the fluid dispenser was activated.

In some embodiments, the method further comprises identifying the fluid dispenser that was activated based on the sound profile.

The sound profile preferably includes one or more detectable sound characteristics selected from the group consisting of: duration, temporal alignment, amplitude, frequency, and timbre.

The method can optionally further comprise calculating an operational parameter of the fluid dispenser based on the sound profile.

The operational parameter is, for example, selected from the group consisting of: stroke speed, stroke distance, fluid pressure, air pressure, and volume of fluid dispensed.

In a further aspect, the present invention resides in a fluid dispenser comprising: a fluid pump for drawing fluid from a reservoir and dispensing the fluid on movement of an actuator in a cycle of operation; the actuator reciprocally movable in the cycle of operation between a first position and a second position with movement from the first position to the second position comprising a first stroke and movement from the second position to the first position comprising a second stroke, a sound generator mechanism which generates two sounds on movement of the actuator in the cycle of operation in the first stroke, the sound generator mechanism being configured to produce each sound from a respective one of two streams of air passing through the sound generator mechanism; and an air pump that delivers both of the two streams of air through the sound generator mechanism on movement of the actuator in the cycle of operation in the first stroke; wherein the sound generator mechanism produces the two sounds as the actuator is moved in the first stroke, with each sound produced in a different non-overlapping time period during the first stroke than the time period of the other sound, the time period of each sound in the first stroke being a function of the relative location of the actuator between the first position and the second position.

Preferably, the air pump delivers one of the streams of air through the sound generator mechanism as a first air stream during a first time period in the first stroke when the actuator moves between the first position and a first intermediate position between the first position and the second position; and wherein the air pump delivers one of the streams of air through the sound generator mechanism as a second air stream during a second time period in the first stroke different than the first time period when the actuator moves between the first intermediate position and a second intermediate position between the first intermediate position and the second position.

Optionally, the air pump comprises: an air chamber forming body in fluid communication with the sound generator mechanism; an air passage for carrying air into or out of the air chamber forming body; and a sealing body configured to seal the air passage during the first time period and during the second time period, and to unseal the air passage during a first intermediate time period between the first time period and the second time period.

In some embodiments, the actuator is configured to reduce a volume of air contained within the air chamber forming body during movement in the first stroke from the first position to the second position, forcing at least some of the air to discharge from the air chamber forming body; wherein: during the first time period the air is discharged through the sound generator mechanism as the first air stream; during the first intermediate time period at least some of the air is discharged through the unsealed air passage, thereby reducing or eliminating air flow through the sound generator mechanism; and during the second time period the air is discharged through the sound generator mechanism as the second air stream.

Preferably, the sound generator mechanism produces a first sound during the first time period, produces little or no sound during the first intermediate time period, and produces a second sound during the second time period.

Optionally, the actuator comprises a piston body; and wherein movement of the actuator in the first stroke from the first position to the second position comprises an instroke movement of the piston body within the air chamber forming body, thereby pressurizing the air contained within the air chamber forming body and forcing at least some of the air to discharge from the air chamber forming body.

In some embodiments, the air passage is defined between the piston body and the air chamber forming body; wherein the air chamber forming body comprises a sealing zone and an unsealing zone; wherein the piston body is configured to sealingly engage with the air chamber forming body when positioned within the sealing zone, thereby sealing the air passage; and wherein the piston body is configured to at least partially disengage from the air chamber forming body when positioned within the unsealing zone, thereby unsealing the air passage.

Preferably, the air chamber forming body comprises a cylindrical outer wall, the outer wall having a first diameter in the sealing zone and a second diameter in the unsealing zone, the second diameter being larger than the first diameter; wherein the piston body comprises an outer edge that is configured to sealingly engage with the air chamber forming body when positioned within the sealing zone, and to at least partially disengage from the air chamber forming body when positioned within the unsealing zone.

Optionally, the sealing zone comprises a first sealing area and a second sealing area, and wherein the unsealing zone comprises a first unsealing area; wherein the instroke movement of the piston body comprises: a first segment of movement in which the outer edge of the piston body moves along and sealingly engages with the first sealing area of the air chamber forming body, thereby compressing the air contained within the air chamber forming body and forcing the first air stream through the sound generator mechanism; a second segment of movement in which the outer edge of the piston body moves past the first unsealing area of the air chamber forming body, thereby unsealing the air passage and allowing the air contained within the air chamber forming body to discharge through the air passage, reducing or eliminating the air flow through the sound generator mechanism; and a third segment of movement in which the outer edge of the piston body moves along and sealingly engages with the second sealing area of the air chamber forming body, thereby compressing the air contained within the air chamber forming body and forcing the second air stream through the sound generator mechanism.

In some embodiments, the sealing zone further comprises a third sealing area, and wherein the unsealing zone further comprises a second unsealing area; wherein the instroke movement of the piston body further comprises: a fourth segment of movement in which the outer edge of the piston body moves past the second unsealing area of the air chamber forming body, thereby unsealing the air passage and allowing the air contained within the air chamber forming body to discharge through the air passage, reducing or eliminating the air flow through the sound generator mechanism; and a fifth segment of movement in which the outer edge of the piston body moves along and sealingly engages with the third sealing area of the air chamber forming body, thereby compressing the air contained within the air chamber forming body and forcing a third air stream through the sound generator mechanism, causing the sound generator mechanism to produce a third sound.

In some embodiments, the actuator comprises a piston body; wherein movement of the actuator from the first position to the second position comprises an outstroke movement of the piston body within the air chamber forming body, which produces a vacuum within the air chamber forming body, thereby causing atmospheric air to be drawn into the air chamber forming body; wherein the sound generator mechanism produces a first sound during the first time period, produces little or no sound during the first intermediate time period, and produces a second sound during the second time period; wherein: during the first time period the atmospheric air is drawn into the air chamber forming body through the sound generator mechanism as the first air stream; during the first intermediate time period the atmospheric air is drawn into the air chamber forming body through the unsealed air passage, thereby reducing or eliminating air flow through the sound generator mechanism; and during the second time period the atmospheric air is drawn into the air chamber forming body through the sound generator mechanism as the second air stream; wherein the air passage is defined between the piston body and the air chamber forming body; wherein the air chamber forming body comprises a sealing zone and an unsealing zone; wherein the piston body is configured to sealingly engage with the air chamber forming body when positioned within the sealing zone, thereby sealing the air passage; wherein the piston body is configured to at least partially disengage from the air chamber forming body when positioned within the unsealing zone, thereby unsealing the air passage; wherein the air chamber forming body comprises a cylindrical outer wall, the outer wall having a first diameter in the sealing zone and a second diameter in the unsealing zone, the second diameter being larger than the first diameter; wherein the piston body comprises an outer edge that is configured to sealingly engage with the air chamber forming body when positioned within the sealing zone, and to at least partially disengage from the air chamber forming body when positioned within the unsealing zone; wherein the sealing zone comprises a first sealing area and a second sealing area, and wherein the unsealing zone comprises a first unsealing area; wherein the outstroke movement of the piston body comprises: a first segment of movement in which the outer edge of the piston body moves along and sealingly engages with the first sealing area of the air chamber forming body, thereby producing a vacuum within the air chamber forming body and drawing the first stream of air through the sound generator mechanism into the air chamber forming body; a second segment of movement in which the outer edge of the piston body moves past the first unsealing area of the air chamber forming body, thereby unsealing the air passage and allowing the atmospheric air to be drawn into the air chamber forming body through the air passage, reducing or eliminating the air flow through the sound generator mechanism; and a third segment of movement in which the outer edge of the piston body moves along and sealingly engages with the second sealing area of the air chamber forming body, thereby producing a vacuum within the air chamber forming body and drawing the second stream of air through the sound generator mechanism into the air chamber forming body.

Preferably, the fluid dispenser further comprises a fluid chamber containing the fluid to be dispensed; and a fluid outlet in fluid communication with the fluid chamber, for dispensing the fluid from the fluid chamber; wherein movement of the actuator from the first position to the second position pressurizes the fluid contained within the fluid chamber, forcing the dose of the fluid to be expelled from the fluid outlet.

Optionally, the sound generator mechanism comprises an air whistle.

In some embodiments, the fluid dispenser is a manually operated dispenser in which the actuator is moved by a user to dispense the fluid.

Preferably, the fluid is a hand cleaning fluid.

BRIEF DESCRIPTION OF THE DRAWINGS

Further aspects and advantages of the invention will appear from the following description taken together with the accompanying drawings, in which:

FIG. 32 is a line graph depicting the sound profile produced by the pump assembly shown in FIG. 24 during a normal speed instroke movement;

DETAILED DESCRIPTION OF THE DRAWINGS

Figure 1:
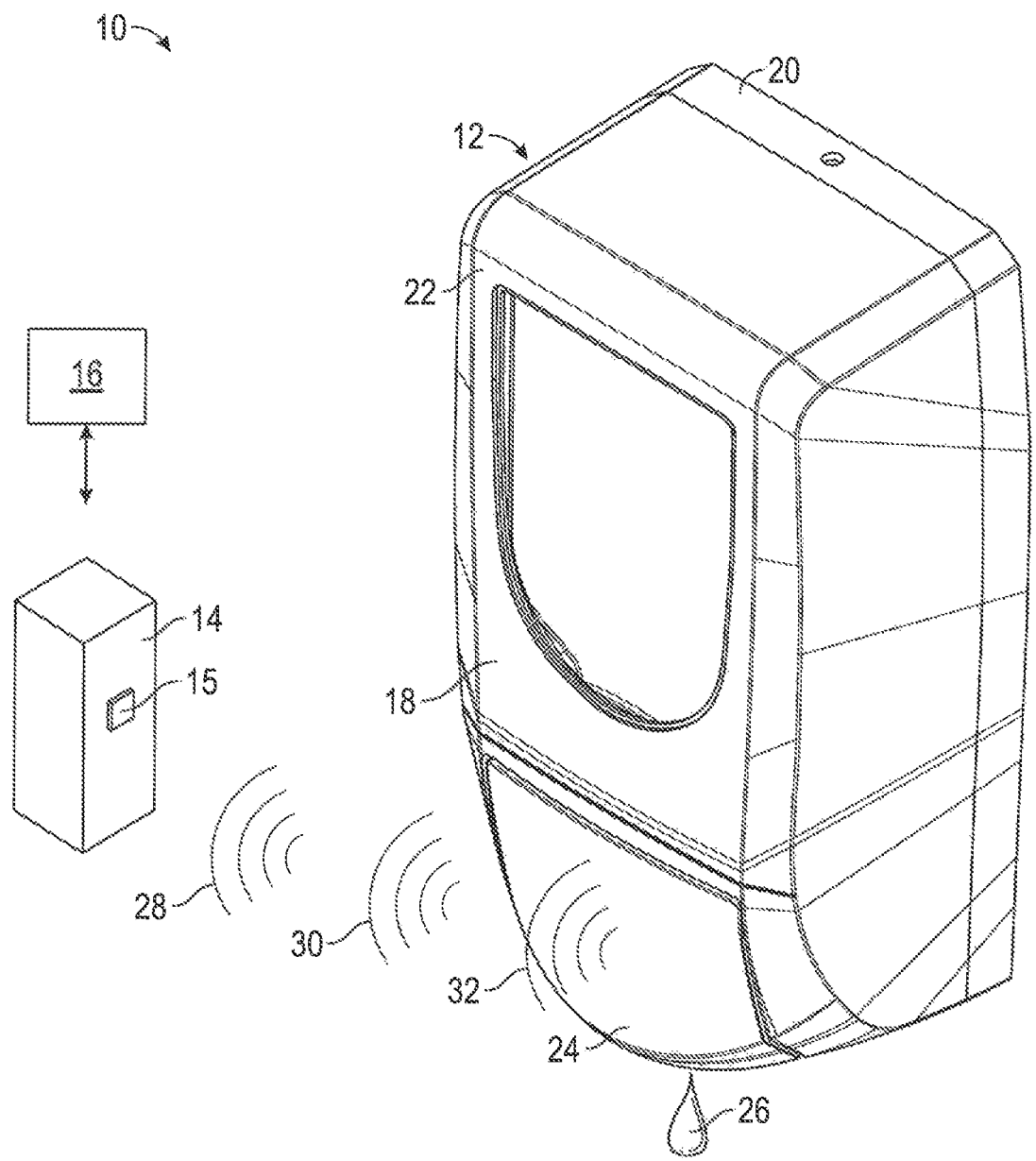
FIG. 1 is a schematic view of a compliance monitoring system in accordance with a first embodiment of the present invention, including a sound generating fluid dispenser and a sound sensing mechanism in communication with a remote computer.

Reference is made to FIG. 1, which illustrates a compliance monitoring system 10 in accordance with a first embodiment of the invention. The monitoring system 10 includes a sound generating fluid dispenser 12 and a sound sensing mechanism 14 in communication with a remote computer 16.

The fluid dispenser 12 has a housing 18 including a back panel 20 for mounting the housing 18 to a wall or similar support structure, as well as a hinged front cover 22. The front cover 22 incorporates a spring loaded actuator panel 24 that activates the fluid dispenser 12 to dispense an allotment of hand cleaning fluid 26 when the actuator panel 24 is pressed by a user. The fluid dispenser 12 is configured to emit a first sound 28, a second sound 30, and a third sound 32 when activated.

Figure 2:
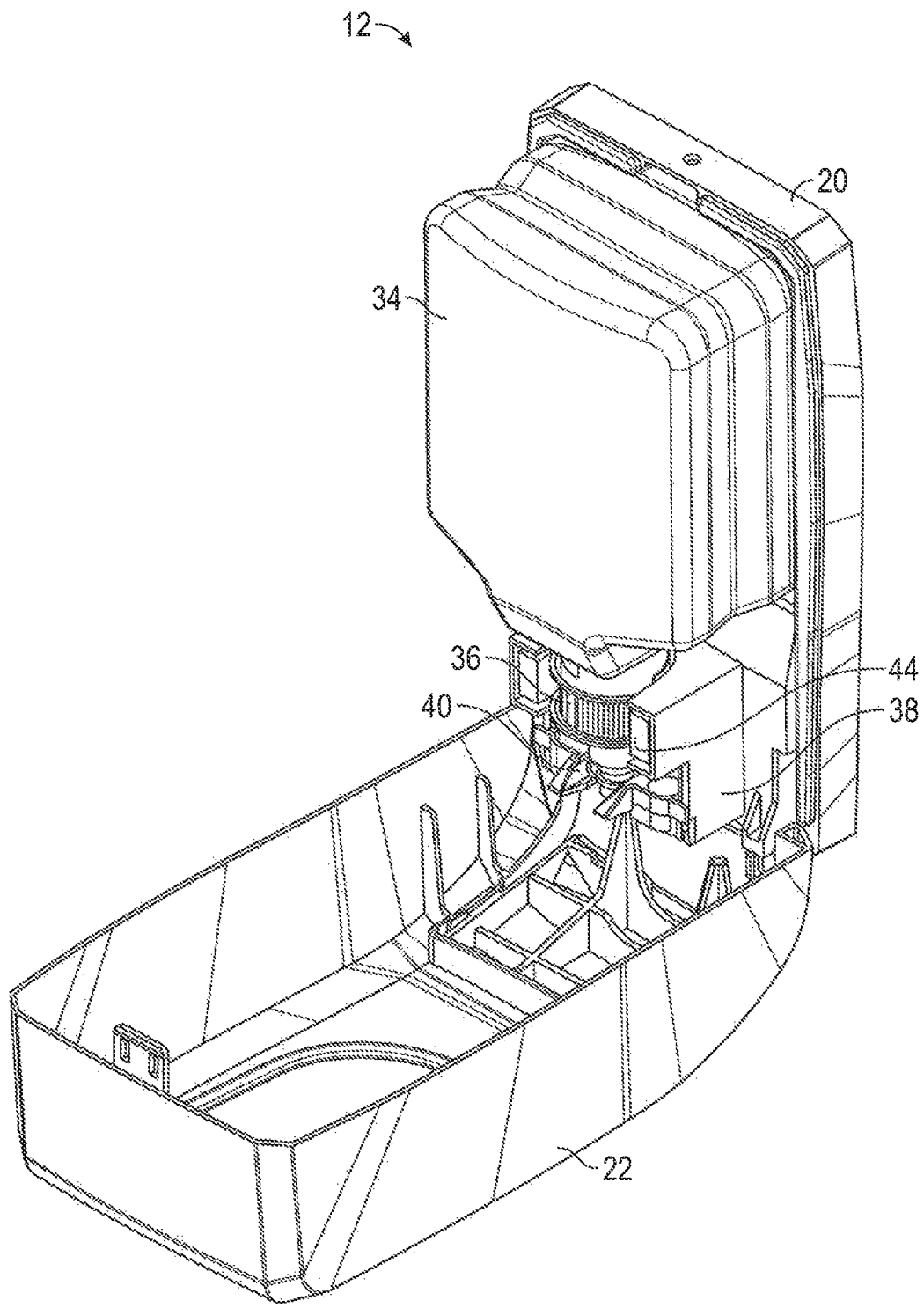
FIG. 2 is a perspective view of the fluid dispenser shown in FIG. 1, with the housing of the fluid dispenser shown in an open condition to reveal the fluid reservoir and pump assembly held therein.
Figure 3:
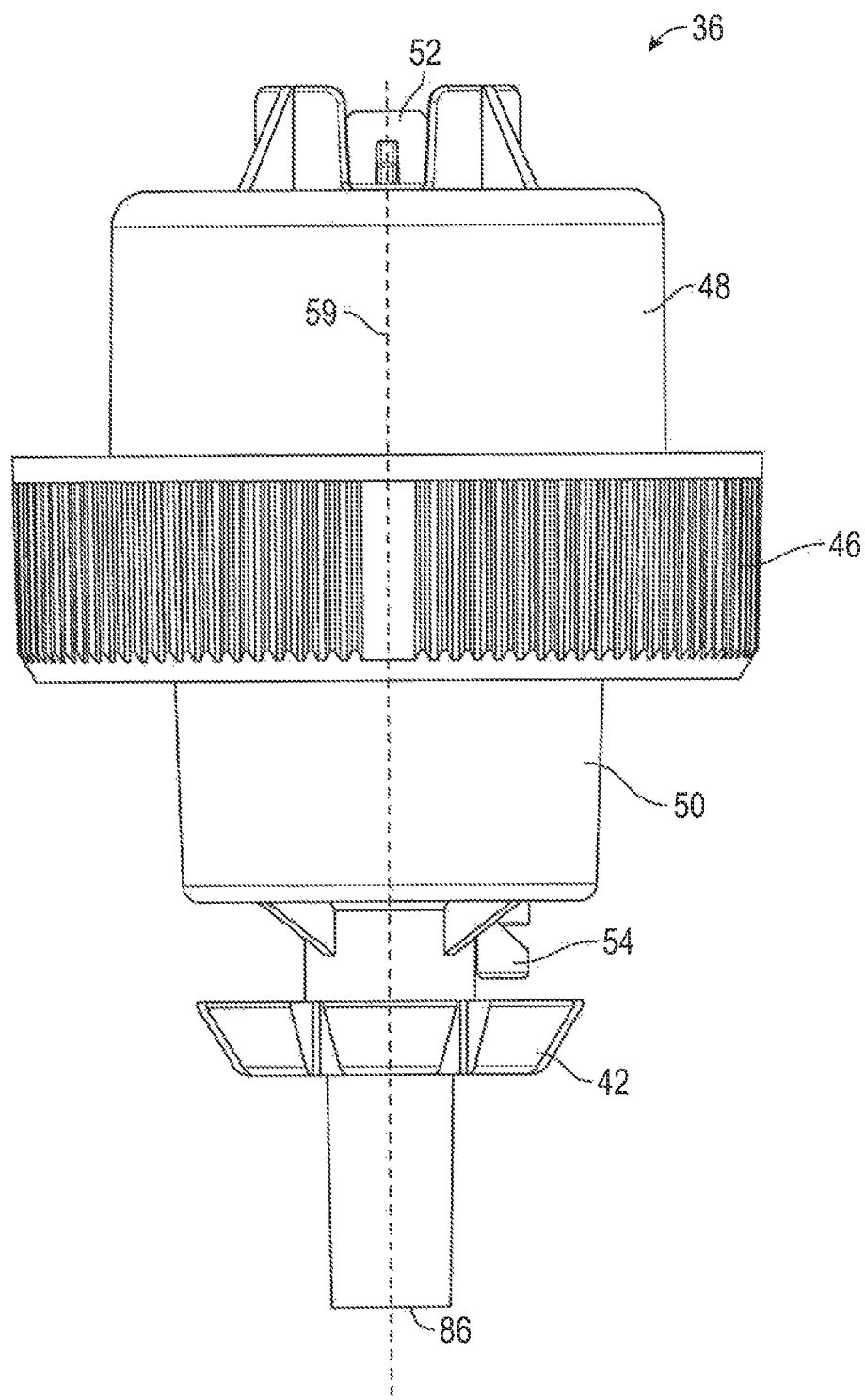
FIG. 3 is a detailed front view of the pump assembly shown in FIG. 2.

As shown in FIG. 2, the housing 18 of the fluid dispenser 12 contains a fluid reservoir 34 coupled to a pump assembly 36 including a fluid pump 35, an air pump 37, and a sound generator mechanism 702 in the form of an air whistle 54. The fluid reservoir 34 contains the fluid 26 that is to be dispensed from the fluid dispenser 12. The back panel 20 of the housing 18 carries a support assembly 38 which is configured to engage with the pump assembly 36 to hold the pump assembly 36 and fluid reservoir 34 in place within the housing 18. The support assembly 38 is operatively connected to the actuator panel 24 to activate the pump assembly 36 when the panel 24 is pressed. The support assembly 38 has a stationary mount 44 fixed to the back panel 20 and thereby to the housing 18 and an actuator plate or movable seat 40 that is mounted for vertical sliding relative to the stationary mount 44. The stationary mount 44 engages with a gripping collar 46 of a piston chamber forming body 48 of the pump assembly 36. The movable seat 40 engages with an actuation flange 42 of a piston body 50 of the pump assembly 36 (the actuation flange 42 and gripping collar 46 are best shown in FIG. 3). When the actuator panel 24 is pressed, the actuator panel 24 moves the movable seat 40 upwardly and the movable seat 40 displaces the actuation flange 42 upwards while the stationary mount 44 holds the gripping collar 46 fixed in place. This upward movement of the actuation flange 42 relative to the gripping collar 46 activates the pump assembly 36 and causes the fluid pump 35 to discharge an allotment of the fluid 26, the air pump 37 to deliver air to the air whistle 54, and the air whistle 54 to emit the first 28, second 30, and third sounds 32, as is described in more detail below.

Figure 4:
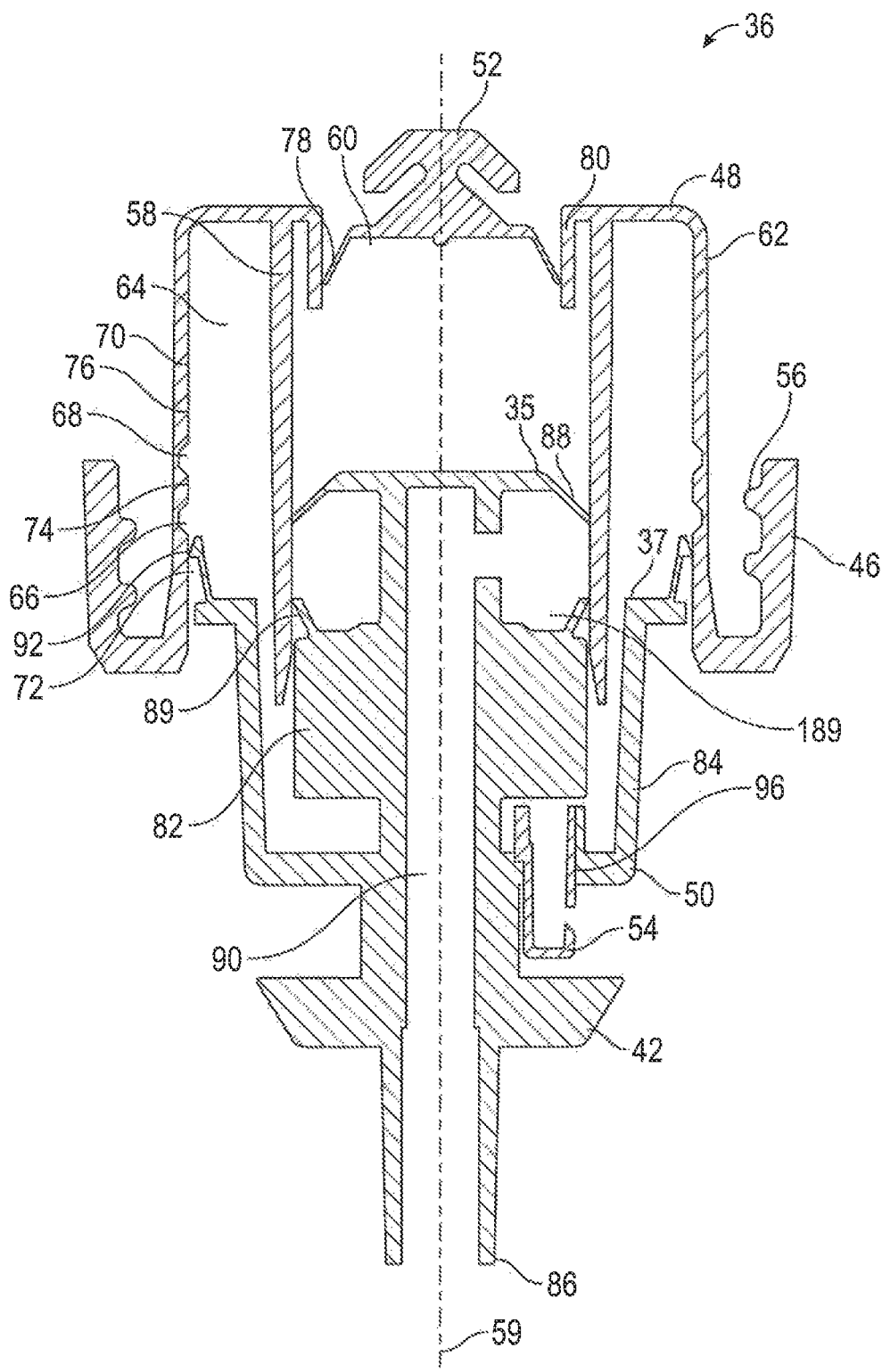
FIG. 4 is a cross-sectional view of the pump assembly shown in FIG. 3, with the pump shown in an extended first position.

The pump assembly 36 is shown in FIGS. 3 and 4 as comprising the piston chamber forming body 48, the piston body 50, a one-way fluid inlet valve 52, and an air whistle 54. The piston chamber forming body 48 includes the gripping collar 46, which has a threaded inside surface 56 for engagement with a threaded opening of the fluid reservoir 34 (not shown). The piston chamber forming body 48 has a cylindrical inner wall 58 disposed about a central axis 59. The inner wall 58 defines a central fluid chamber 60. The fluid chamber 60 receives fluid 26 from the fluid reservoir 34 via the one-way fluid inlet valve 52. The piston chamber forming body 48 also has a cylindrical outer wall 62 that is arranged coaxially and concentrically outward from the inner wall 58. An air chamber 64 is defined between the outer wall 62 and the inner wall 58. The piston chamber forming body 48 thus functions as an air chamber forming body 704.

The outer wall 62 of the piston chamber forming body 48 has a radially inwardly directed inner surface 70 that is generally cylindrical about the axis 59, other than where the outer wall 62 has a first annular groove 66 and a second annular groove 68, in which the diameter of the inner surface 70 of the outer wall 62 is increased in comparison to a first portion 72 of the inner surface 70 located below the first annular groove 66, a second portion 74 of the inner surface 70 located between the first annular groove 66 and the second annular groove 68, and a third portion 76 of the inner surface 70 located above the second annular groove 68. The inner surface 70 of the outer wall 62 is shown in detail in FIG. 4a.

The one-way fluid inlet valve 52 is disposed between the fluid chamber 60 and the fluid reservoir 34. The inlet valve 52 has a downwardly and outwardly angled inlet flange 78 that is sized to sealingly engage with an upper opening 80 of the piston chamber forming body 48. The size and orientation of the inlet flange 78 is selected so that pressurized fluid 26 within the fluid chamber 60 pushes the inlet flange 78 upwards and outwards, into engagement with the upper opening 80, thereby sealing the upper opening 80 and preventing the pressurized fluid 26 from entering the fluid reservoir 34 from the fluid chamber 60. The inlet flange 78 is further configured to deform downwards and inwards when the pressure within the fluid reservoir 34 exceeds the pressure within the fluid chamber 60, as when a vacuum is formed in chamber 60 due to increasing volume during a retraction stroke, thereby unsealing the upper opening 80 and allowing the fluid 26 to enter the fluid chamber 60 from the fluid reservoir 34.

The piston body 50 includes the actuation flange 42, a fluid displacement body 82, an air displacement body 84, and a fluid outlet 86. The fluid displacement body 82 is disposed within the fluid chamber 60 and is movable relative thereto, defining therebetween with the one-way fluid inlet valve 52 the fluid pump 35 to draw fluid 26 from the reservoir 34 and discharge it out the fluid outlet 86. The fluid pump 35 has a similar construction to the pump disclosed in U.S. Pat. No. 5,373,970 to Ophardt, issued Dec. 20, 1994, the disclosure of which is incorporated herein by reference.

Figure 5:
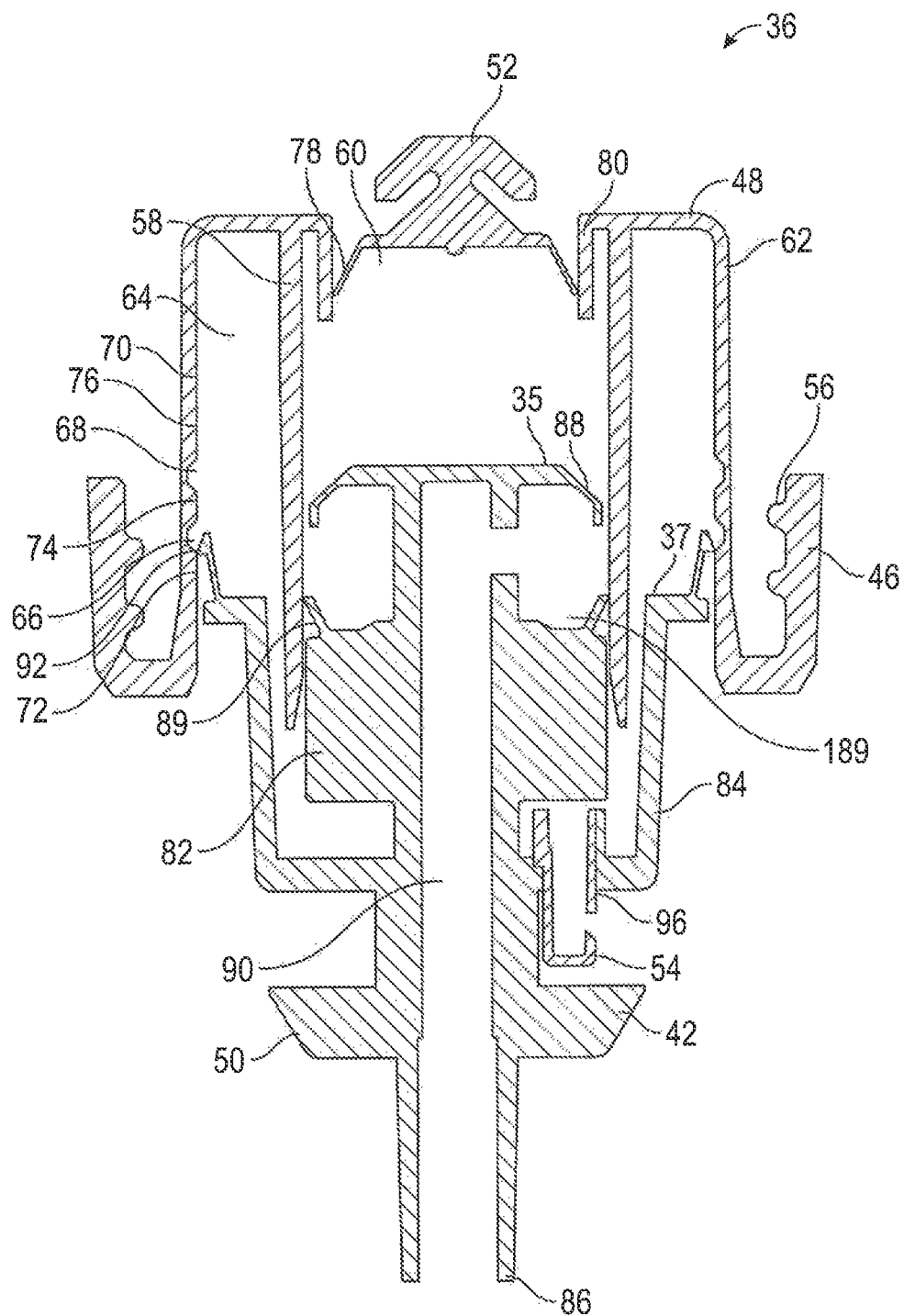
FIG. 5 is a cross-sectional view of the pump assembly shown in FIG. 3, with the pump shown in a first sealed intermediate position during an instroke movement.

At its uppermost end, the fluid displacement body 82 has a downwardly and outwardly angled outlet disc flange 88 that is sized to coaxially sealingly engage with the inner wall 58 of the piston chamber forming body 48. Below the outlet disc flange 88, the fluid displacement body 82 defines a fluid collection chamber 189. The fluid collection chamber 189 is in fluid communication with an outlet channel 90 that extends axially down through the piston body 50, past the actuation flange 42, and terminates at the fluid outlet 86. The size and orientation of the outlet disc flange 88 is selected so that pressurized fluid 26 within the fluid chamber 60 deflects the outlet disc flange 88 axially downwards and radially inwards, away from the inner wall 58, as shown in FIG. 5, thereby allowing the pressurized fluid 26 to move from the fluid chamber 60 into the fluid collection chamber 189, and then into the outlet channel 90 to be discharged from the fluid outlet 86. The outlet disc flange 88 is further configured, when the pressure within the fluid collection chamber 189 and the outlet channel 90 equals or exceeds the pressure within the fluid chamber 60, to engage the inner wall 58, as shown in FIG. 4, thereby sealing the outlet flange 88 against the inner wall 58 and preventing air or fluid 26 from moving from the fluid collection chamber 189 and the outlet channel 90 into the fluid chamber 60.

The fluid displacement body 82 includes a sealing disc flange 89 that is sized to coaxially sealingly engage with the inner wall 58 of the piston chamber forming body 48 to prevent air or fluid 26 from moving axially outwardly there past.

Figure 6:
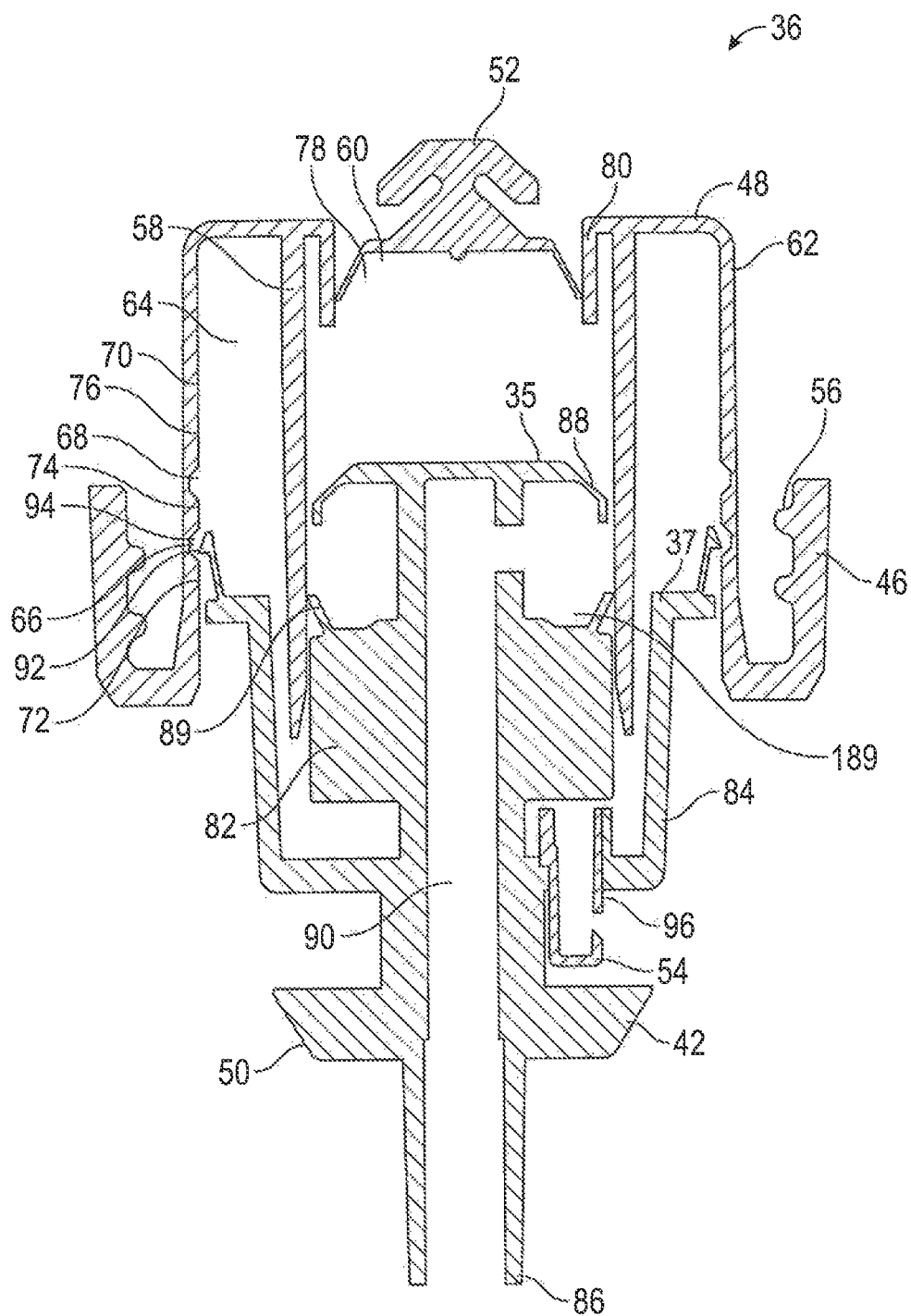
FIG. 6 is a cross-sectional view of the pump assembly shown in FIG. 3, with the pump shown in a first unsealed intermediate position during the instroke movement.

The air displacement body 84 is arranged concentrically outward from the fluid displacement body 82, and is disposed coaxially within the air chamber 64 and is movable axially relative thereto, defining therebetween the air pump 37 to draw air from the atmosphere into the air chamber 64 through the air whistle 54 and to discharge air from the air chamber 64 outwardly through the air whistle 54. The air displacement body 84 is spaced from the inner wall 58 of the piston chamber forming body 48, and has a sealing body 706 in the form of an outer sealing edge 92 that is configured to sealingly engage with the inner surface 70 of the outer wall 62 of the piston chamber forming body 48 as when the sealing edge 92 is located axially adjacent to the first portion 72, the second portion 74, and the third portion 76 of the inner surface 70 of the outer wall 62. The sealing edge 92 is further configured to disengage from the inner surface 70 of the outer wall 62 when the sealing edge 92 is arranged axially adjacent to the first annular groove 66 and the second annular groove 68, thereby forming an air passage 94 between the sealing edge 92 of air displacement body 84 and the outer wall 62 as shown in FIG. 6. The first portion 72, the second portion 74, and the third portion 76 of the inner surface 70 of the outer wall 62 function as a first sealing area 712, a second sealing area 714, and a third sealing area 716, respectively, and together form a sealing zone 708. The first annular groove 66 and the second annular groove 68 function as a first unsealing area 718 and a second unsealing area 720, and together form an unsealing zone 710.

The air whistle 54 is disposed within a lower opening 96 of the air displacement body 84 in fluid communication with the air chamber 64. The air whistle 54 is open to the outside environment so as to provide a pathway for airflow between the air chamber 64 and the atmosphere. The air whistle 54 is configured to generate the first 28, second 30, and third sounds 32 when streams of pressurized air pass through the air whistle 54 from the air chamber 64 during activation of the pump assembly 36.

The operation of the pump assembly 36 will now be described with reference to FIGS. 4 to 8. Prior to activation of the fluid dispenser 12, the pump assembly 36 is in an extended first position shown in FIG. 4, with fluid 26 contained within the fluid chamber 60 and air contained within the air chamber 64. When the actuator panel 24 is pressed by a user, the moveable seat 40 of the support assembly 38 displaces the actuation flange 42 of the piston body 50 moving the piston body 50 coaxially inwardly and upwards relative to the piston chamber forming body 48 in a first stroke, the first stroke being an instroke movement. This moves the fluid displacement body 82 of the fluid pump 35 upwards and axially inwardly within the fluid chamber 60, and moves the air displacement body 84 of the air pump 37 upwards and axially inwardly within the air chamber 64, as shown in FIG. 5. The piston body 50 functions as an actuator 700 for dispensing the fluid 26 and for activating the air whistle 54, as is described below.

The upwards movement of the fluid displacement body 82 within the fluid chamber 60 pressurizes the fluid 26 contained within the fluid chamber 60. The pressurized fluid 26 presses against the outlet flange 88 of the fluid displacement body 82, deforming the outlet flange 88 downwards and inwards, away from the inner wall 58 of the piston chamber forming body 48. This allows the pressurized fluid 26 to move past the outlet flange 88, into the outlet channel 90, and out through the fluid outlet 86.

At the same time, the upwards movement of the air displacement body 84 within the air chamber 64 pressurizes the air contained within the air chamber 64. During a first time period in which the sealing edge 92 of the air displacement body 84 moves from the first position shown in FIG. 4 to a first sealed intermediate position shown in FIG. 5, the sealing edge 92 moves along and sealingly engages with the first portion 72 of the inner surface 70 of the outer wall 62. The sealing engagement of the sealing edge 92 with the inner surface 70 of the outer wall 62 prevents the pressurized air from escaping from the air chamber 64 between the sealing edge 92 and the outer wall 62, and thus forces the pressurized air to escape through the air whistle 54. The upwards movement of the air displacement body 84 during the first time period thus delivers a first stream of pressurized air through the air whistle 54, causing the air whistle 54 to emit the first sound 28.

As the piston body 50 and the air displacement body 84 continue to move upwards, from the position of FIG. 5 to the position of FIG. 6, the sealing edge 92 passes over the first annular groove 66, as shown in FIG. 6. The increased diameter of the inner surface 70 of the outer wall 62 over the first annular groove 66 causes the sealing edge 92 to disengage from the inner surface 70, thereby opening the air passage 94 between the sealing edge 92 and the inner surface 70. This allows the compressed air within the air chamber 64 to escape directly through the air passage 94, and thus significantly reduces or eliminates the flow of air through the air whistle 54. This causes the air whistle 54 to emit little or no sound during a first intermediate time period in which the sealing edge 92 moves past the first annular groove 66.

Figure 7:
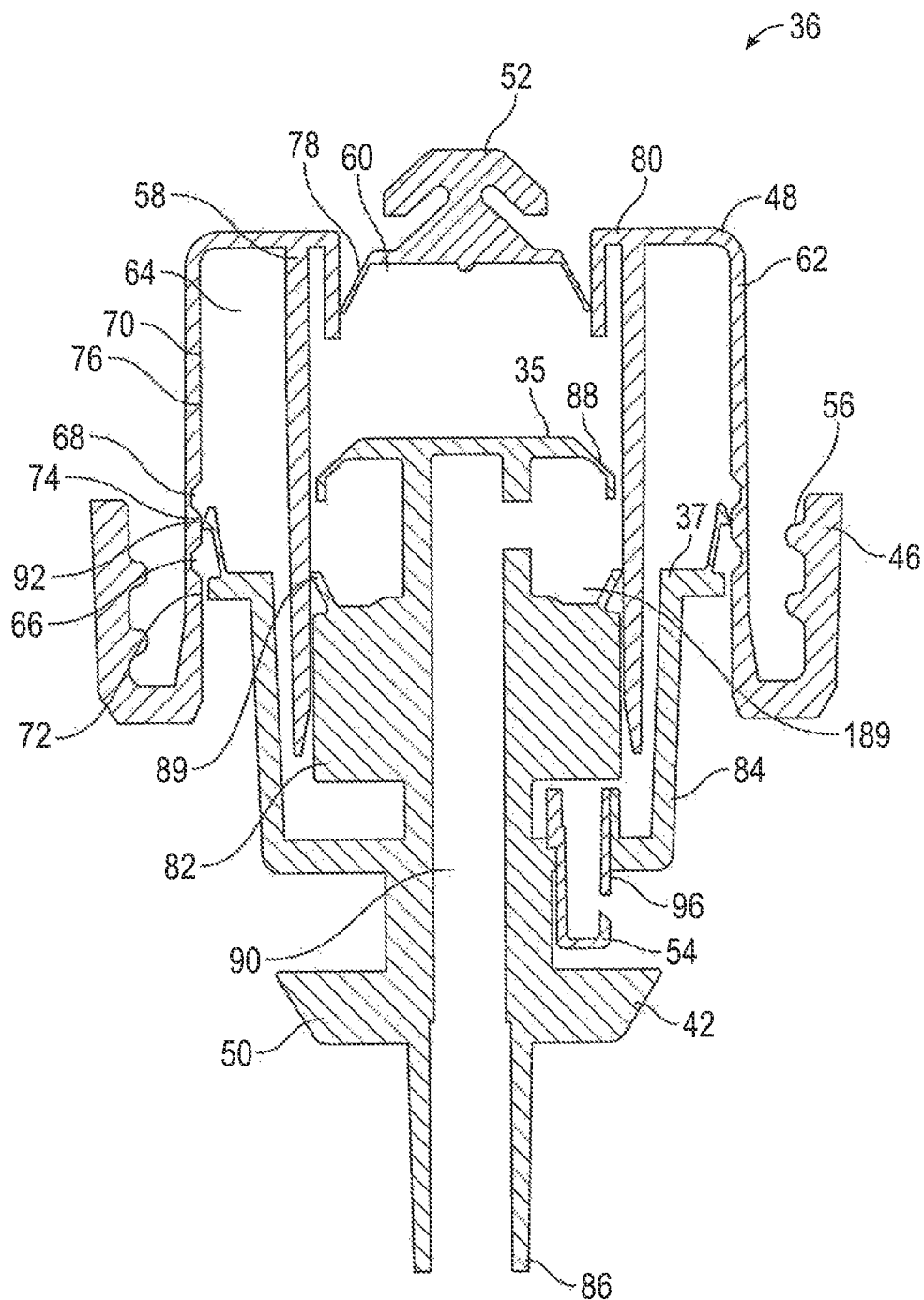
FIG. 7 is a cross-sectional view of the pump assembly shown in FIG. 3, with the pump shown in a second sealed intermediate position during the instroke movement.

With further upward movement of the piston body 50, the sealing edge 92 then re-engages with the inner surface 70 of the outer wall 62 when the sealing edge 92 reaches the second portion 74 of the inner surface 70, as shown in FIG. 7. This re-engagement again seals the air passage 94, and causes a second stream of pressurized air to pass through the air whistle 54 during a second time period in which the sealing edge 92 moves along and engages with the second portion 74 of the inner surface 70, thereby causing the air whistle 54 to emit the second sound 30.

When the sealing edge 92 reaches the second annular groove 68, the sealing edge 92 again disengages from the inner surface 70 of the outer wall 62 over the second annular groove 68, opening the air passage 94. This once again allows the compressed air within the air chamber 64 to escape directly through the air passage 94, significantly reducing or eliminating the flow of air through the air whistle 54, bypassing the air whistle 54. This causes the air whistle 54 to emit little or no sound during a second intermediate time period in which the sealing edge 92 moves past the second annular groove 68.

With further inward movement of the piston body 50, the sealing edge 92 then re-engages with the inner surface 70 of the outer wall 62 for a third time when the sealing edge 92 reaches the third portion 76 of the inner surface 70 (not shown). This re-engagement once again seals the air passage 94, and causes a third stream of pressurized air to pass through the air whistle 54 during a third time period in which the sealing edge 92 moves upwards along and engages with the third portion 76 of the inner surface 70, thereby causing the air whistle 54 to emit the third sound 32.

Figure 8:
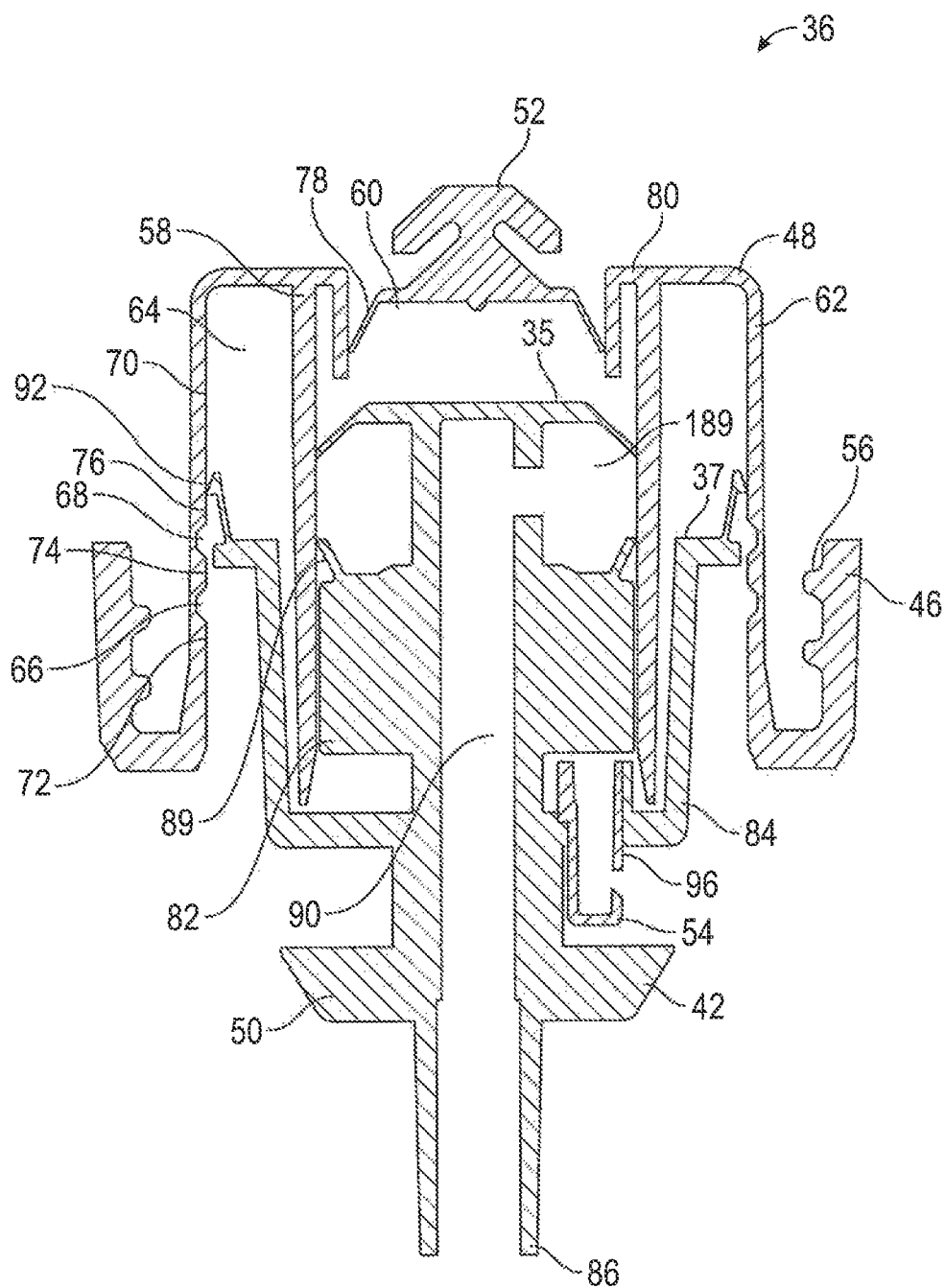
FIG. 8 is a cross-sectional view of the pump assembly shown in FIG. 3, with the pump shown in a retracted second position.

At the end of the instroke movement, the piston body 50 arrives at the retracted second position shown in FIG. 8. When the actuator panel 24 is then released by the user, under the bias of a spring (not shown) the spring-loaded actuator panel 24 is returned to its native position, the movable seat 40 is moved downwards and the piston body 50 is moved back down towards the first position in a second stroke, the second stroke being an outstroke movement.

As the fluid displacement body 82 is moved downwards within the fluid chamber 60, the pressure within the fluid chamber 60 decreases. This creates a pressure differential between the fluid chamber 60 and the fluid reservoir 34, causing the relatively higher pressure fluid 26 within the reservoir 34 to push the inlet flange 78 of the inlet valve 52 downwards and inwards, allowing the fluid 26 to enter the fluid chamber 60 from the reservoir 34 through the opening 80. This fills the fluid chamber 60 with fluid 26, and thus readies the pump assembly 36 to dispense another allotment of fluid 26 when activated again. At the same time, the relatively low pressure within the fluid chamber 60 allows the outlet disc flange 88 of the fluid displacement body 82 to move axially inwards and radially outwards to re-engage with the inner wall 58 of the piston chamber forming body 48. This prevents air or fluid 26 from entering the fluid chamber 60 via the outlet channel 90.

As the air displacement body 84 is moved downwards within the air chamber 64 during the outstroke movement, the pressure within the air chamber 64 likewise decreases. This creates a pressure differential between the air chamber 64 and the atmospheric air surrounding the fluid dispenser 12, causing the relatively higher pressure atmospheric air to enter the air chamber 64 through the air whistle 54. Air also enters the air chamber 64 through the air passage 94 when the sealing edge 92 passes over the first 66 and second annular grooves 68 during the outstroke movement. This fills the air chamber 64 with air, and thus readies the pump assembly 36 to emit the first 28, second 30, and third sounds 32 again when the pump assembly 36 is activated. Once the pump assembly 36 returns to the extended first position shown in FIG. 4, the fluid dispenser 12 can once again be activated by the same user or a different user by pressing the actuator panel 24.

When the actuator panel 24 is fully depressed and then fully released, the pump assembly 36 undergoes a complete cycle of operation as described above, including a complete instroke movement in which the piston body 50 moves from the extended first position shown in FIG. 4 to the retracted second position shown in FIG. 8, and a complete outstroke movement in which the piston body 50 moves from the retracted second position back to the extended first position. As described above, the movement of the piston body 50 within the piston chamber forming body 48 during the instroke movement causes the air whistle 54 to emit the first 28, second 30, and third sounds 32 in different time periods during the cycle of operation. The time period of each sound 28, 30, 32 during the cycle of operation is a function of the relative location of the piston body 50 between the extended first position and the retracted second position, as is described in more detail below.

Figure 4A:
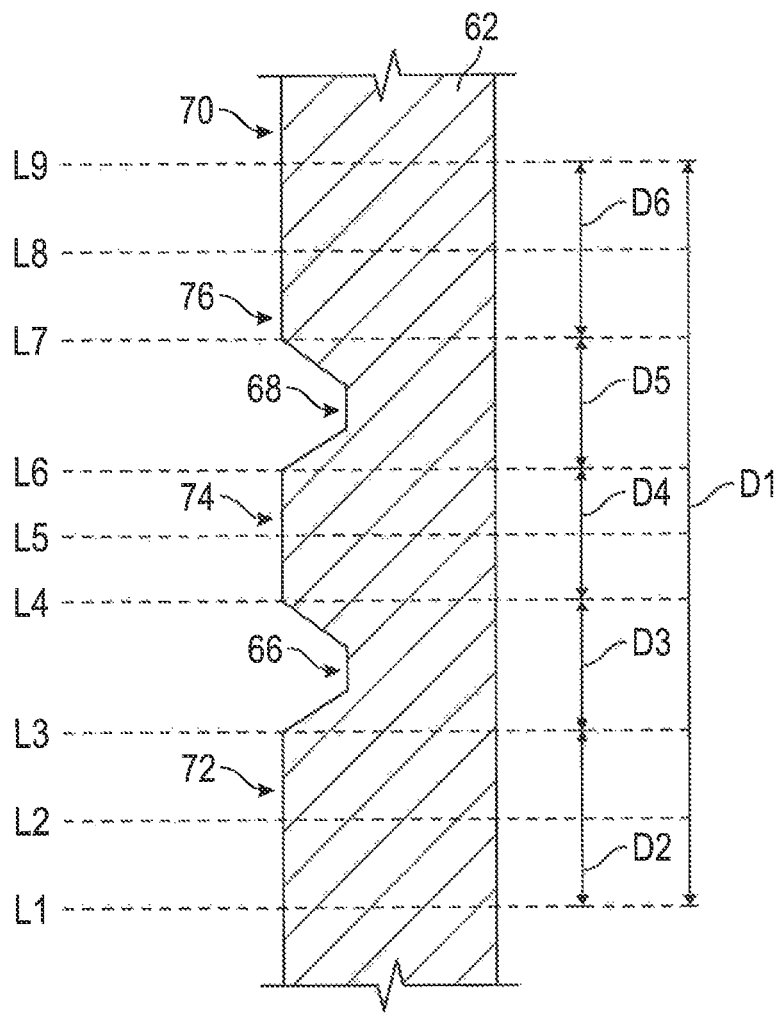
FIG. 4a is a detailed cross-sectional view of the outer wall of the pump assembly shown in FIG. 4.

As shown in FIG. 4a, the inner surface 70 of the outer wall 62 of the piston chamber forming body 48 has a number of axially spaced locations L1 to L9 where the sealing edge 92 is located at different times during the cycle of operation. At the start of the cycle of operation, when the piston body 50 is in the extended first position shown in FIG. 4, the sealing edge 92 is located axially adjacent to the inner surface 70 at location L1. During the first time period, as the sealing edge 92 moves along the first portion 72 of the inner surface 70 from location L1 to location L3, travelling distance D2, the air whistle 54 emits the first sound 28. During the first intermediate time period, as the sealing edge 92 moves axially adjacent to the first annular groove 66 from location L3 to location L4, travelling distance D3, the air whistle 54 emits little or no sound. During the second time period, as the sealing edge 92 moves along the second portion 74 of the inner surface 70 from location L4 to location L6, travelling distance D4, the air whistle 54 emits the second sound 30. During the second intermediate time period, as the sealing edge 92 moves axially adjacent to the second annular groove 68 from location L6 to location L7, travelling distance D5, the air whistle 54 again emits little or no sound. Finally, during the third time period, as the sealing edge 92 moves along the third portion 76 of the inner surface 70 from location L7 to location L9, travelling distance D6, the air whistle 54 emits the third sound 32. During the complete instroke movement, the sealing edge 92 moves from location L1 to location L9, travelling distance D1.

The actuator 700 is thus reciprocally movable in the cycle of operation between the first position and the second position with movement from the first position to the second position comprising a first stroke and movement from the second position to the first position comprising a second stroke.

The pump assembly 36 may also be operated with shortened or incomplete strokes. For example, the actuator panel 24 may sometimes only be partially depressed by a user, causing a partial instroke movement in which the piston body 50 does not reach the fully retracted second position shown in FIG. 8. The sealing edge 92 may, for example, only move from location L1 to location L6 during the partial instroke movement, causing the air whistle 54 to emit only the first 28 and second sounds 30. The partial instroke movement also causes the fluid displacement body 82 to move a shorter distance axially inward within the fluid chamber 60, thereby causing the fluid pump 35 of the pump assembly 36 to dispense a smaller dose of the fluid 26.

The pump assembly 36 may also be operated multiple times in a row, with incomplete outstroke movements in between. For example, after an initial complete instroke movement, the actuator panel 24 may not be fully released by the user, causing the second instroke movement to begin before the piston body 50 has had a chance to return to the extended first position shown in FIG. 4. The sealing edge 92 may, for example, only move from location L9 to location L4 during the incomplete outstroke movements. The subsequent instroke movements would thus only move from location L4 to location L9, causing the air whistle 54 to emit only the second 30 and third sounds 32, without emitting the first sound 28. Again, the amount of fluid 26 dispensed during these abbreviated instroke movements would be less than that dispensed during a complete instroke movement.

In accordance with the embodiment of FIGS. 1 to 9 the present invention provides a fluid dispenser 12 comprising: a fluid pump 35 for drawing fluid 26 from a reservoir 34 and dispensing the fluid 26 on movement of an actuator 700 in a cycle of operation in which the actuator 700 is reciprocally movable in the cycle of operation between a first position and a second position with movement from the first position to the second position comprising a first stroke and movement from the second position to the first position comprising a second stroke. The dispenser includes a sound generator mechanism 702 and an air pump 37. The sound generator mechanism 702 generates two sounds 28, 30 on movement of the actuator 700 in the cycle of operation in the first stroke with the sound generator mechanism 702 being configured to produce each sound 28, 30 from a respective one of two streams of air passing through the sound generator mechanism 702. The air pump 37 delivers both of the two streams of air through the sound generator mechanism 702 on movement of the actuator 700 in the cycle of operation in the first stroke. The sound generator mechanism 702 produces the two sounds 28, 30 as the actuator 700 is moved in the first stroke, with each sound 28, 30 produced in a different non-overlapping time period during the first stroke than the time period of the other sound 28, 30. The time period of each sound 28, 30 in the first stroke is a function of the relative location of the actuator 700 between the first position and the second position. The air pump 37 delivers both of the two streams of air, as well as a third stream of air, through the sound generator mechanism 702 on movement of the actuator 700 in the cycle of operation in the first stroke, and each of three sounds 28, 30 and 32 are produced each in a different non-overlapping time period during the first stroke. In the embodiment of FIGS. 1 to 9, the first stroke is an instroke movement from the position of FIG. 4 to the position of FIG. 8 and the air pump 37 forces air outwardly from the air chamber 64 through the whistle 54 in instroke movement of the first stroke. However, the arrangement shown in FIGS. 4 to 8 could be changed to provide the whistle 54 inverted so that the sounds 28, 30, 32 are generated during the outstroke movement when the air pump 37 draws air inwardly into the air chamber 64 through the whistle 54, instead of during the instroke movement. In particular, with the whistle 54 inverted, the vacuum that is generated within the air chamber 64 during the outstroke movement would draw the first, second, and third streams of air into the air chamber 64 through the whistle 54 to generate the first, second, and third sounds 28, 30, 32 as the sealing edge 92 moves along the third portion 76 of the inner surface 70, the second portion 74 of the inner surface 70, and the first portion 72 of the inner surface 70, respectively. As the sealing edge 92 moves past the first annular groove 66 and the second annular groove 68, atmospheric air would be drawn into the air chamber 64 through the air passage 94, thereby reducing or eliminating the flow of air through the whistle 54 between the first and second sounds 28, 30 and between the second and third sounds 30, 32. With the whistle 54 inverted, the first stroke during which the sounds 28, 30, 32 are generated is an outstroke movement from the position of FIG. 8 to the position of FIG. 4 and the air pump 37 draws air inwardly into the air chamber 64 through the whistle 54 in outstroke movement of this first stroke.

The operation of the compliance monitoring system 10 will now be described with reference to FIGS. 1 and 9 to 12. As shown schematically in FIG. 1, the sound sensing mechanism 14 is spaced from the fluid dispenser 12 in a facility where the monitoring of hand cleaning activities is desired, such as a hospital, clinic, long term care facility, restaurant, or day care. The sound sensing mechanism 14 incorporates a sound sensor 15 that is configured to detect the first 28, second 30, and third sounds 32 emitted by the air whistle 54 when the fluid dispenser 12 is activated. The sound sensing mechanism 14 is communicatively linked to the remote computer 16, and is configured to transmit data representative of the detected sounds 28, 30, 32 to the computer 16. The sound sensing mechanism 14 is preferably wirelessly connected to the computer 16 via a Wi-Fi connection or the like, but could also use a wired connection. The computer 16 may be located within the same facility as the sound detecting mechanism 14, or could be located in a different area altogether and connected to the sound sensing mechanism 14 through the internet.

Figure 9:
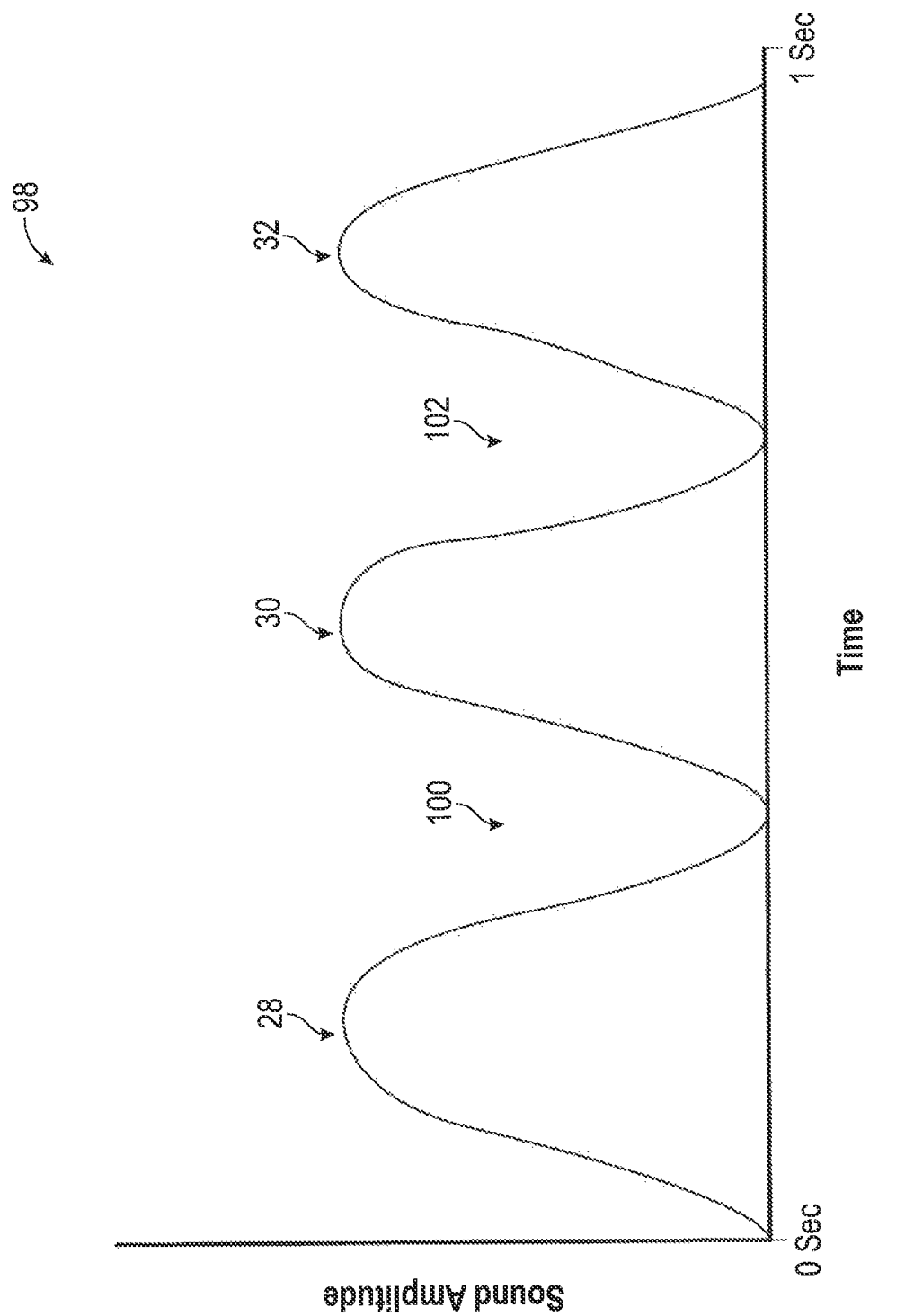
FIG. 9 is a line graph depicting the sound profile produced by the fluid dispenser shown in FIG. 1 during a normal speed instroke movement.
Figure 10:
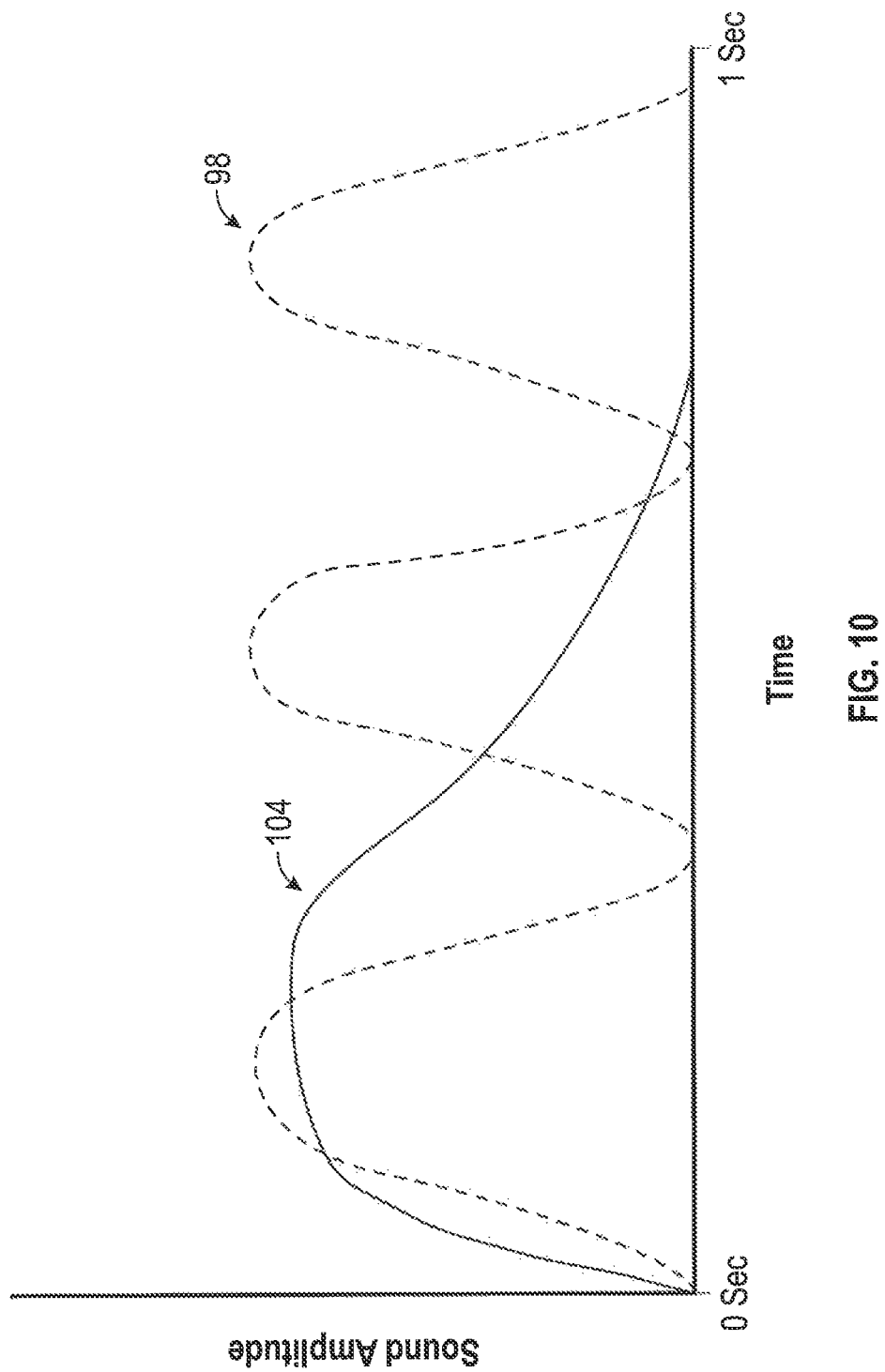
FIG. 10 is a line graph depicting the sound profile of an environmental sound produced in the vicinity of the sound sensing mechanism shown in FIG. 1, with the sound profile of FIG. 9 shown in dotted lines for comparison.
Figure 11:
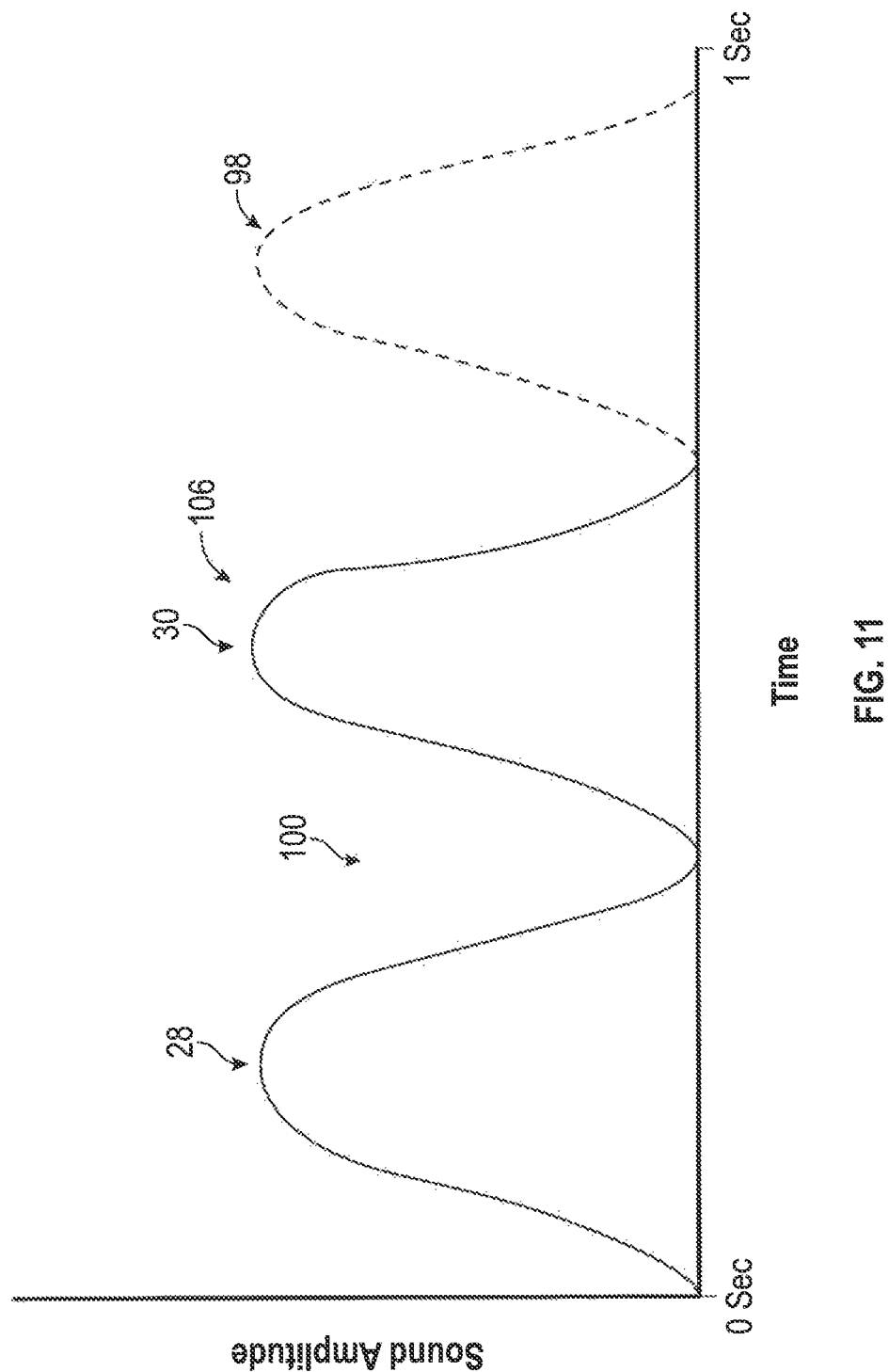
FIG. 11 is a line graph depicting the sound profile produced by the fluid dispenser shown in FIG. 1 during a partial instroke movement, with the sound profile of FIG. 9 shown in dotted lines for comparison.
Figure 12:
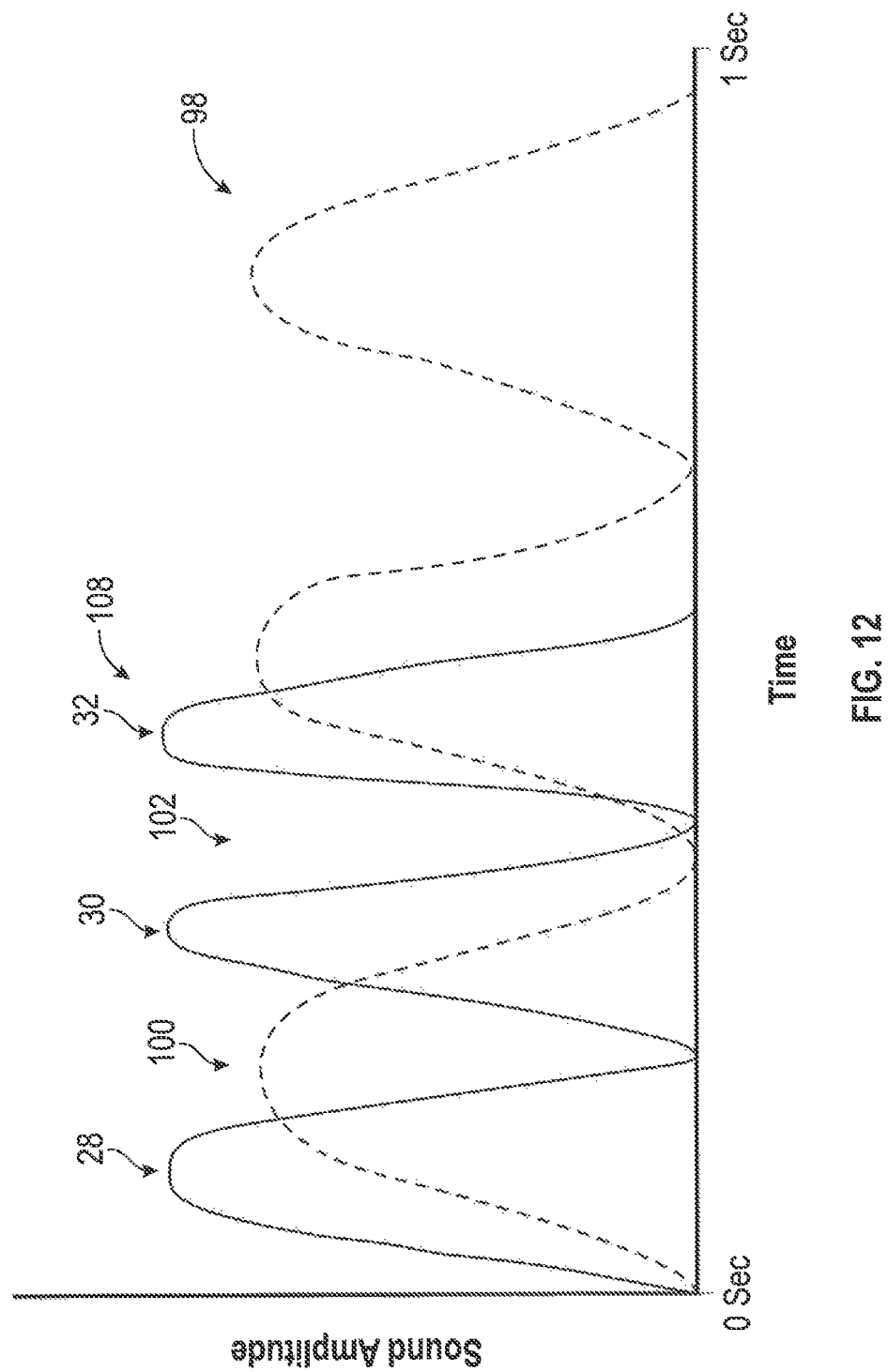
FIG. 12 is a line graph depicting the sound profile produced by the fluid dispenser shown in FIG. 1 during a rapid speed instroke movement, with the sound profile of FIG. 9 shown in dotted lines for comparison.

The computer 16 is configured to analyze the detection data transmitted by the sound sensing mechanism 14 in order to distinguish detection data that represents an activation of the fluid dispenser 12 from detection data that represents other environmental sounds detected by the sound sensing mechanism 14. As shown in FIG. 9, activation of the fluid dispenser 12 produces a distinct sound profile 98, consisting of the first 28, second 30, and third sounds 32 temporally spaced from one another, with first 100 and second quiet periods 102 in between. This distinctive sound profile 98 is used by the computer 16 to distinguish activations of the fluid dispenser 12 from other sounds, such as the environmental sound profile 104 shown in FIG. 10. This sound profile 104 could be produced, for example, by a cough, a toilet flushing, or a door closing in the vicinity of the sound sensing mechanism 14. Although the environmental sound profile 104 is coincidentally similar to a single one of the first 28, second 30, or third sounds 32, the fact that the profile 104 does not include multiple different sounds 28, 30, 32 that are temporally spaced, with quiet periods 100, 102 in between, allows the computer 16 to distinguish the environmental sound profile 104 from an activation of the fluid dispenser 12 relatively easily. As such, the computer 16 is able to accurately track activations of the fluid dispenser 12, and thus produce reliable compliance data.

The computer 16 can also distinguish activations of the fluid dispenser 12 from environmental sounds when the dispenser 12 is operated with shortened or incomplete strokes, without requiring the precise sound profile 98 shown in FIG. 9. For example, a partial depression of the actuator panel 24 producing the modified sound profile 108 shown in FIG. 11, in which the third sound 32 is omitted, could be distinguished from the environmental sound profile 104 shown in FIG. 10 based on the presence of distinct first 28 and second sounds 30, with quiet period 100 there between.

The nature of the sound profile 98 also allows the computer 16 to collect additional information about the use of the fluid dispenser 12. For example, the computer 16 can be configured to determine when the actuator panel 24 has only been partially depressed. This causes the piston body 50 of the pump assembly 36 to undertake only a partial instroke movement, as described above, thus dispensing a smaller allotment of the fluid 26 and potentially reducing the effectiveness of hand cleaning. Since the piston body 50 never reaches the second position when the actuator panel 24 is only partially depressed, the sealing edge 92 of the air displacement body 84 travels a shorter distance along the inner surface 70 of the outer wall 62. This causes the air whistle 54 to produce a modified sound profile 106. For example, if the sealing edge 92 does not move upwards from the second annular groove 98 during the partial instroke movement, then the air whistle 54 will not emit the third sound 32, producing the modified sound profile 106 shown in FIG. 10. The computer 16 can be configured to recognize the modified sound profile 106, and to calculate or estimate various parameters based on the resulting detection data. For example, the number and timing of the detected sounds 28, 30, 32 can be used to estimate the movement distance of the piston body 50. This, in turn, can be used to estimate the volume of fluid 26 that was dispensed.

There are many different ways that the fluid dispenser 12 could be operated, including different stroke movements producing different sound profiles 98, which the computer 16 can be programmed to recognize. For example, as described above, the dispenser 12 could be operated multiple times in a row, with partial outstroke movements after each instroke. If each instroke movement moves the sealing edge 92 from location L4 to location L9, then the resulting sound profile 98 will include the second 30 and third sounds 32, with the first sound 28 omitted. Alternatively, if each instroke movement moves the sealing edge 92 from location L5 to location L9, then the sound profile 98 will still include the second 30 and third sounds 32, but the second sound 30 will have a shorter duration. The computer 16 can be programmed to recognize these subtle variations in the sound profiles 98, and thus gather additional information about the operation of the dispenser 12.

The computer 16 can also be configured to determine the speed and forcefulness with which the actuator panel 24 has been depressed. If the actuator panel 24 is moved too quickly or too forcefully, this could potentially increase the wear on the fluid dispenser 12, requiring the dispenser 12 to be inspected or replaced earlier than usual. The speed with which the actuator panel 24 is depressed will affect the sound profile 98. For example, if the actuator panel 24 is moved in an instroke movement at a speed that is faster than a predetermined normal speed, then the sealing edge 92 of the air displacement body 84 will move along the inner surface 70 of the outer wall 62 more quickly. This causes the first 28, second 30, and third sounds 32 to be shorter and more closely spaced, producing the second modified sound profile 108 shown in FIG. 12. The movement of the air displacement body 84 in an instroke movement at the faster speed may furthermore increase the pressure within the air chamber 64 compared to that when the actuator panel 24 is moved at the predetermined normal speed, thus delivering streams of air through the air whistle 54 at higher pressures. This would, in at least some embodiments of the invention, alter the tone, amplitude, or other characteristics of the first 28, second 30, and third sounds 32. The computer 16 can be configured to recognize one or more of these effects in the detection data received from the sound sensing mechanism 14, and to calculate or estimate parameters such as the speed of the instroke movement or the pressure change within the air chamber 64 based thereon.

The speed of an instroke movement may remain constant throughout, or it may vary. For example, in embodiments of the invention that are touchlessly operated, the dispenser 12 may be configured to move the piston body 50 axially inwards at a constant pace during the instroke movement. In manually operated embodiments, such as the embodiment described above, the speed of the instroke movement will vary depending on the force that the user exerts on the actuator panel 24. If the speed of the instroke movement changes over the course of the instroke movement, this will produce a different sound profile 98 than if moved at a constant pace.

The computer 16 is programmed to recognize different sound profiles 98, even when the sound profiles 98 are not uniform. The computer 16 may, for example, be programmed to recognize a set of predetermined threshold parameters that are found in a wide range of possible sound profiles 98 as indicating that the dispenser 12 has been activated, the parameters being selected to nonetheless distinguish activations of the dispenser 12 from other environmental sounds.

In some embodiments of the invention, the computer 16 is able to determine whether the fluid reservoir 34 is empty based on the sound profiles 98 produced by dispenser 12 activations. For example, when the fluid reservoir 34 is empty, this may reduce the pressure within the fluid chamber 60, resulting in less resistance during the instroke movement. This may cause instroke movements to be, on average, faster than usual, producing a recognizable sound profile 98. The computer 16 can be programmed to recognize this modified sound profile 98, and, for example, alert maintenance personnel that the reservoir 34 needs to be replaced or refilled. Other recognizable sound profiles 98, such as might be produced by a rapid series of instrokes in a user's attempt to dispense the final drops of fluid 26 from a nearly empty dispenser 12, could also be used for this purpose.

In some embodiments, the computer 16 may be programmed to recognize individual users and/or types of users based on their sound profiles 98. For example, individual users may operate the dispenser 12 in a unique and recognizable manner that produces a distinct sound profile 98. A first user might, for example, always dispense two allotments of fluid 26 using two complete instroke movements, pressing the actuator panel 24 at a uniform and moderate pace. A second user might always dispense five allotments of fluid 26 using five partial instroke movements at a rapid pace. These uses of the dispenser 12 will produce different sound profiles 98, which could be used to associate the compliance data with particular individuals. The data could also be used to generate general information about how the dispenser 12 is used, including information about the frequency of partial strokes, rapid strokes, slow strokes, and multiple strokes.

The compliance monitoring system 10 would normally incorporate multiple fluid dispensers 12, multiple sound sensing mechanisms 14, and, in some embodiments, multiple computers 16. The system 10 could include, for example, a separate sound sensing mechanism 14 in each room of a monitored facility, each sound sensing mechanism 14 being positioned to detect the activation of multiple fluid dispensers 12 located nearby. The detection data from each sound sensing mechanism 14 could then be compiled by one or more computers 16 to produce compliance data representative of the entire facility. The data from the sound sensing mechanisms 14 could furthermore be combined with data from other compliance monitoring devices, such as hand cleaning devices that electronically record and transmit their own activation data.

Optionally, in some embodiments of the invention different fluid dispensers 12 could be configured to produce different sound profiles 98, so that the computer 16 could identify the specific fluid dispenser 12 that was activated based on the resulting detection data. For example, the system 10 could include both manually operated and touchlessly operated dispensers 12, with the touchlessly operated dispensers 12 producing recognizable sound profiles 98 because of their uniform and predictable instroke speeds, and thus being distinguishable from the sound profiles 98 of the manually operated dispensers 12. Being able to identify the specific dispenser 12 that has been activated allows the computer 16 to produce more specific compliance data. This data may be used, for example, to help determine whether an infrequently used dispenser 12 should be relocated or more prominently displayed.

In some embodiments of the invention, the actuation flange 42 is movable relative to the piston body 50, and can be secured to the body 50 at different axial heights relative to the sealing edge 92. For example, with reference to FIG. 7, the actuation flange 42 could be provided as a separate movable element that is threaded to the lower end of the piston body 50, rather than being integrally formed therewith as shown. In particular, the actuation flange 42 could be provided with a central opening about the axis 59, with a radially inwardly facing surface of the opening having a helical thread that extends radially towards the axis 59 for engagement with a complementary thread formed on the outer surface of the piston body 50. By turning the threaded actuation flange 42 in a clockwise or a counterclockwise direction about the axis 59, the actuation flange 42 could be displaced upwards or downwards relative to the piston body 50. The actuation flange 42 could then be locked in place at the selected axial height using a lock nut or the like.

By securing the actuation flange 42 at a different axial height, the location of the sealing edge 92 relative to the inner surface 70 of the outer wall 62 can be altered, thereby causing the dispenser 12 to produce a different sound profile 98 during activation. For example, if the actuation flange 42 is moved axially outwards relative to the sealing edge 92, then the edge 92 will sit at the higher location L2 when the piston body 50 is in the extended first position, rather than the lower location L1. This will cause the sealing edge 92 to move a reduced distance along the inner wall 70 during the instroke movement, from location L2 to location L9 instead of from location L1 to location L9. As a result, the sound profile 98 will be different, including a shorter first sound 28, which may also have a lower amplitude and a lower frequency because the air chamber 64 has less time to pressurize before the sealing edge 92 reaches the first annular groove 66.

By securing the actuation flange 42 at different heights in different dispensers 12 throughout the monitored facility, the dispensers 12 can be made to produce different sound profiles 98 when activated. This would allow the computer 16 to identify the specific dispenser 12 that has been activated, and thereby produce more specific compliance data as described above. Other modifications could be used to achieve much the same effect, such as by adjusting the support assembly 38 so that the movable seat 40 cycles through a different set of heights during the activation of different dispensers 12. Touchlessly operated dispensers 12 could also be configured to move the piston body 50 at different speeds, to produce uniquely identifiable sound profiles 98.

Although one exemplary sound generating pump assembly 36 has been described in detail in the first embodiment, it is to be appreciated that any alternative constructions that produce at least two sounds during activation of the pump assembly 36 could be used instead. For example, the axial length and axial spacing of the first annular groove 66 and the second annular groove 68 could be varied so as to produce first 28, second 30, and third sounds 32 that differ from one another in terms of their duration, temporal spacing, and other characteristics such as tone and amplitude.

Figure 13:
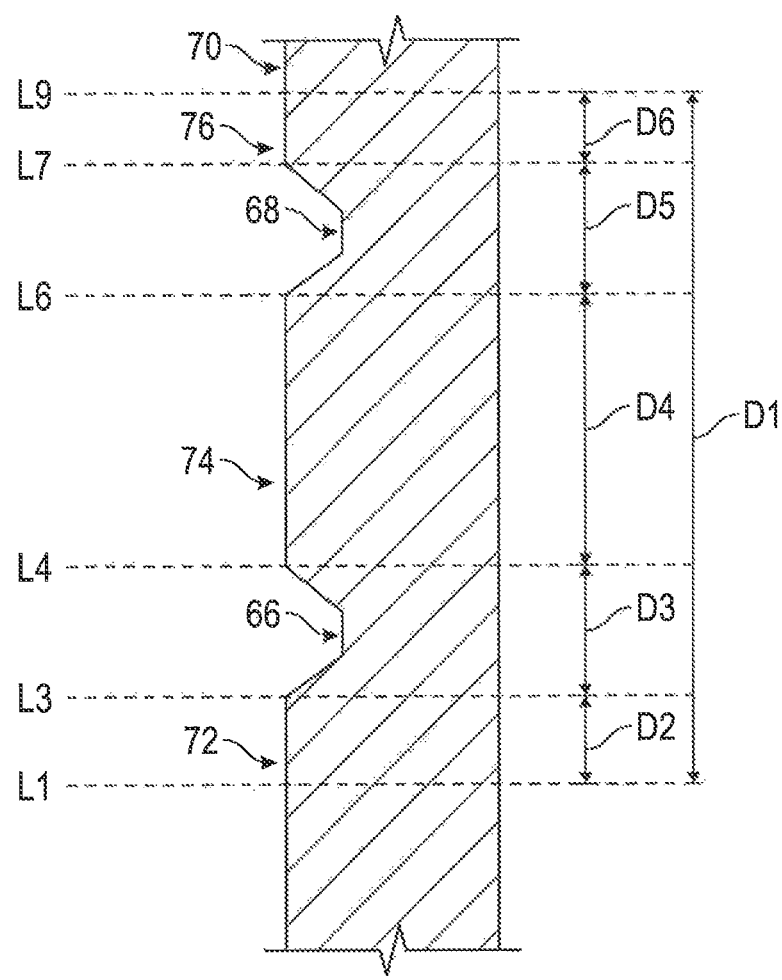
FIG. 13 is a detailed cross-sectional view of the outer wall of a pump assembly in accordance with a second embodiment of the invention.
Figure 14:
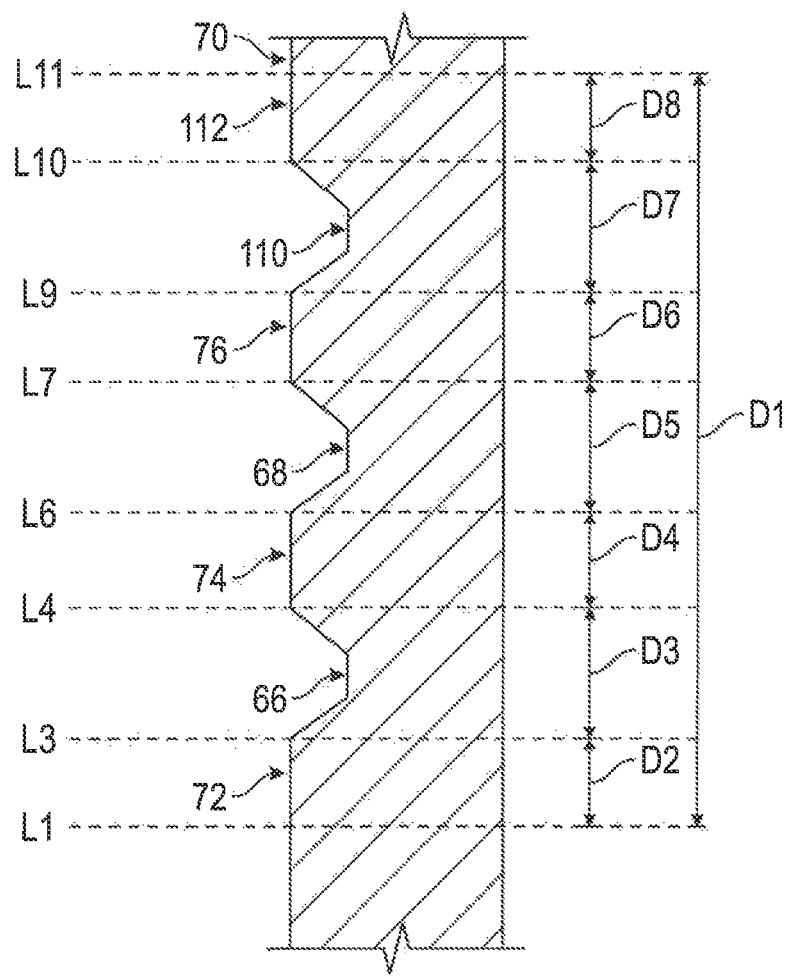
FIG. 14 is a detailed cross-sectional view of the outer wall of a pump assembly in accordance with a third embodiment of the invention.
Figure 15:
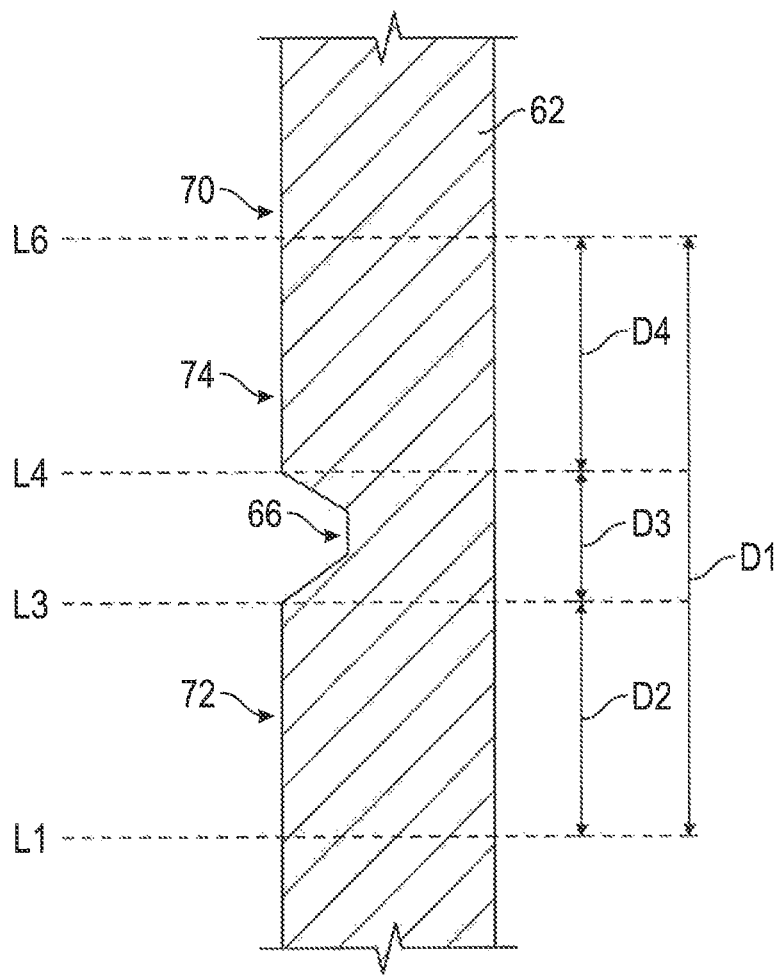
FIG. 15 is a detailed cross-sectional view of the outer wall of a pump assembly in accordance with a fourth embodiment of the invention.

Reference is made, for example, to the second, third, and fourth embodiments of the invention as shown in FIGS. 13, 14, and 15, respectively. These embodiments correspond identically to the first embodiment described above, with the exception that the spacing and configuration of the inner surface 70 of the outer wall 62 has been modified. Like numerals are used to identify like features.

Figure 16:
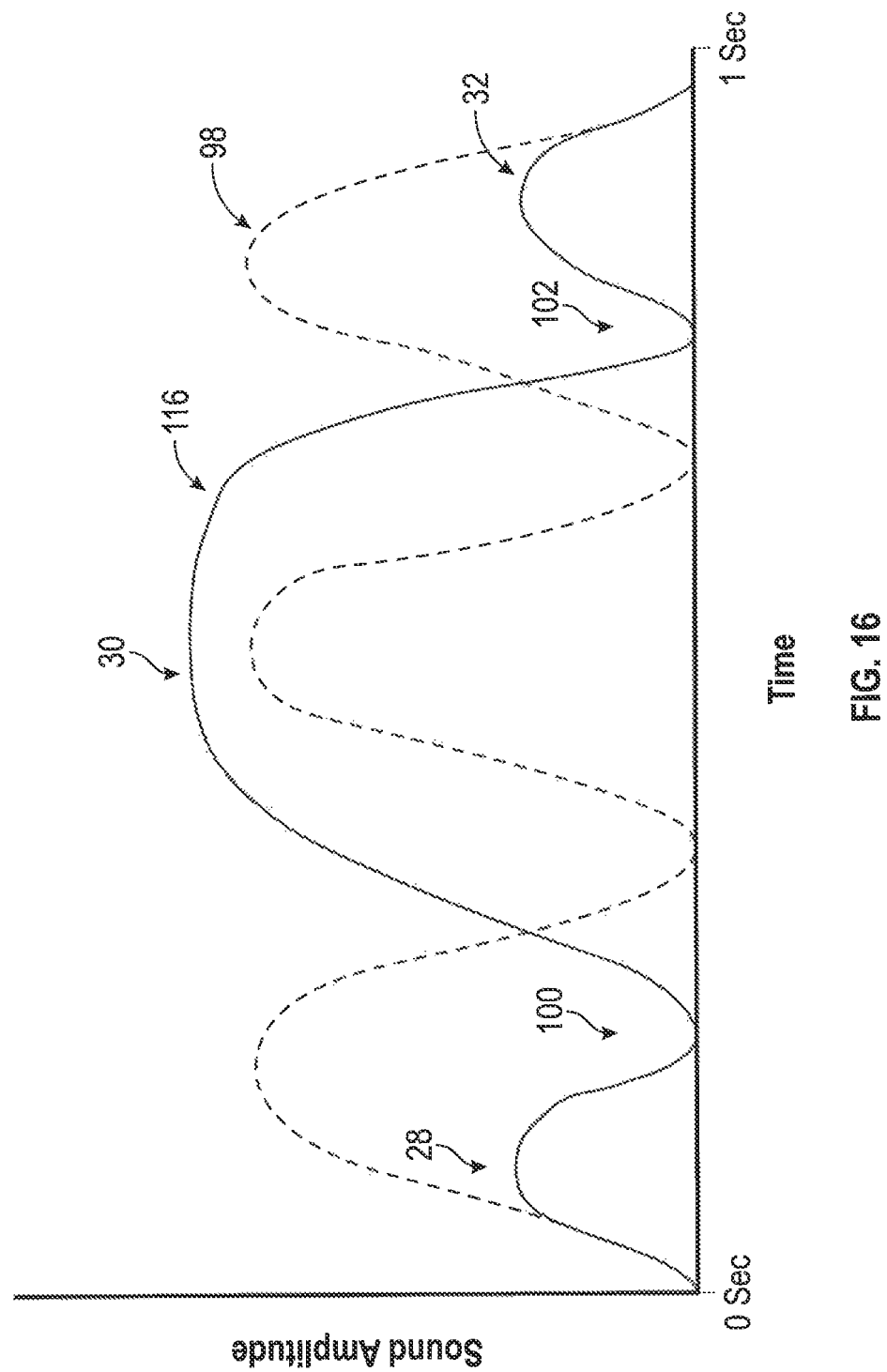
FIG. 16 is a line graph depicting the sound profile produced by the pump assembly shown in FIG. 13, with the sound profile of FIG. 9 shown in dotted lines for comparison.

In the second embodiment shown in FIG. 13, the first annular groove 66 has been relocated axially outwards, and the second annular groove 68 has been relocated axially inwards. This configuration of the grooves 66, 68 shortens the distance D2 that the sealing edge 92 travels along the first portion 72 of the inner surface 70 when moving from location L1 to location L3 during the instroke movement. It also increases the distance D4 between location L4 and location L6, and decreases the distance D6 between location L7 and location L9. This causes the fluid dispenser 12 to produce a second sound profile 116, shown in FIG. 16, which differs from the sound profile 98 produced by the first embodiment.

In particular, the shortened distance D2 causes the first sound 28 to have a shorter duration than in the first embodiment. Furthermore, since the sealing edge 92 reaches the first annular groove 66 earlier than in the first embodiment, the air within the air chamber 64 does not become as pressurized as in the first embodiment. This causes the first sound 28 to have a lower sound amplitude. The lengthened distance D4 likewise causes the second sound 30 to have a longer duration and a higher amplitude, while the shortened distance D6 causes the third sound 32 to have a shorter duration and a lower amplitude, in comparison with the first embodiment.

Figure 17:
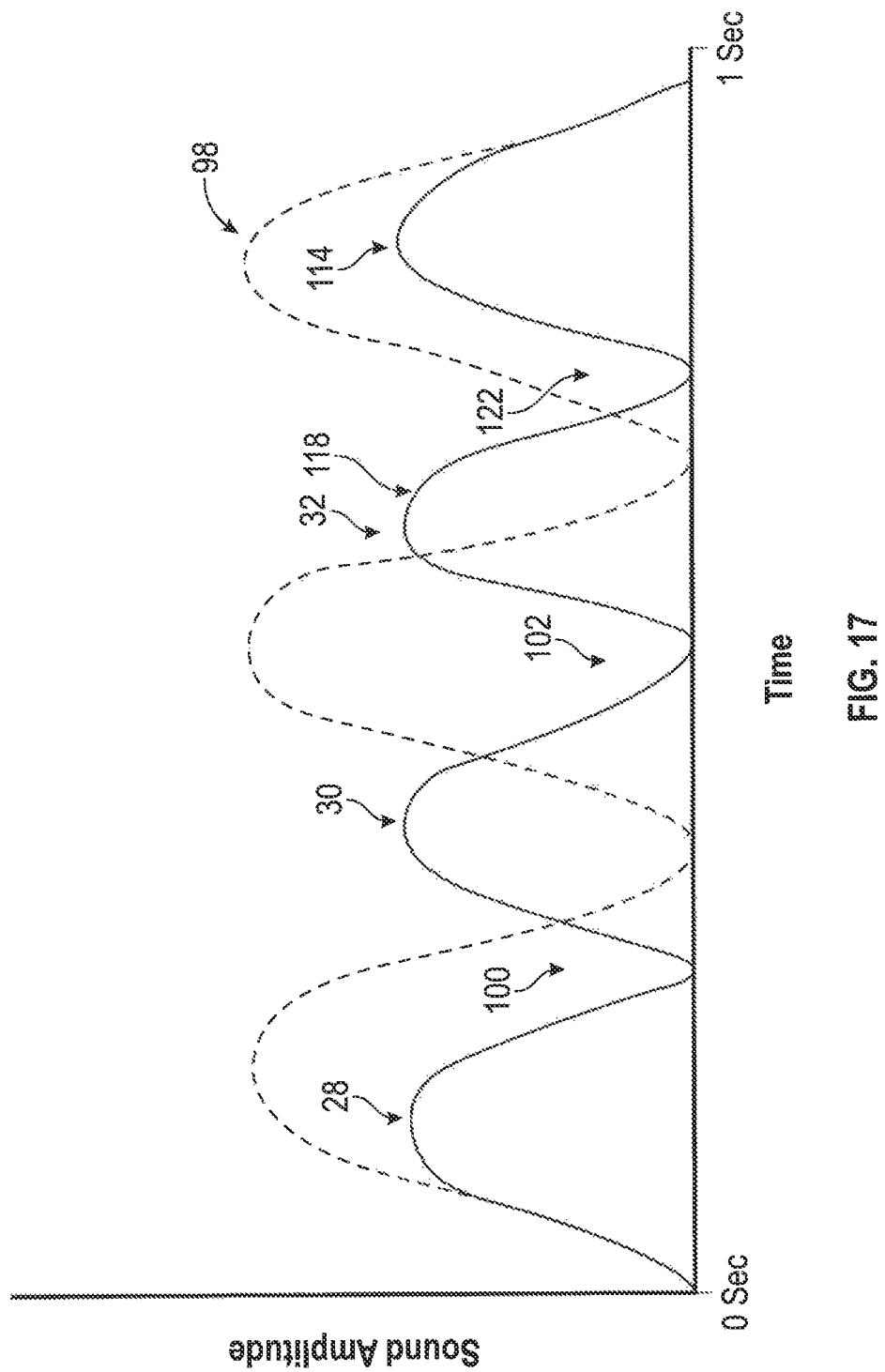
FIG. 17 is a line graph depicting the sound profile produced by the pump assembly shown in FIG. 14, with the sound profile of FIG. 9 shown in dotted lines for comparison.

In the third embodiment shown in FIG. 14, a third annular groove 110 has been added, and the first 66 and second annular grooves 68 have been relocated axially outwards and positioned closer together. This configuration shortens the distances D2, D4, and D6, and further divides the inner surface 70 of the outer wall 62 into a fourth portion 112, located above the third annular groove 110. During the instroke movement, the sealing edge 92 moves axially inwards and upwards along the inner surface 70 of the outer wall 62 from location L1 to location L11, producing the third sound profile 118 shown in FIG. 17.

As the sealing edge 92 moves from location L1 to location L9, the pump assembly 36 produces the first 28, second 30, and third sounds 32, in a similar manner as in the first embodiment, with the shortened distances D2, D4, and D6 causing the first 28, second 30, and third sounds 32 to have a shortened duration and lower amplitude than in the first embodiment. When the sealing edge 92 reaches and moves axially past the fourth annular groove 110 from location L9 to location L10, travelling distance D7, the air whistle 54 again emits little or no sound, producing the third quiet period 122 shown in FIG. 17. As the sealing edge 92 continues moving axially inwards and upwards along the fourth portion 112 of the inner surface 70 from location L10 to location L11, travelling distance D8, the air whistle 54 emits a fourth sound 114. Additional grooves could also be added to cause the pump assembly 36 to emit additional sounds.

Figure 18:
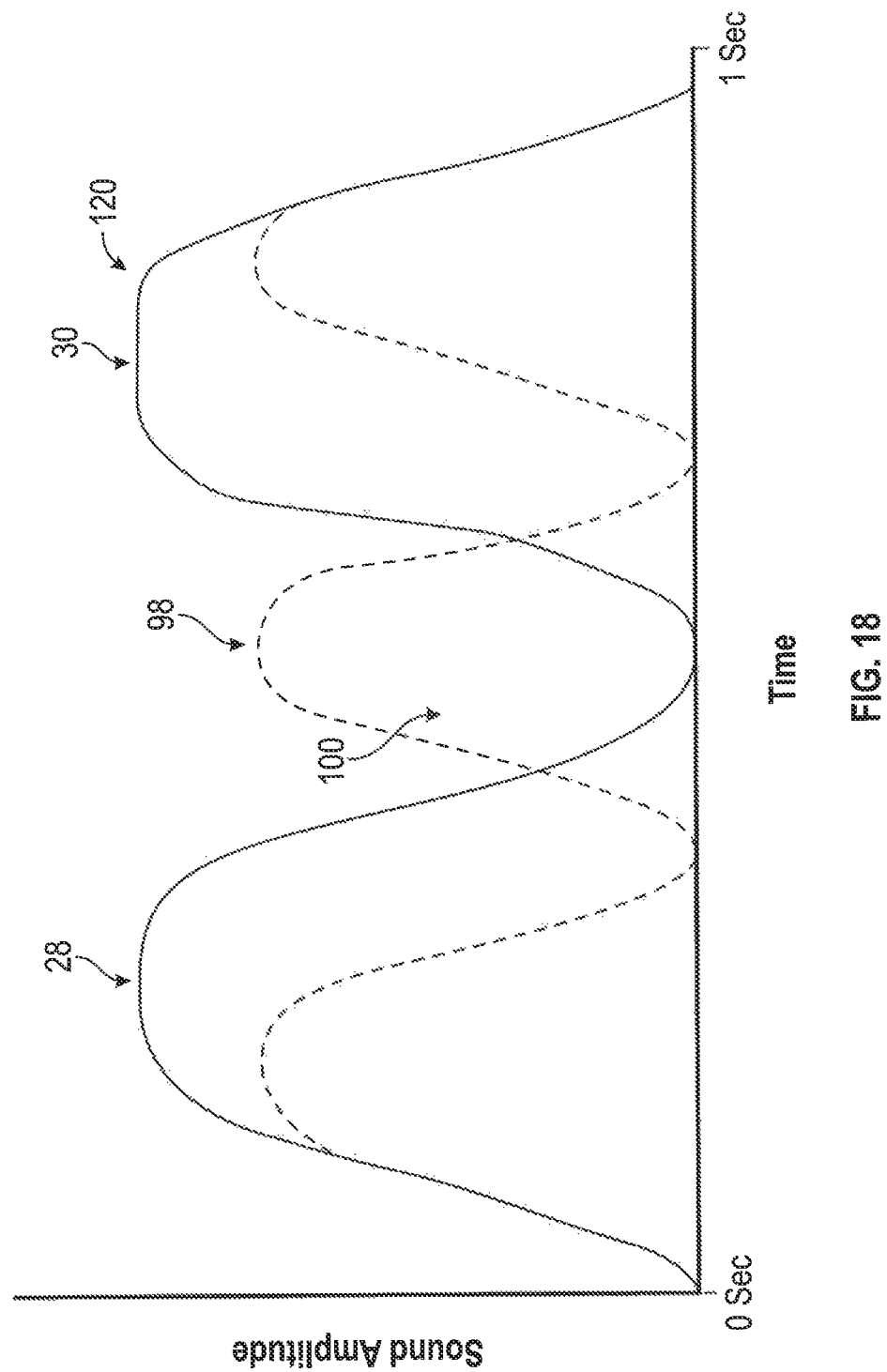
FIG. 18 is a line graph depicting the sound profile produced by the pump assembly shown in FIG. 15, with the sound profile of FIG. 9 shown in dotted lines for comparison.
Figure 19:
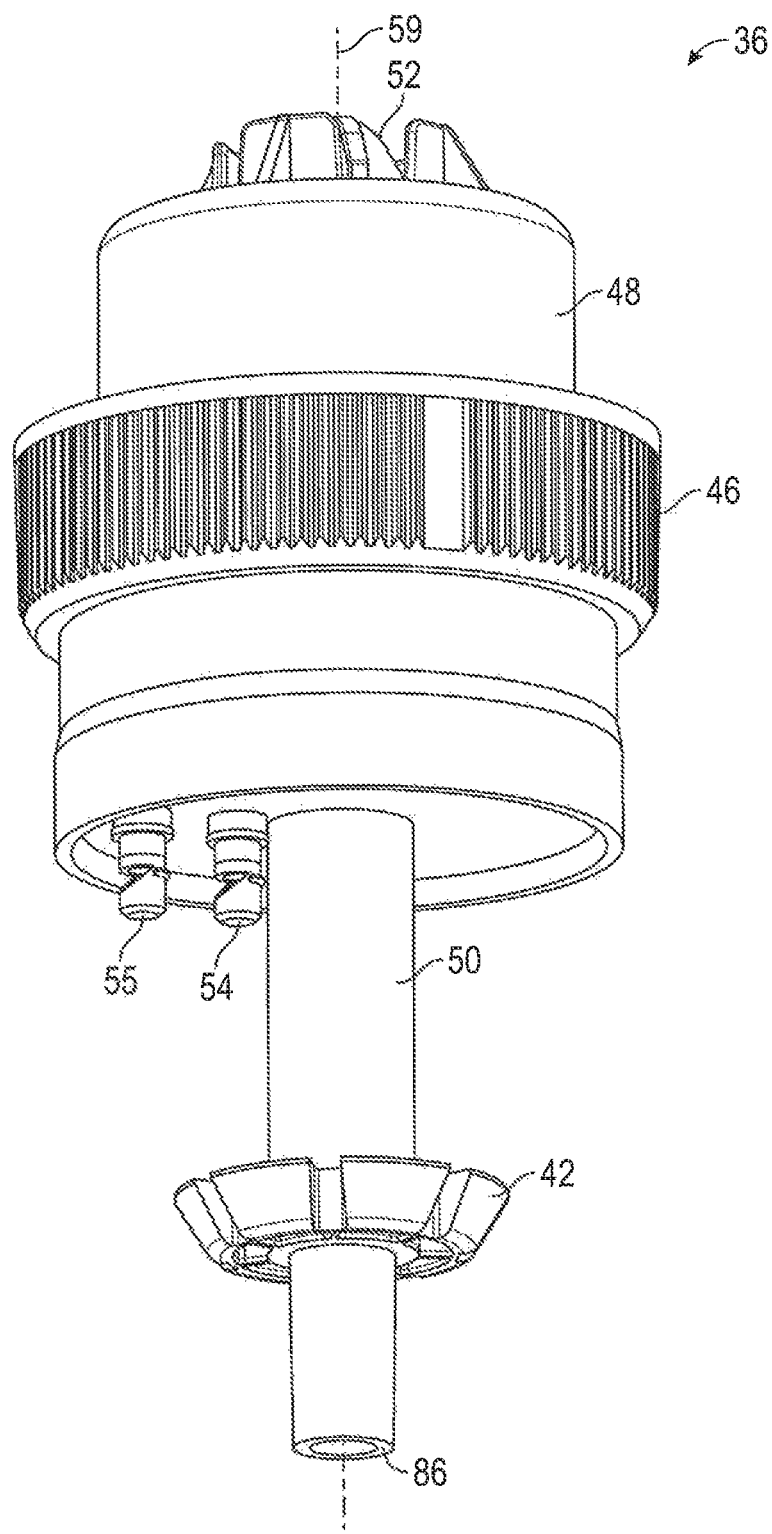
FIG. 19 is a perspective view of a pump assembly in accordance with a fifth embodiment of the invention.

The number of grooves could also be reduced, as in the fourth embodiment shown in FIG. 15. In the fourth embodiment, the second annular groove 68 has been removed, and the first annular groove 66 has been relocated axially inwards. This configuration lengthens the distances D2 and D4, and causes the pump assembly 36 to emit only the first 28 and second sounds 30, producing the fourth sound profile 120 shown in FIG. 18. The lengthened distances D2 and D4 cause the first 28 and second sounds 30 to have a longer duration and a higher amplitude than in the first embodiment.

These and other variations could be combined together for use a single compliance monitoring system 10, with different dispensers 12 having different configurations of the inner surface 70, such as the configurations of the first, second, third, and fourth embodiments described above, so that each dispenser 12 in a given area produces a distinct sound profile 98, 116, 118, or 120. This would allow the computer 16 to identify the specific dispenser 12 that was activated in a given area based on the detection data, and thus allow the computer 16 to produce more detailed compliance data.

Other constructions which, for example, expel air during the outstroke movement instead of the instroke movement could also be used. For example, the piston chamber forming body 48 could be configured so that the air chamber 64 expands during the instroke movement and contracts during the outstroke movement. This could be achieved, for example, by defining the air chamber 64 axially outwards and downwards from the sealing edge 92, so that the instroke movement of the sealing edge 92 expands the air chamber 64 instead of compressing it. Other constructions that would be apparent to those skilled in the art could also be used. The air whistle 54 could also be configured to emit the first 28, second 30, and third sounds 32 while the air is moving into the air chamber 64 through the whistle 54, instead of while the air is being expelled. This could be achieved, for example, by reversing the orientation of an air whistle 54 that only produces sounds when air flows through the whistle 54 in a single direction, or by using an air whistle 54 that produces sounds when air flows through the whistle 54 in either direction.

The fluid dispenser 12 could use any sound generating device that emits a sound when a stream of air passes therethrough, such as edge-blown aerophones, reed aerophones, pea whistles, pealess whistles, and ultrasonic whistles. The invention is not limited to any particular sound generating device, nor to any particular sounds produced thereby. In some embodiments of the invention the sound generating device may produce high pitched sounds, low pitched sounds, constant pitched sounds, variable pitched sounds, loud sounds or quiet sounds. The sound generator can produce a sound that is audible to human ears and/or a sound that is inaudible to human ears, each of which can be detected by the sound sensing mechanism 14.

Although the line graph shown in FIG. 9 depicts the instroke movement as having a duration of approximately one second, the invention is in no way limited to this duration. Different users may push the actuator panel 24 at significantly different speeds, causing the instroke movement to be much shorter or much longer than one second. The computer 16 is preferably configured to recognize a wide range of sound profiles 98 corresponding to different instroke speeds and durations, so as to produce accurate compliance data. In some embodiments of the invention, a typical duration of the instroke movement may be much longer or much shorter than 1 second.

The fluid dispenser 12 is not limited to the specific construction that has been described and illustrated herein. Any fluid dispenser 12 that is operable to produce at least two sounds while dispensing fluid 26 could be used instead. Although the pump assembly 36 has been described and illustrated as having a construction similar to the pump disclosed in U.S. Pat. No. 5,373,970 to Ophardt, other constructions such as those described in U.S. Pat. No. 8,816,860 to Ophardt et al., issued Aug. 26, 2014; U.S. Pat. No. 8,976,031 to Ophardt, issued Mar. 10, 2015; U.S. Patent Application Publication No. 2016/0097386 to Ophardt et al., published Apr. 7, 2016; U.S. Patent Application Publication No. 2016/0256015 to Ophardt et al., published Sep. 8, 2016; U.S. Pat. No. 7,984,825 to Ophardt et al., issued Jul. 26, 2011; U.S. Pat. No. 8,684,236 to Ophardt, issued Apr. 1, 2014; U.S. Pat. No. 5,836,482 to Ophardt et al., issued Nov. 17, 1998; U.S. Pat. No. 8,113,388 to Ophardt et al., issued Feb. 14, 2012; and U.S. Patent Application Publication No. 2015/0190827 to Ophardt et al., published Jul. 9, 2015, which are incorporated herein by reference, could be used instead. Although the invention has been described as using a piston-type pump assembly 36 incorporating a piston fluid pump 35 and a piston air pump 37, other types of pumps such as diaphragm pumps could be used.

An example of an alternative construction is the fifth embodiment of the invention shown in FIGS. 19 to 22, which provides a fluid pump 35 and two air pumps 37 and 137. The pump assembly 36 shown in FIGS. 19 to 22 is identical to the pump assembly 36 shown in FIG. 4, except for the following notable differences: the grooves 66, 68 are omitted; the outer wall 62 of the piston chamber forming body 48 has a lower section 144 that extends downwardly from the gripping collar 46; the piston body 50 includes both a first air displacement body 84 and a second air displacement body 85; and the piston body 50 uses two distinct air whistles 54 and 55 to produce the first 28 and second 30 sounds, respectively. Like numerals are used to identify like features.

Figure 20:
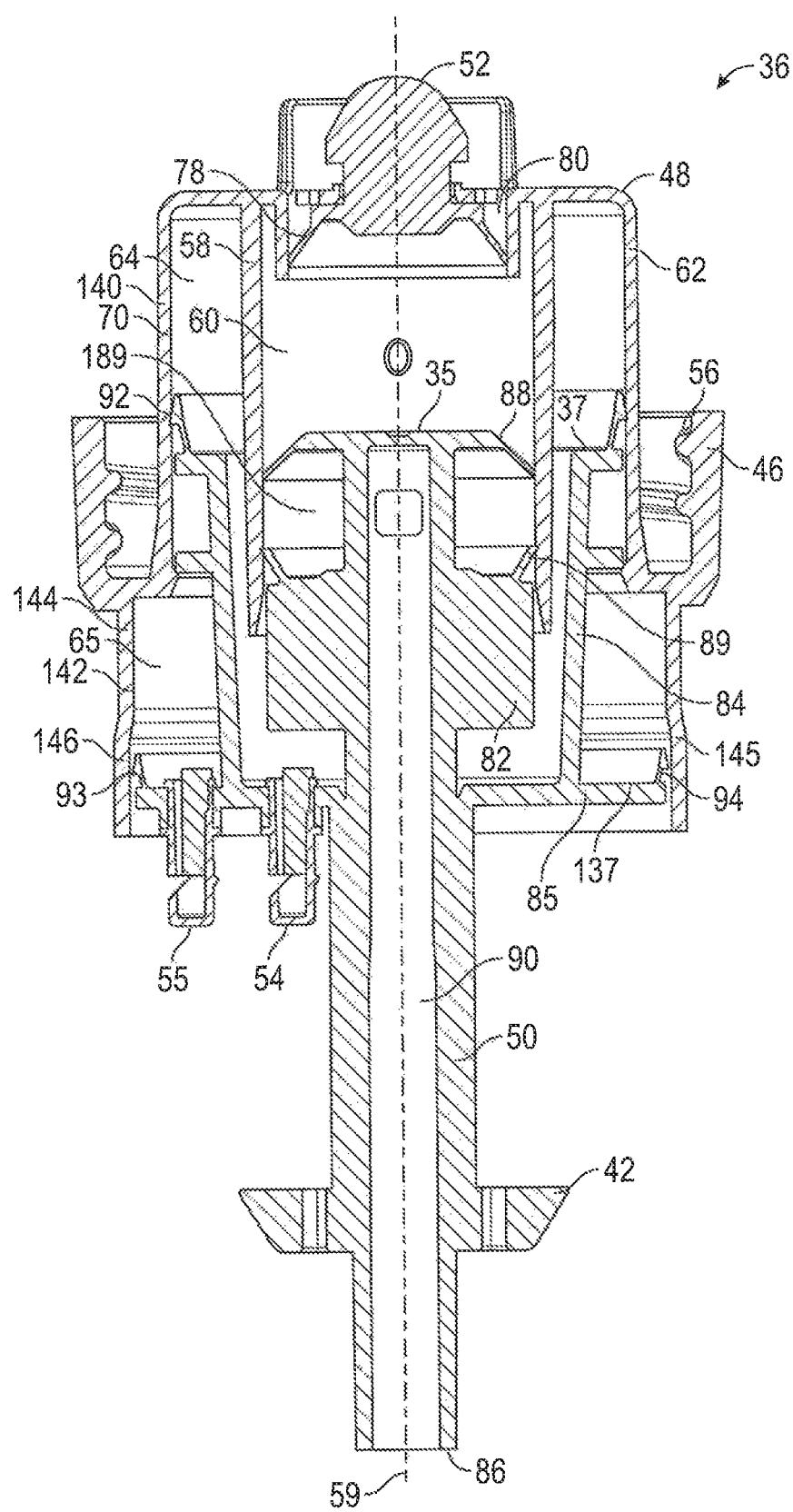
FIG. 20 is a cross-sectional view of the pump assembly shown in FIG. 19, with the pump shown in an extended first position.

As shown in FIG. 20, the piston chamber forming body 48 forms two distinct air chambers 64 and 65. The first annular air chamber 64 is defined between the inner wall 58 of the piston chamber forming body 48 and an upper section 140 of the outer wall 62, and is in fluid communication with the first air whistle 64. The second annular air chamber 65 is defined between the lower section 144 of the outer wall 62 and the first air displacement body 84, and is in fluid communication with the second air whistle 65. The outer wall 62 of the piston chamber forming body 48 has a stepped construction, with the upper section 140 being stepped radially inwardly relative to the lower section 144. The lower section 144 has a sealing portion 142 and an unsealing portion 146, with a sloped transition portion 145 there between. The outer wall 62 has a larger diameter in the unsealing portion 146 than in the sealing portion 142, similarly to the grooves 66, 68 in the first embodiment of the invention shown in FIG. 4.

The piston body 50 has two air displacement bodies 84 and 85 for displacing the air within the first air chamber 64 and the second air chamber 65, respectively, and also respectively forming the first air pump 37 to draw and discharge air through the first air whistle 54 and the second air pump 137 to draw and discharge air through the second air whistle 55. The first air displacement body 84 extends upwards towards the upper section 140 of the outer wall 62 and has a first sealing edge 92 that is configured to sealingly engage with the inner surface 60 of the upper section 140. The second air displacement body 85 extends radially outwardly from the first air displacement body 84 towards the lower section 144 of the outer wall 62 and has a second sealing edge 93. The second sealing edge 93 is configured to sealingly engage with the inner surface 60 of the lower section 144 when the second sealing edge 93 is located axially adjacent to the sealing portion 142 of the lower section 144, and to disengage from the inner surface 60 of the lower section 144 when the second sealing edge 93 is arranged axially adjacent to the unsealing portion 146.

Figure 21:
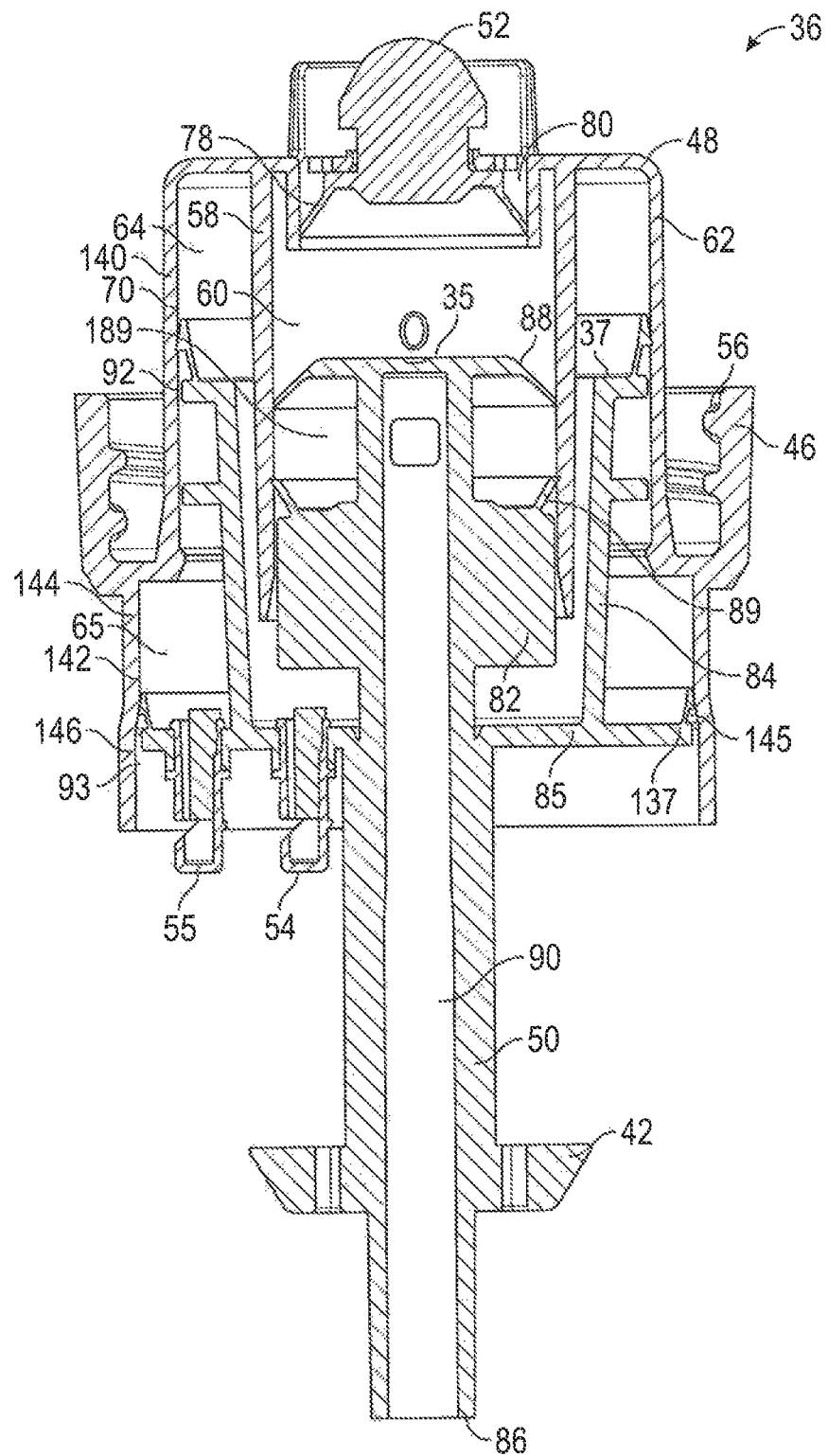
FIG. 21 is a cross-sectional view of the pump assembly shown in FIG. 19, with the pump shown in an intermediate position during an instroke movement.
Figure 22:
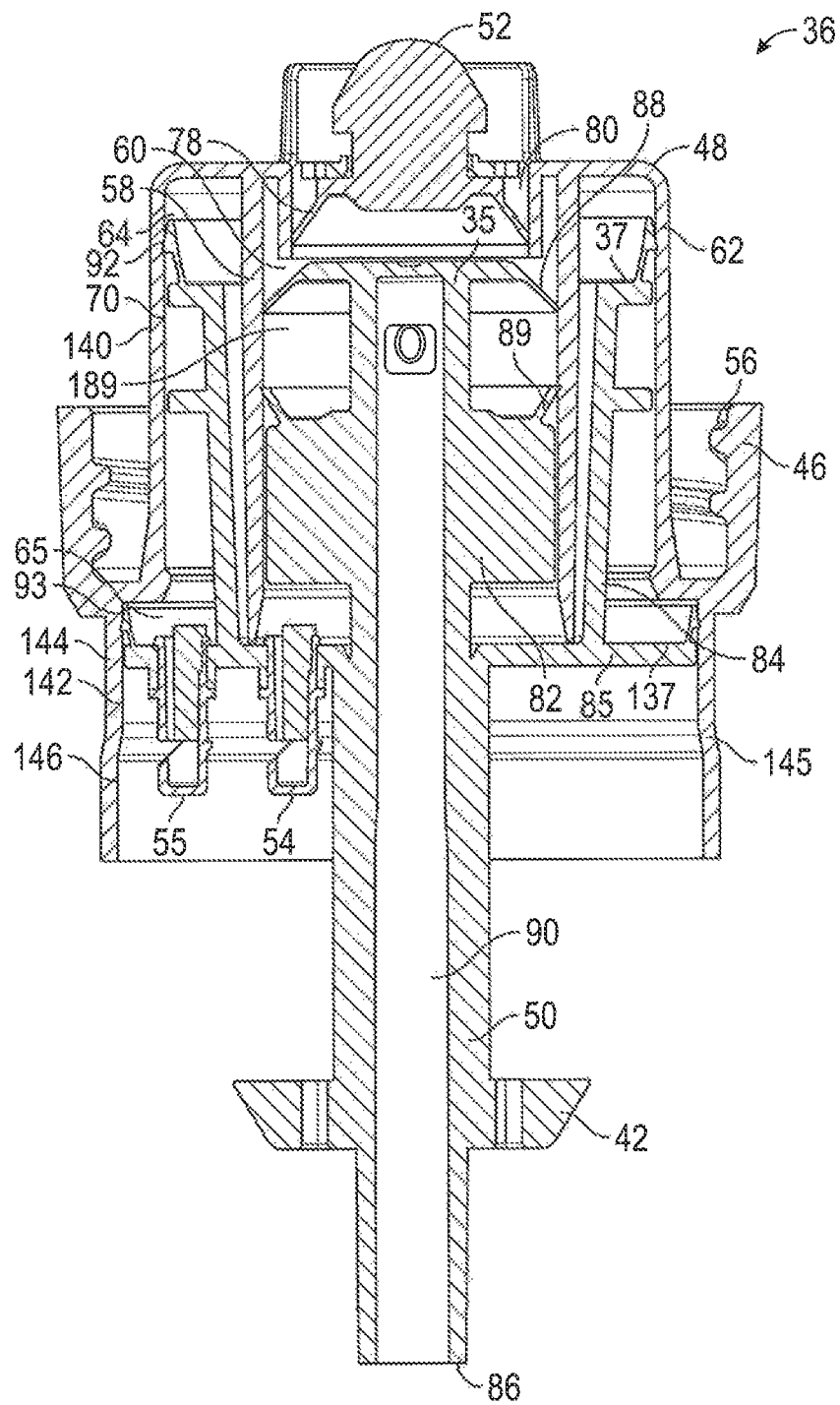
FIG. 22 is a cross-sectional view of the pump assembly shown in FIG. 19, with the pump shown in a retracted second position.

The pump assembly 36 can be used for dispensing fluid 26 from a housing 18 similar to the one shown in FIG. 1. Prior to activation, the pump assembly 36 is in the extended first position shown in FIG. 20, with fluid 26 contained within the fluid chamber 60 and air contained within the first air chamber 64 and the second air chamber 65. When the actuator panel 24 is pressed by a user, the piston body 50 moves coaxially inwardly and upwards relative to the piston chamber forming body 48 in an instroke movement, as in the previous embodiments. This moves the fluid displacement body 82 upwards and axially inwardly within the fluid chamber 60; moves the first air displacement body 84 upwards and axially inwardly within the first air chamber 64; and moves the second air displacement body 85 upwards and axially inwardly within the second air chamber 65, as shown in FIG. 21.

As in the previous embodiments, the upwards movement of the fluid displacement body 82 within the fluid chamber 60 pressurizes the fluid 26 and forces the fluid 26 out through the fluid outlet 86.

The upwards movement of the first air displacement body 84 within the first air chamber 64 also pressurizes the air within the first air chamber 64, thus delivering a first stream of pressurized air though the first air whistle 54, and causing the first air whistle 54 to emit the first sound 28. As the upper section 140 of the outer wall 62 has a uniform diameter, the first sealing edge 92 remains engaged with the inner surface 70 of the upper section 140 during the entire instroke movement. The first air whistle 54 therefore emits the first sound 28 during a first time period that spans the entire instroke movement, as the piston body 50 moves from the extended first position shown in FIG. 20 to the retracted second position shown in FIG. 22.

When the piston body 50 is at the extended first position shown in FIG. 20, the second sealing edge 93 is located axially adjacent to the unsealing portion 146 of the lower section 144 of the outer wall 62. As such, the air within the second air chamber 65 does not substantially pressurize during movement of the piston body 50 from the extended first position to the intermediate position shown in FIG. 21, since the air displaced by the upward movement of the second air displacement body 85 escapes from the second air chamber 65 through the air passage 94 defined between the second sealing edge 93 and the inner surface 70 of the outer wall 62. This results in a relatively low flow of air through the second air whistle 55 during an intermediate time period in which the piston body 50 moves from the first position to the intermediate position, causing the second air whistle 55 to emit little or no sound during the intermediate time period.

When the piston body 50 reaches the intermediate position shown in FIG. 21, the second sealing edge 93 engages with the inner surface 70 of the sealing portion 142 of the lower section 144 of the outer wall 62. This closes the air passage 94, and causes the air within the second air chamber 65 to pressurize during a second time period as the piston body 50 moves from the intermediate position to the retracted second position shown in FIG. 22. The upwards movement of the second air displacement body 85 during the second time period thus delivers a second stream of air through the second air whistle 55, causing the second air whistle 55 to emit the second sound 30.

During the outstroke movement, fluid 26 enters the fluid chamber 60 through the inlet valve 52; air enters the first air chamber 64 through the first air whistle 54; and air enters the second air chamber 65 through the second air whistle 55 and the air passage 94, similarly to the previously described embodiments.

Figure 23:
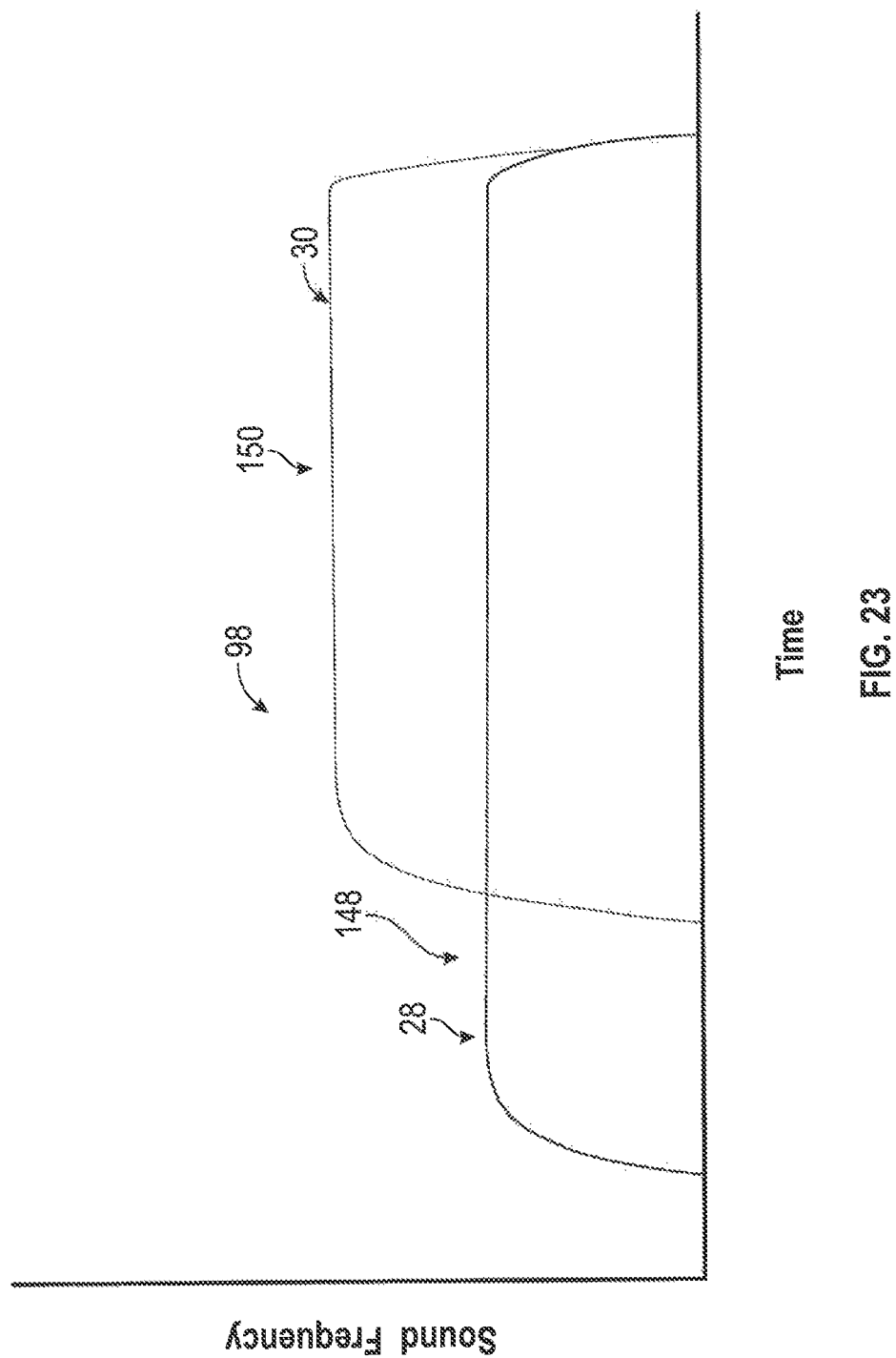
FIG. 23 is a line graph depicting the sound profile produced by the pump assembly shown in FIG. 19 during an instroke movement.
Figure 24:
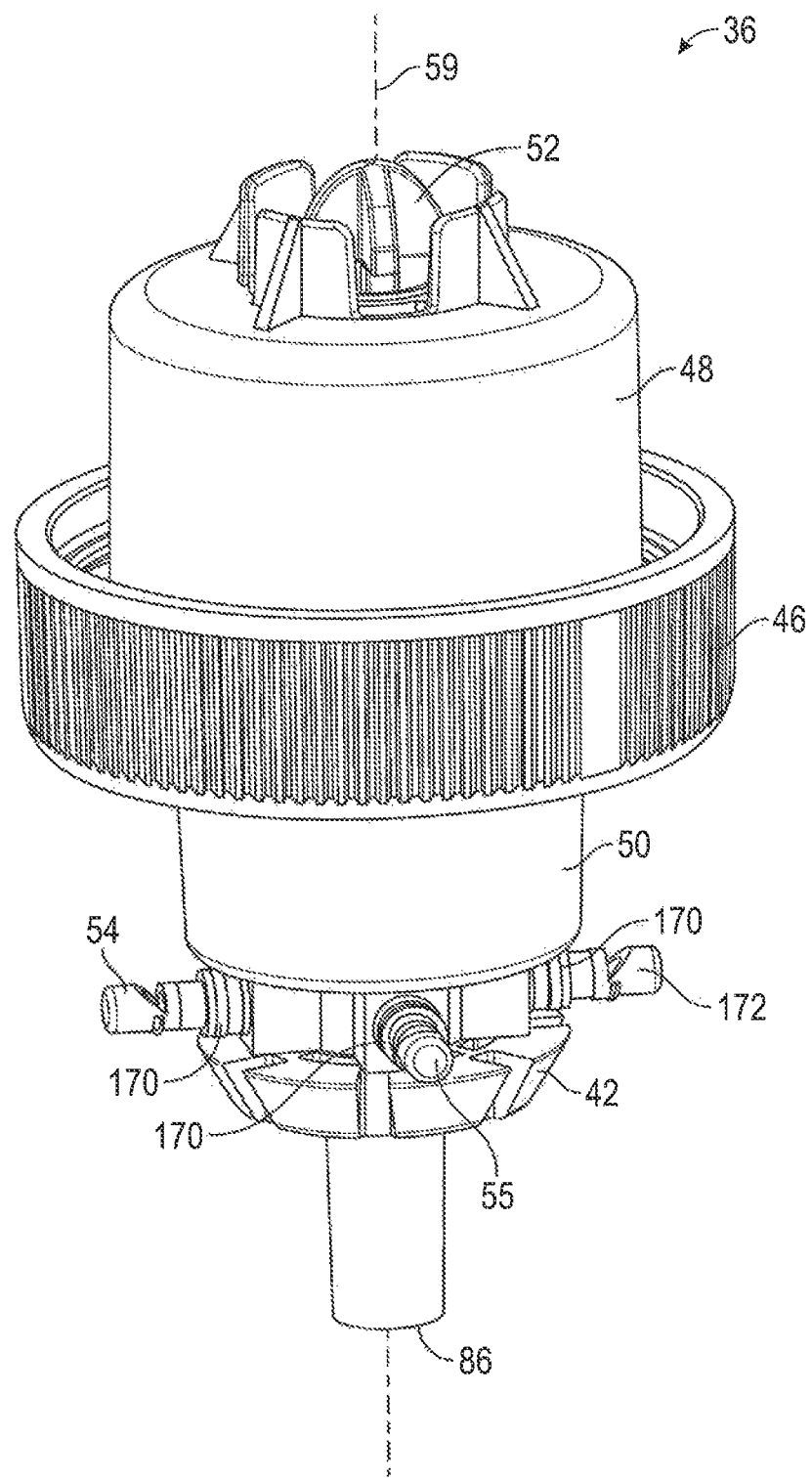
FIG. 24 is a perspective view of a pump assembly in accordance with a sixth embodiment of the invention, configured to incorporate four air whistles.

The sound profile 98 produced by the pump assembly 36 is shown in FIG. 23. As shown, the first sound 28 and the second sound 30 differ from one another in their sound frequency (tone), their duration, and their temporal alignment. In particular, the first air whistle 54 is configured to produce a first sound 28 that has a lower frequency than the second sound 30 produced by the second air whistle 55. In a full stroke operation, the first sound 28 also starts earlier than the second sound 30, producing a sound profile 98 that has a distinct first segment 148 during which only the first sound 28 is produced (corresponding to the intermediate time period in which the piston body 50 moves from the first position to the intermediate position) and a second segment 150 in which both the first sound 28 and the second sound 30 are produced (corresponding to the second time period in which the piston body 50 moves from the intermediate position to the second position). Both the first sound 28 and the second sound 30 end at approximately the same time at the end of the second segment 150, when the piston body 50 reaches the retracted second position.

This distinctive sound profile 98 serves as a unique signature that can be recognized by a sound sensing mechanism 14 for compliance monitoring, as in the previously described embodiments. In particular, the sound profile's 98 distinctive characteristics, including the two distinct sounds 28, 30, their frequencies, their durations, and their temporal alignment permit activation of the pump assembly 36 to be readily distinguished from other noises. As such, this embodiment of the invention shares many of the advantages of the previously described embodiments. Furthermore, since this embodiment of the invention uses two air whistles 54, 55 instead of only one, the pump assembly 36 can be readily configured to produce multiple sounds 28, 30 that differ from one another. For example, the two whistles 54, 55 can be constructed to produce different tones by giving them a different size and/or shape. The resulting two-toned sound profile 98 provides a unique sound signature that is readily identified by the sound sensing mechanism 14 and/or computer 16. The whistles 54, 55 could also be constructed to produce sounds 28, 30 that differ in other detectable sound characteristics, such as timbre.

The pump assembly 36 could furthermore be adapted to produce sound profiles 98 that differ from the exemplary profile 98 shown in FIG. 23. For example, the unsealing portion 146 of the lower section 144 of the outer wall 62 could be omitted, so that the second sound 30 starts at the same time as the first sound 28. Other modifications, such as adding annular grooves 66, 68, 70 to the upper and/or lower sections 140, 144 of the outer wall 62; adding additional air chambers 64, 65 and/or air whistles 54, 55; and using air whistles 54, 55 that produce sounds 28, 30 with different frequencies would also change the resulting sound profile 98. One or more of these and other modifications could be used to cause the first sound 28 and the second sound 30 to have less temporal overlap; to have more temporal overlap; to have different durations and/or frequencies; and to add additional sounds 54, 55 to the sound profile 98.

An alternative construction of the pump assembly 36 in accordance with a sixth embodiment of the invention is shown in FIGS. 24 to 31 having a fluid pump 35 and one air pump 37. This embodiment is generally similar to the first embodiment, but incorporates multiple air whistles 54, 55, 172, 174 to produce multiple sounds 28, 30, 32, 114 simultaneously rather than grooves 66, 68 to produce them sequentially. Like numerals are used to denote like features.

Figure 25:
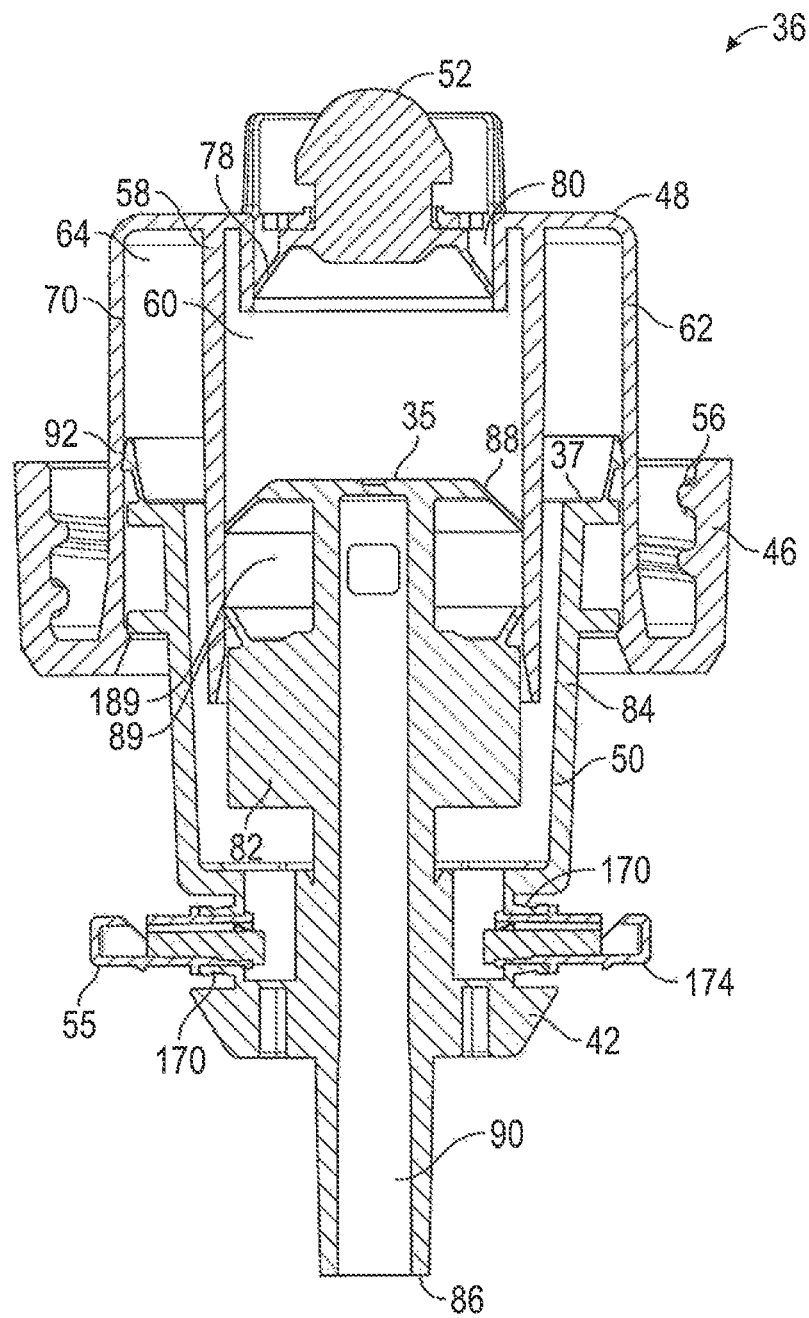
FIG. 25 is a cross-sectional view of the pump assembly shown in FIG. 24.

In this embodiment of the invention, the piston body 50 includes four modular ports 170 in fluid communication with the air chamber 64. The modular ports 170 extend laterally outwards from the piston body 50 and are angled 45 degrees from one another about the axis 59 (only three ports 170 are visible in FIG. 24). Each port 170 has a size and shape that is selected to receive and engage with any one of a set of modular components during manufacturing. In the configuration shown in FIGS. 24 and 25, four modular air whistles 54, 55, 172, 174 have been inserted into the ports 170 during manufacturing of the pump assembly 36. As shown in FIG. 25, when received within the ports 170, each of the air whistles 54, 55, 172, 174 is in fluid communication with the air chamber 64.

The pump assembly 36 can be used for dispensing fluid 26 from a housing 18 similar to the one shown in the first embodiment of the invention. When activated, the piston body 50 moves coaxially inwardly and upwards relative to the piston chamber forming body 48 in an instroke movement, as in the previously described embodiments. This moves the fluid displacement body 82 upwards and axially inwardly within the fluid chamber 60 and moves the air displacement body 84 upwards and axially inwardly within the air chamber 64. As in the previous embodiments, the upwards movement of the fluid displacement body 82 within the fluid chamber 60 pressurizes the fluid 26 and forces the fluid 26 out through the fluid outlet 86.

The upwards movement of the air displacement body 84 within the air chamber 64 also pressurizes the air within the air chamber 64, thus delivering a first stream of pressurized air though the first air whistle 54, a second stream of pressurized air through the second air whistle 55, a third stream of pressurized air through the third air whistle 172, and a fourth stream of pressurized air through the fourth air whistle 174. This causes the first air whistle 54 to emit the first sound 28, the second air whistle 55 to emit the second sound 30, the third air whistle 172 to emit the third sound 32, and the fourth air whistle 174 to emit the fourth sound 114. Assuming that the air displacement body 84 is moved with sufficient speed to provide the air pressure required for the whistles 54, 55, 172, 174 to emit their sounds 28, 30, 32, 114 during the entire instroke movement, the first, second, third, and fourth sounds 28, 30, 32, 114 are emitted simultaneously during the entire instroke movement. During the outstroke movement, fluid 26 enters the fluid chamber 60 through the inlet valve 52 and air enters the air chamber 64 through the first, second, third, and fourth air whistles 54, 55, 172, 174.

As best shown in FIG. 32, the air whistles 54, 55, 172, 174 are each configured to emit a sound 28, 30, 32, 114 with a different sound frequency. Activation of the pump assembly 36 at a typical or normal speed thus produces a recognizable sound profile 200 in which all four sounds 28, 30, 32, 114 are emitted simultaneously at different, predetermined frequencies. This distinctive sound profile 200 can be recognized by a sound sensing mechanism 14 or computer 16 for compliance monitoring, as in the previous embodiments. Having more than two sounds 28, 30, each with a different frequency, helps to further distinguish the sound profile 200 from other environmental noises, and thus makes it easier for the computer 16 to accurately monitor compliance.

Figure 33:
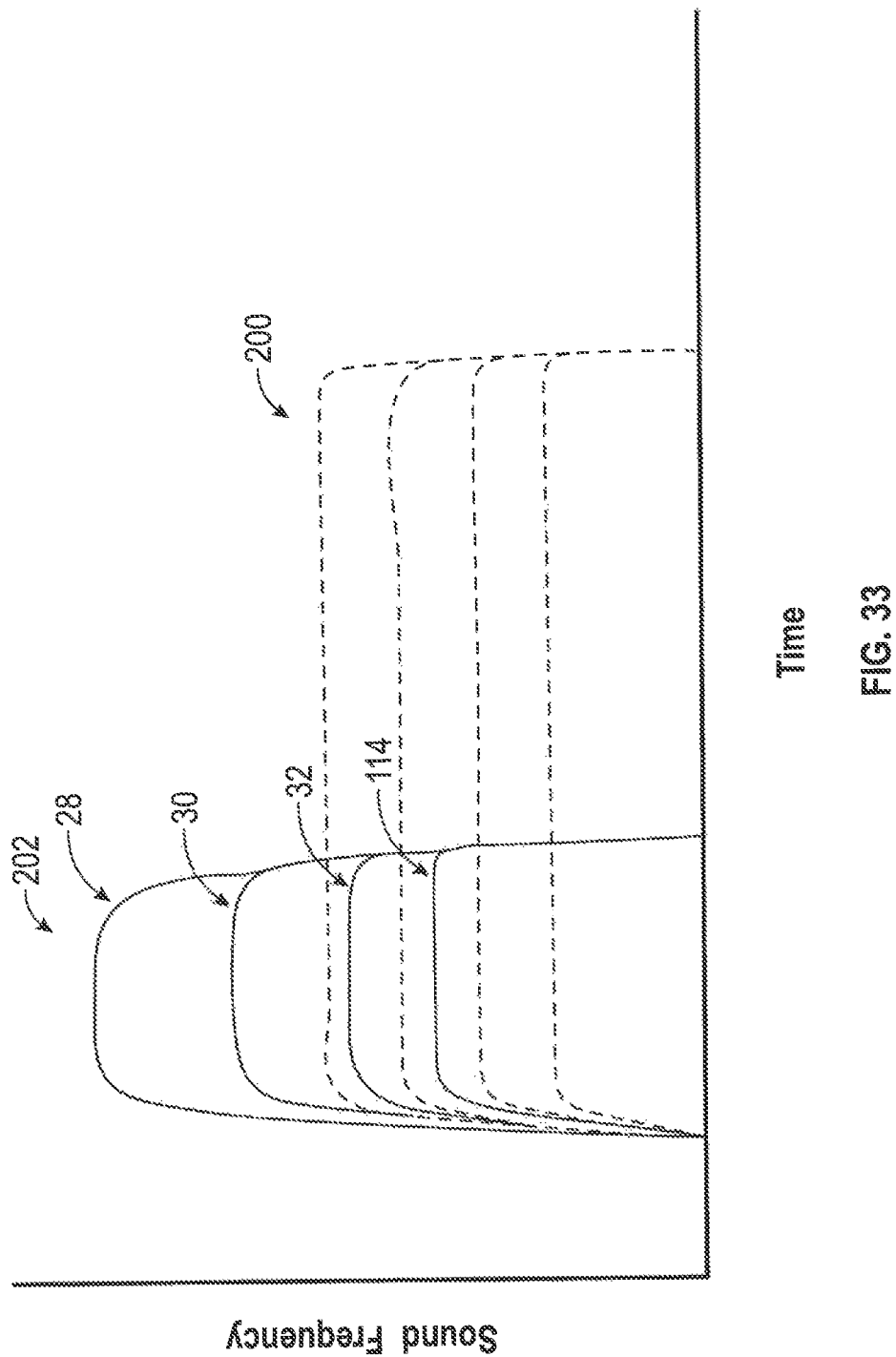
FIG. 33 is a line graph depicting the sound profile produced by the pump assembly shown in FIG. 24 during a rapid speed instroke movement, with the sound profile of FIG. 32 shown in dotted lines for comparison.

When the pump assembly 36 is activated very rapidly, as might occur if a user presses the actuator panel 24 vigorously, the sharp increase in air pressure within the air chamber 64 can cause the pump assembly 36 to emit a modified sound profile 202, shown in FIG. 33. In particular, very high pressure within the air chamber 64 can, in some circumstances, cause the four sounds 28, 30, 32, 114 to shift to a higher pitch/frequency. The rapid instroke movement can also cause the sounds 28, 30, 32, 114 to have a shorter duration. The presence of multiple different sounds 28, 30, 32, 114 with different frequencies, pitches and/or durations can help the computer 16 to recognize the modified sound profile 202 as an activation of the pump assembly 36.

One or more of the air whistles 54, 55, 172, 174 can optionally be replaced with a modular pressure stabilizer 175. For example, in the configuration shown in FIG. 26, a modular pressure relief valve 176 has been inserted into one of the ports 170 in place of the first air whistle 54. The pressure relief valve 176 has a generally cylindrical valve chamber forming body 600 with an open attachment end 602 and an open air release end 604. The open attachment end 602 is configured to attach to the outside of the port 170 with a snap fit. The open air release end 604 has a central opening 606 that is surrounded circumferentially by a bearing wall 608. The valve chamber forming body 600 defines an internal valve chamber 610 in which there is arranged a spring 612 and a stop member 614. The stop member 614 has a sloped stopping surface 616 that is configured to sealingly engage with the port 170, and a bearing flange 618 that faces away from the stopping surface 616. The spring 612 extends between the bearing wall 608 of the valve chamber forming body 600 and the bearing flange 618 of the stop member 614, and is configured to bias the stopping surface 616 into sealing engagement with the port 170.

The spring 612 is configured to maintain the stopping surface 616 in sealing engagement with the port 170 until a preselected threshold pressure is reached within the air chamber 64. When the pressure within the air chamber 64 is below the preselected threshold, the sealing engagement of the stopping surface 616 with the port 170 prevents the air within the air chamber 64 from escaping through the pressure relief valve 176. When the preselected pressure is reached or exceeded, the air pressure within the air chamber 64 is sufficient to overcome the bias of the spring 612, and the stop member 614 moves away from and out of sealing engagement with the port 170. The pressurized air is thus able to escape from the air chamber 64 via the pressure relief valve 176 by passing from the port 170 into the valve chamber 610 and out through the central opening 606.

The pressure relief valve 176 is thus configured to release air from the air chamber 64 when the air pressure within the air chamber 64 exceeds the preselected threshold. This helps to maintain the pressure within the air chamber 64 at or below the preselected threshold, and thus acts to moderate fluctuations in the sounds 30, 32, 114 produced by the air whistles 55, 172, 174 when the pump assembly 36 is activated at different velocities. Optionally, the pressure relief valve 176 could be formed as a resiliently flexible molded valve rather than the spring-loaded valve shown in FIG. 26.

Figure 34:
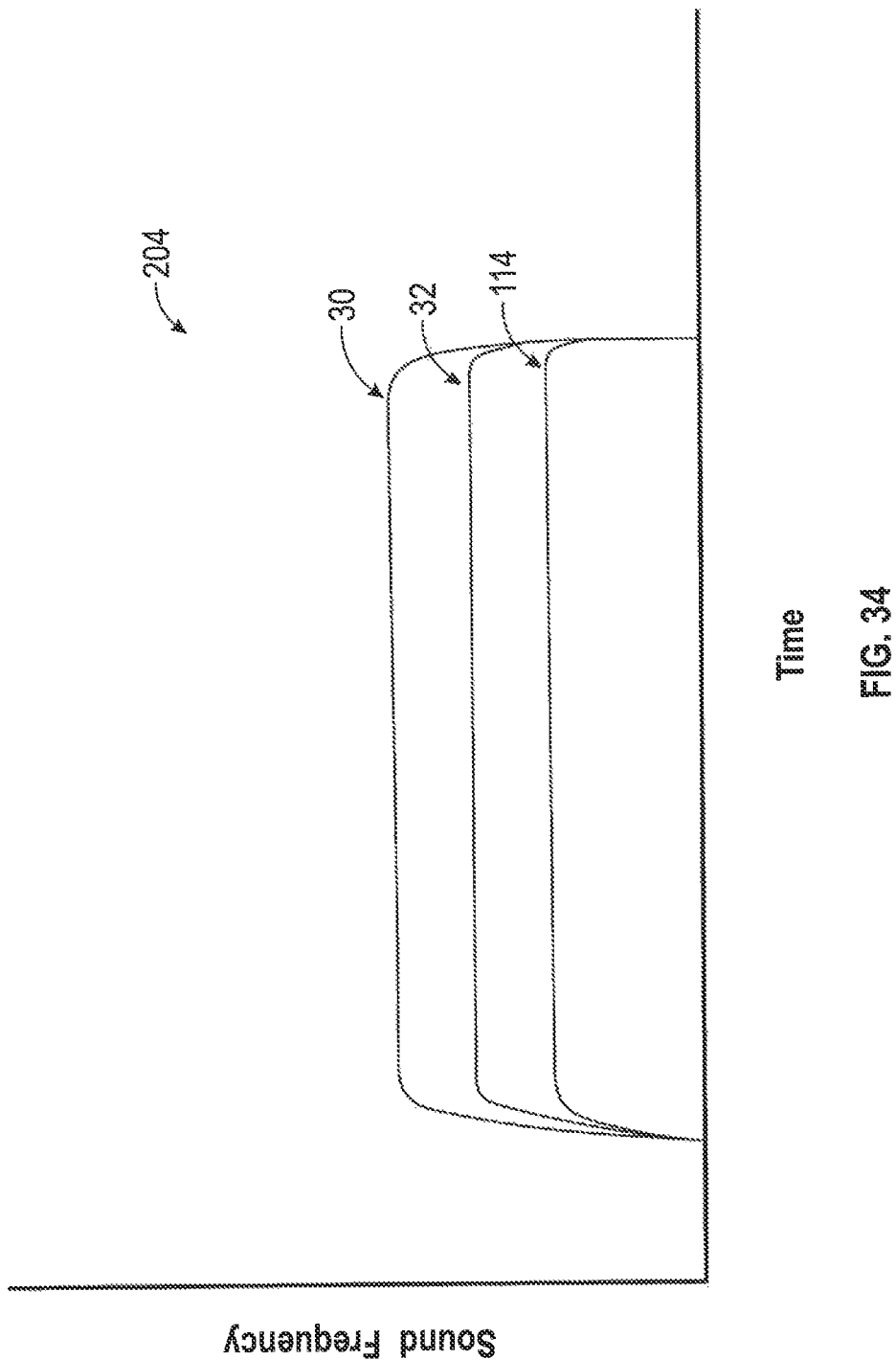
FIG. 34 is a line graph depicting the sound profile produced by the pump assembly shown in FIG. 26 during a normal speed instroke movement.

The sound profile 204 produced by the pump assembly 36 with the pressure relief valve 176 in place when activated at a typical or normal speed is shown in FIG. 34. When activated at normal speed, the pressure within the air chamber 64 remains below the preselected threshold, and so the pressure relief valve 176 remains closed. The resulting sound profile 204 roughly corresponds to the sound profile 200 produced without the pressure relief valve 176, with the exception that the first sound 28 is not present.

Figure 35:
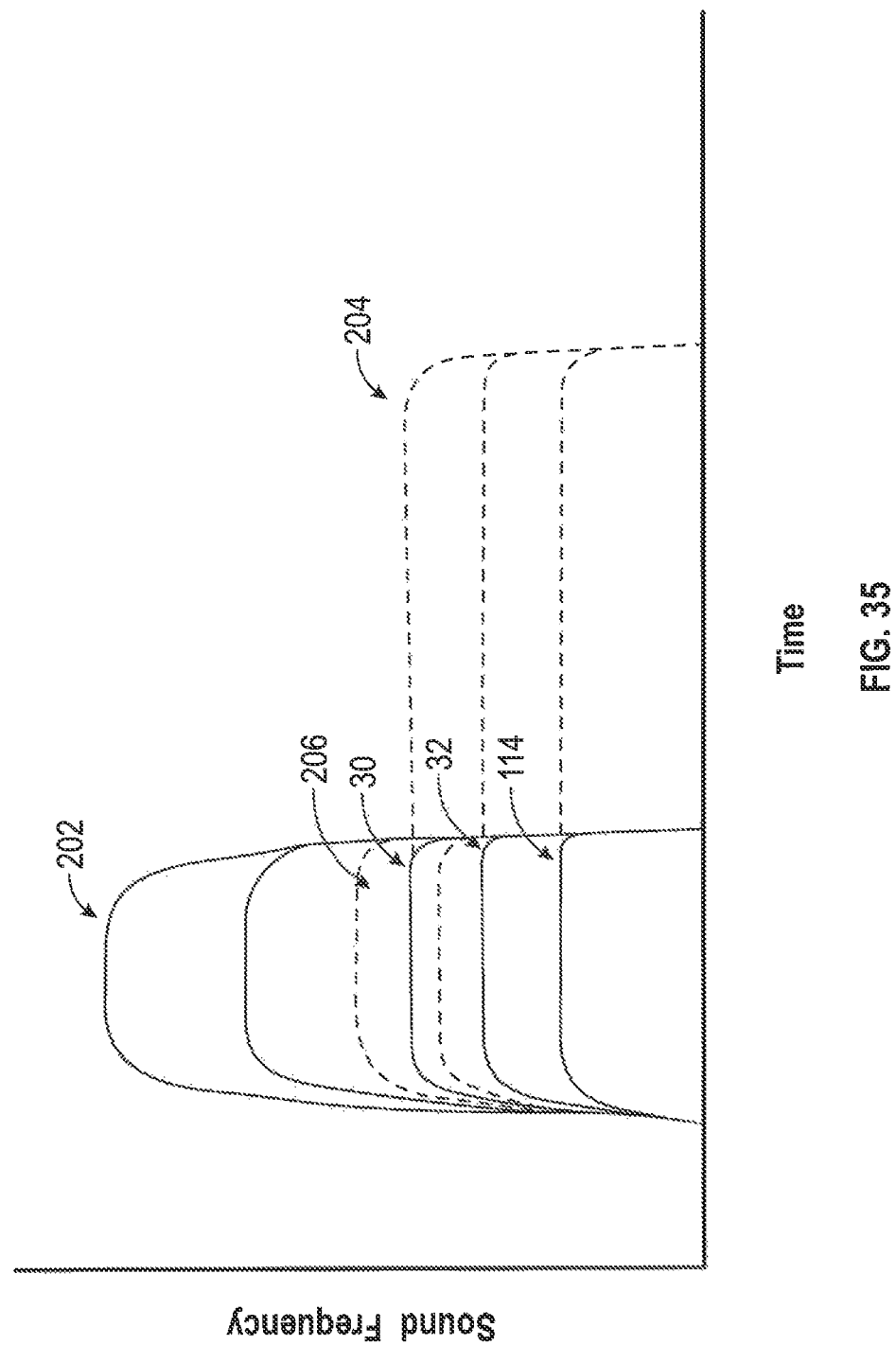
FIG. 35 is a line graph depicting the sound profile produced by the pump assembly shown in FIG. 26 during a rapid speed instroke movement, with the sound profiles of FIGS. 33 and 34 shown in dotted lines for comparison.

When the pump assembly 36 with the pressure relief valve 176 is activated at a very rapid speed, the pump assembly 36 produces the modified sound profile 206 shown in FIG. 35. The rapid instroke movement of the piston body 50 causes the pressure within the air chamber 64 to reach the threshold pressure, at which point the pressure relief valve 176 opens. This causes the pressure within the chamber 64 to remain at or near the threshold pressure for the duration of the instroke, with the result that the sounds 30, 32, 114 produced by the air whistles 55, 172, 174 have roughly the same frequencies as when the pump assembly 36 is activated at a normal speed, rather than the pitch shifted sounds 30, 32, 114 shown in FIG. 33. The fact that the sounds 30, 32, 114 remain closer to the same frequencies even when the instroke movement is very rapid can be used to assist the computer 16 to recognize the sound profile 206 as an activation of the pump assembly 36. Since the air exits the air chamber 64 more rapidly during a rapid instroke, the sounds 30, 32, 114 have a shorter duration than in the sound profile 204 produced during a normal instroke.

Figure 27:
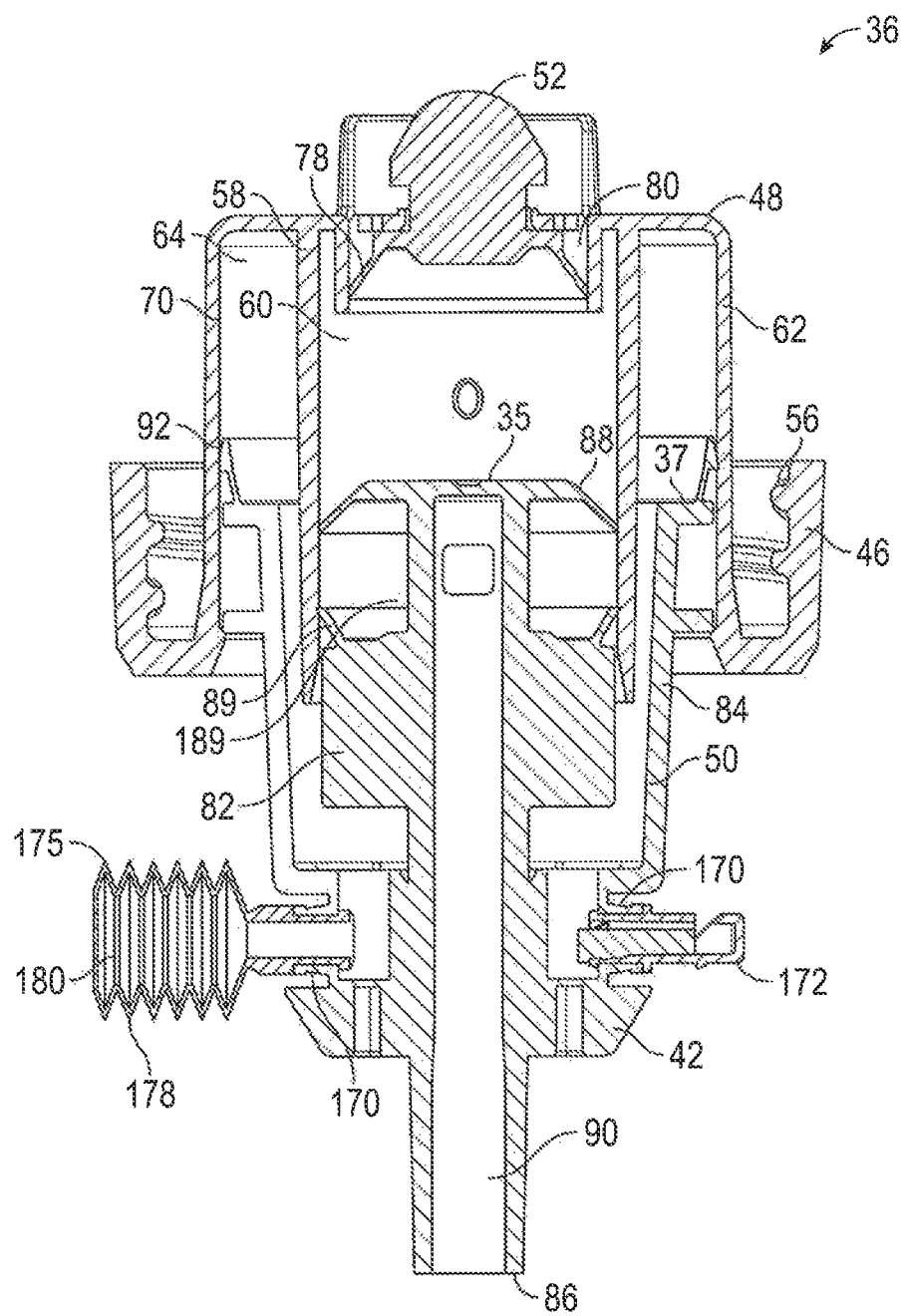
FIG. 27 is a cross-sectional view of the pump assembly shown in FIG. 24, configured to incorporate a pressure stabilizing bellows in place of one of the air whistles.
Figure 28:
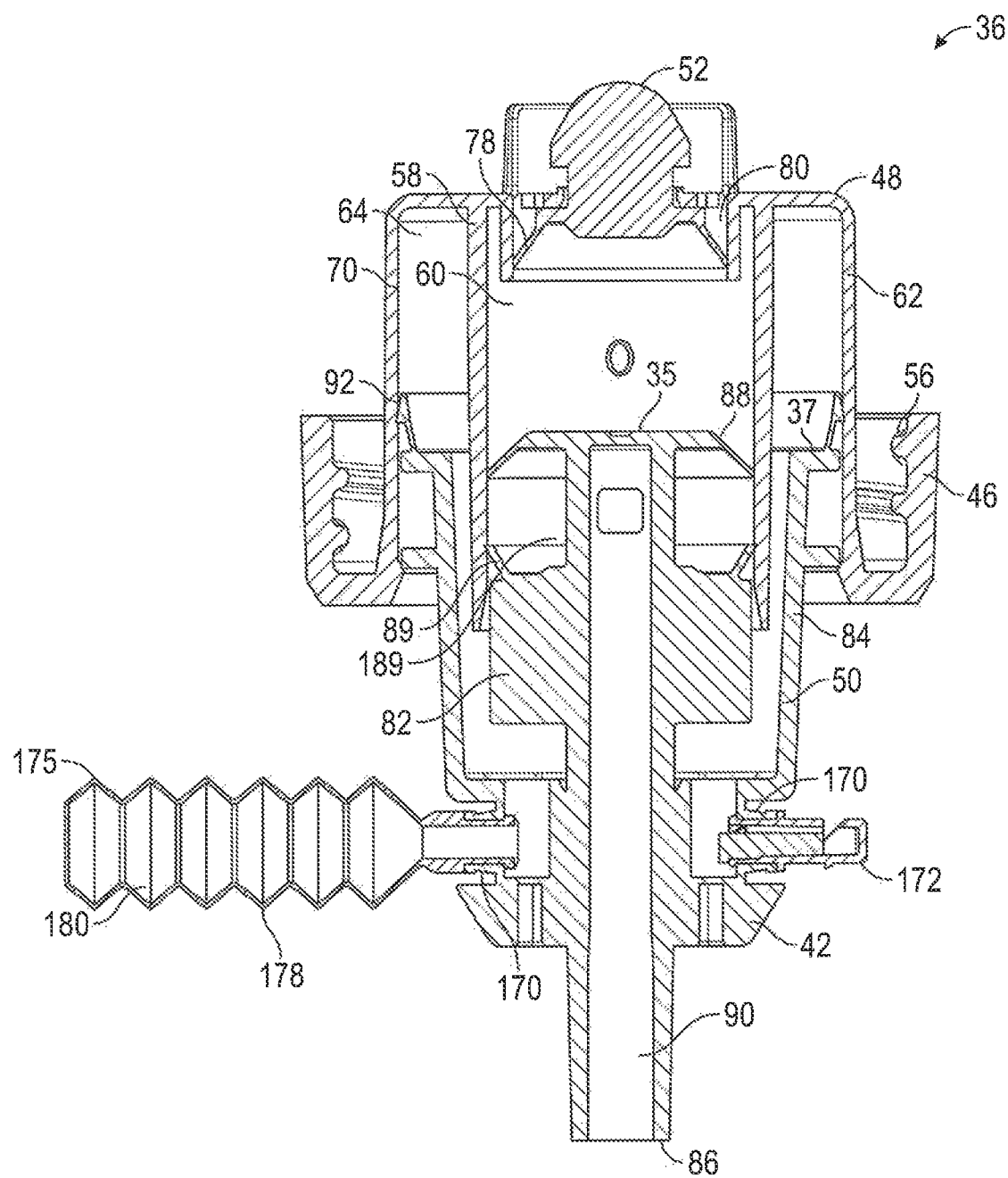
FIG. 28 is a cross-sectional view of the pump assembly shown in FIG. 27, with the bellows in an expanded state.

In the configuration shown in FIG. 27, the pressure relief valve 176 has been replaced by a modular air accumulating bellows 178. The bellows 178 has an accordion-like shape and is resiliently expandable from the contracted state shown in FIG. 27 to the expanded state shown in FIG. 28. The bellows 178 define an internal air cavity 180 that is in fluid communication with the air chamber 64. The air cavity 180 has a larger volume in the expanded state than in the contracted state. The bellows 178 is resiliently biased towards the contracted state, and only expands towards the expanded state when the air pressure within the air chamber 64 exceeds a preselected threshold adequate to overcome the bias. When the air pressure within the chamber 64 falls back down below the threshold, the bellows 178 is configured to return to the contracted state, releasing the collected pressurized air back into the air chamber 64.

The accumulation of pressurized air within the bellows 178 can assist in keeping the pressure within the air chamber 64 at or below the threshold pressure, and thus acts to moderate fluctuations in the frequencies of the sounds 30, 32, 114 produced by the air whistles 55, 172, 164 when the pump assembly 36 is activated at different velocities, similarly to the pressure relief valve 176. Furthermore, the return of the accumulated pressurized air from the bellows 178 to the air chamber 64 may help to moderate fluctuations in the durations of the sounds 30, 32, 114, since the pressurized air from the bellows 178 is forced out through the air whistles 55, 172, 174 at the end of the instroke rather than bypassing the whistles 55, 172, 174 as in the previous configuration. In some embodiments, the flow of pressurized air from the bellows 178 may be sufficiently strong to cause the air whistles 55, 172, 174 to continue emitting the sounds 30, 32, 114 for a short time after the instroke has ended. In other embodiments, the air is returned by the bellows 178 too slowly to extend the duration of the sounds 30, 32, 144.

Preferably, the bellows 178 is configured so that it expands minimally before the threshold pressure is reached, and expands rapidly once the threshold pressure is reached. This helps to keep the pressure within air chamber 64 at or below the threshold pressure, since the entire volume of the expanded bellows 178 is available to accumulate air displaced from the chamber 64 at or near the threshold pressure. In other embodiments, the resistance of the bellows 178 to expansion may significantly increase as the bellows 178 expands, so that the fully expanded state is only reached at well above the threshold pressure. In either case, the bellows 178 will moderate the fluctuations in air pressure that are experienced during a rapid instroke, though the extent of that moderation will depend on a number of factors, such as the speed of the instroke, the volume of the air cavity 180 relative to the air chamber 64, the resistance profile of the bellows 178, and the size of the modular port 170.

Figure 36:
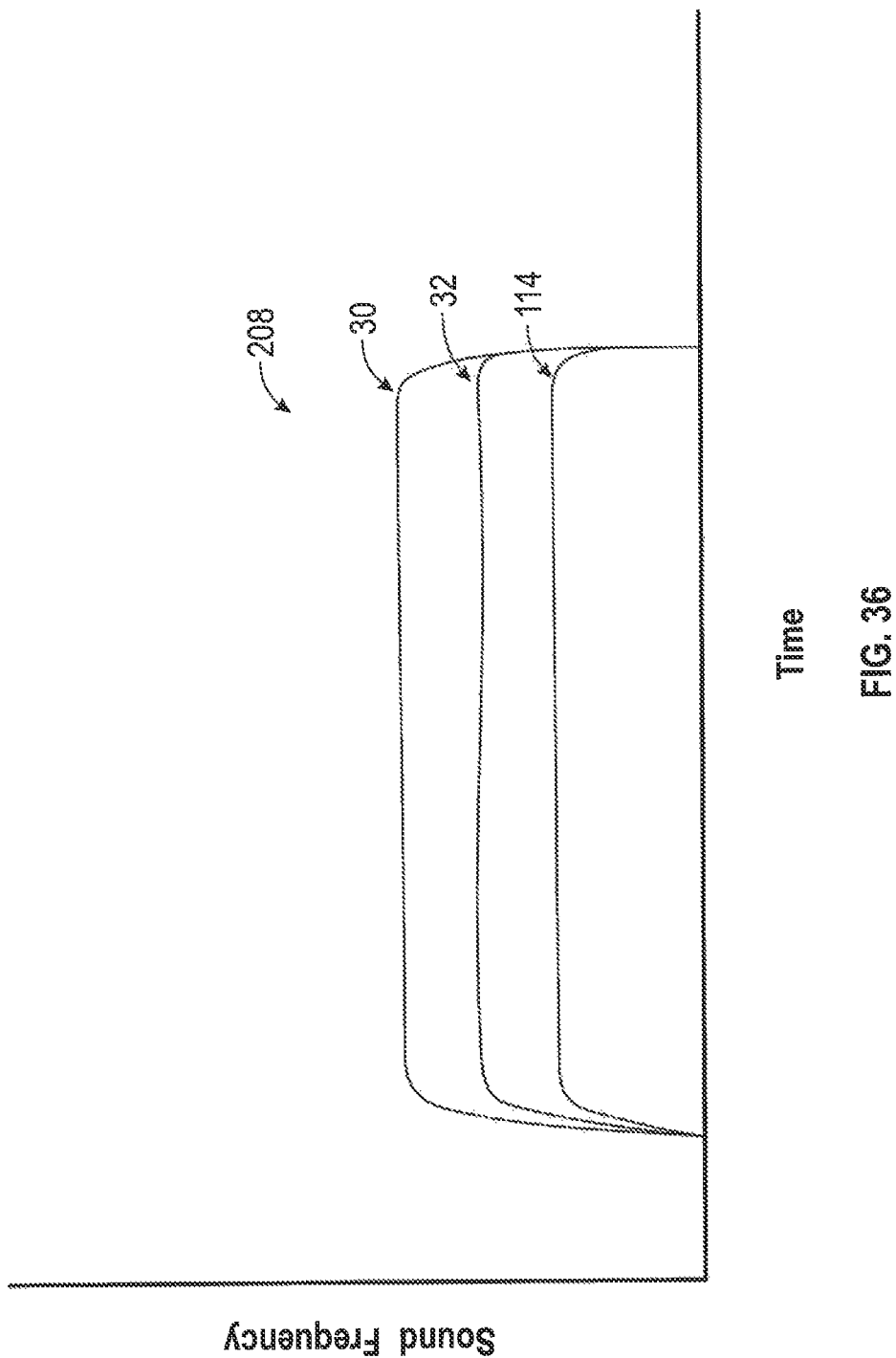
FIG. 36 is a line graph depicting the sound profile produced by the pump assembly shown in FIG. 27 during a normal speed instroke movement.

The sound profile 208 produced by the pump assembly 36 with the bellows 178 in place when activated at a normal speed is shown in FIG. 36. When activated at normal speed, the pressure within the air chamber 64 remains below the preselected threshold, and so the bellows 178 remain in the contracted state. The resulting sound profile 208 roughly corresponds to the sound profile 200 produced without a pressure stabilizer, with the exception that the first sound 28 is not present.

Figure 37:
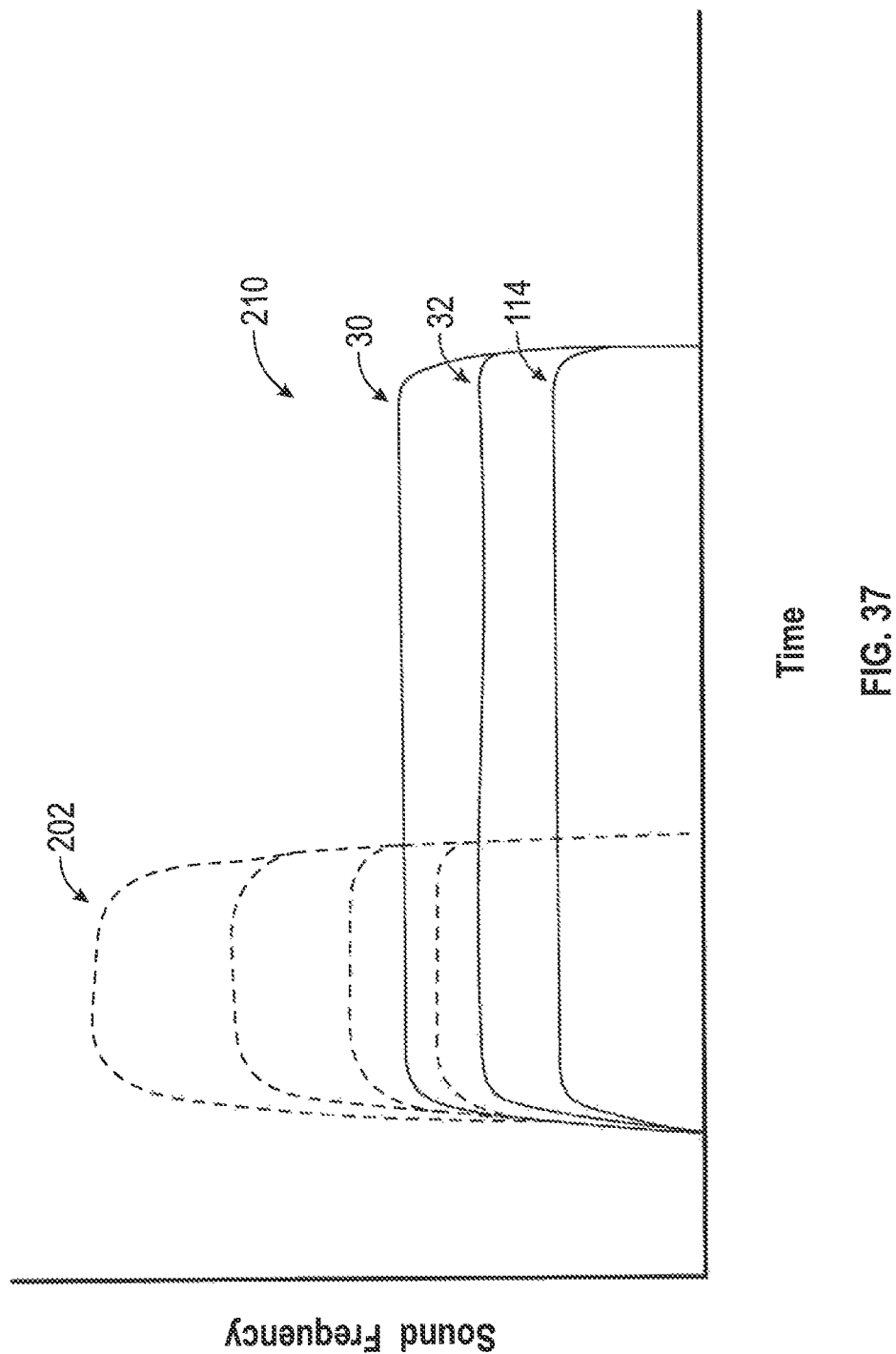
FIG. 37 is a line graph depicting the sound profile produced by the pump assembly shown in FIG. 27 during a rapid speed instroke movement, with the sound profile of FIG. 33 shown in dotted lines for comparison.

When the pump assembly 36 with the bellows 178 is activated at a rapid speed, the pump assembly 36 produces the sound profile 210 shown in FIG. 37. The rapid instroke movement of the piston body 50 may cause the pressure within the air chamber 64 to reach the threshold pressure, at which point the bellows 178 expand to accumulate the pressurized air. In the sound profile 210 that is shown, the bellows 178 have accumulated sufficient pressurized air to keep the pressure within the chamber 64 at or near the threshold pressure for the duration of the instroke, with the result that the sounds 30, 32, 114 produced by the air whistles 55, 172, 174 have roughly the same frequencies as when the pump assembly 36 is activated at a normal speed, rather than the pitch shifted sounds 30, 32, 114 shown in FIG. 33.

When the piston body 50 reaches the end of the instroke, the pressure within the air chamber 64 begins to fall below the threshold pressure. This causes the bellows 178 to begin contracting, releasing pressurized air back into the chamber 64. This pressurized air is forced out through the whistles 55, 172, 174, which in the embodiment shown causes the sounds 30, 32, 114 to continue for a short time even after the instroke movement has ended. As a result, in this instance the durations of the sounds 30, 32, 114 are roughly the same as when the pump assembly 36 is activated at a normal speed. Having the sounds 30, 32, 114 remain at roughly the same frequencies with roughly the same durations even when the instroke movement is very rapid can assist the computer 16 in recognizing the sound profile 210 as an activation of the pump assembly 36. Other embodiments which do not maintain the frequencies and durations as consistently as shown in FIG. 37, but which narrow the range of variability that is experienced compared to embodiments that lack a pressure stabilizer 175, can also assist the computer 16 in recognizing activations of the pump assembly 36.

Figure 29:
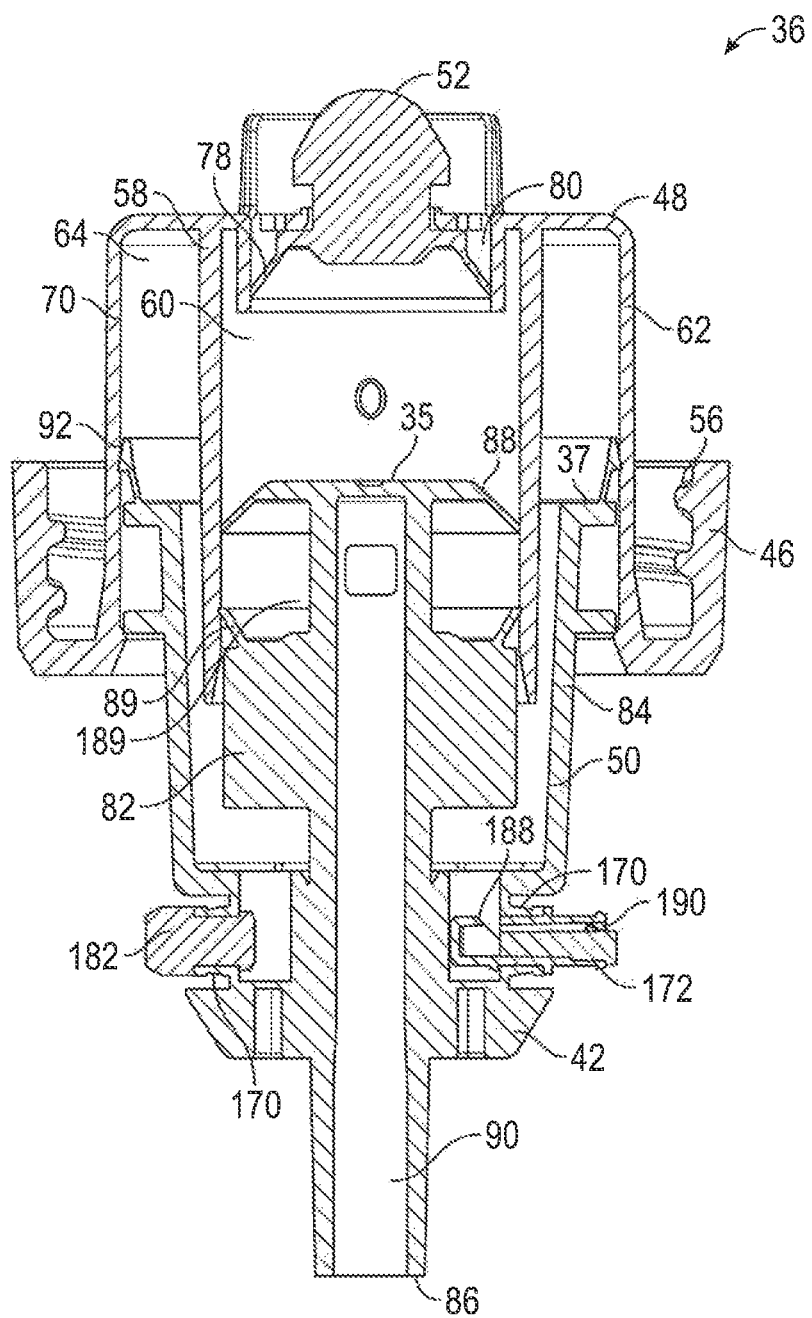
FIG. 29 is a cross-sectional view of the pump assembly shown in FIG. 24, configured to replace one of the air whistles with a plug, the remaining air whistles being inverted to generate sounds during an outstroke movement.

The modular air whistles 54, 55, 172, 174 and the ports 170 are configured so that the whistles 54, 55, 172, 174 can be received within the ports 170 in the forwards orientation shown in FIGS. 24 to 28, or alternatively, in the backwards orientation shown in FIG. 29. When in the backwards orientation, the whistles 54, 55, 172, 174 produce the sounds 28, 30, 32, 114 as air is drawn from the atmosphere into the air chamber 64 through the whistles 54, 55, 172, 174, rather than when air is expelled from the air chamber 64 out through the whistles 54, 55, 172, 174. In particular, the air whistles 54, 55, 172, 174 each have an air channel 190 that delivers air to a sound generating portion 188. When air passes from the air channel 190 to the sound generating portion 188 at a sufficient flow rate, the sound generating portion 188 generates a sound 28, 30, 32, 114. Reversing the orientation of the whistles 54, 55, 172, 174 positions the air channel 190 between the atmospheric air and the sound generating portion 188, instead of between the air chamber 64 and the sound generating portion 188, and thus reverses the direction of air flow required to generate the sound 28, 30, 32, 114.

In the configuration shown in FIG. 29, the second, third, and fourth whistles 55, 172, 174 have been inserted into three ports 170 in the backwards orientation. Whistles 55 and 174 are not visible in the cross-section shown in FIG. 29. Air is drawn into the air chamber 64 through the whistles 55, 172, 174 to produce the sounds 30, 32, 114 during the outstroke movement. In particular, as the piston body 50 moves axially outwards and downwards relative to the piston chamber forming body 48 during the outstroke, the volume of the air chamber 64 expands, creating a vacuum. This vacuum draws air in through the whistles 55, 172, 174, causing the whistles 55, 172, 174 to emit the sounds 30, 32, 114.

Figure 38:
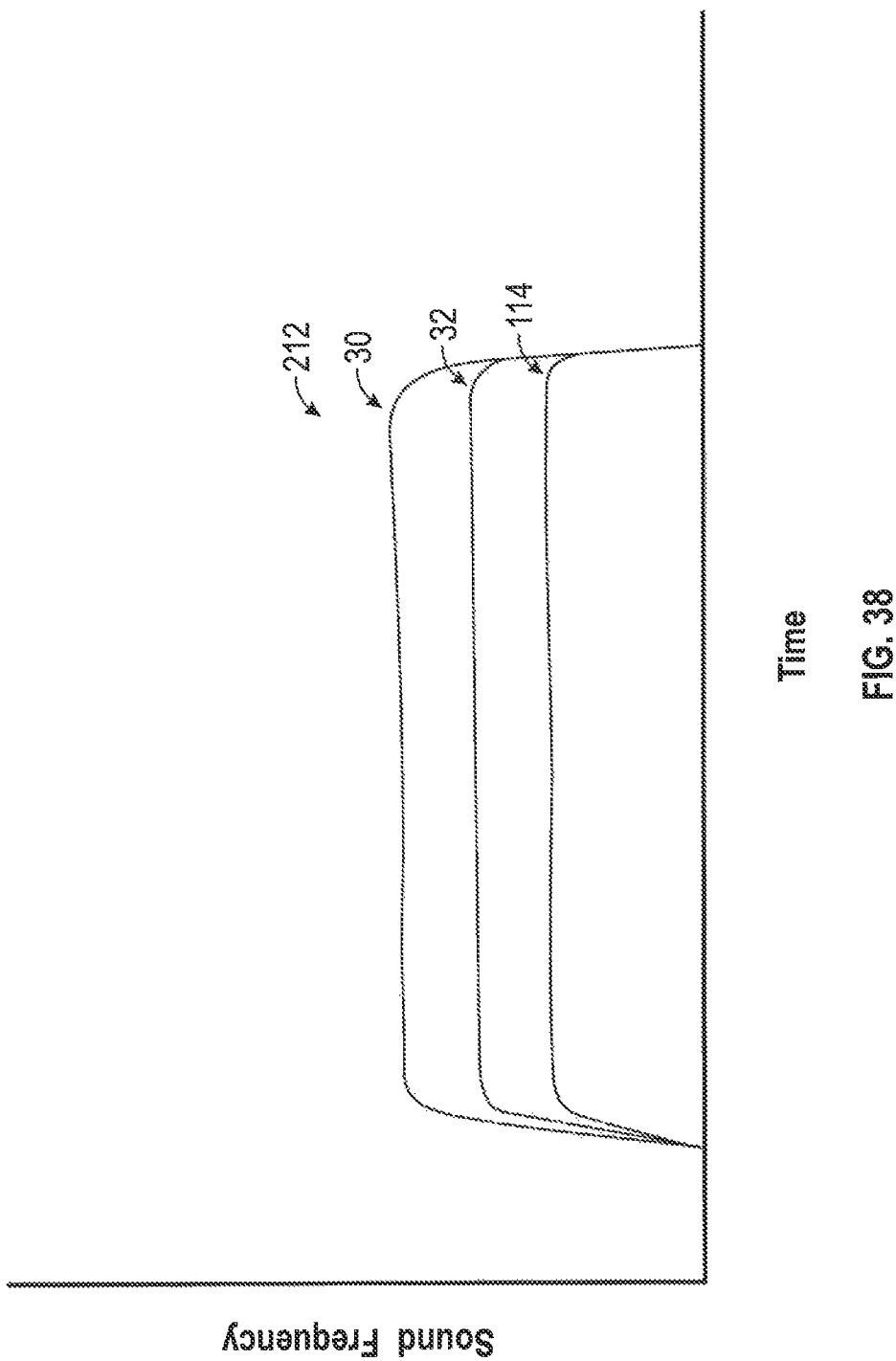
FIG. 38 is a line graph depicting the sound profile produced by the pump assembly shown in FIG. 29 during an outstroke movement.

The configuration shown in FIG. 29 produces the sound profile 212 shown in FIG. 38. The sound profile 212 is generally similar to that shown in FIG. 34, with the exception that the sounds 30, 32, 114 are produced during the outstroke movement rather than the instroke. In other embodiments, the pump assembly 36 may be configured to draw air into the air chamber 64 through the whistles 55, 172, 174 to produce the sounds 30, 32, 114 during the instroke movement rather than the outstroke movement. For example, by defining the air chamber 64 between two air displacement bodies 84 that move axially inwardly and upwards during the instroke, and by providing a radially outwards step in the upper portion of the outer wall 62, between the two air displacement bodies 84, the air chamber 64 can be made to expand, and thus draw air in through the air whistles 55, 172, 174, during the instroke. A similar construction for drawing fluid during an instroke is disclosed in U.S. Pat. No. 7,267,251 to Ophardt, which is hereby incorporated by reference.

The use of modular, reversible air whistles 54, 55, 172, 174 permits the same components to be combined in numerous different configurations to produce a myriad of different sound profiles 200, including configurations that emit multiple sounds 28, 30, 32, 114 during both the instroke and the outstroke movements. These different sound profiles 200 can then be used to uniquely identify the activation of different pump assemblies 36 within a given facility, thereby allowing for the collection of more detailed compliance monitoring data.

The configuration shown in FIG. 29 produces three sounds 30, 32, 114 instead of four because a plug 182 has been inserted into the remaining port 170. The plug 182 forces more air to pass through each whistle 55, 172, 174, in comparison with a configuration using four whistles 54, 55, 172, 174 instead of three, and thus helps to ensure that the air streams passing through the whistles 55, 172, 174 are forceful enough to generate the sounds 30, 32, 114. Plugs 182 can also be used to alter the sound profile 200 produced by the pump assembly 36 by removing one or more of the sounds 28, 30, 32, 114, and thus allow for an even greater variety of unique sound profiles 200 for the purpose of compliance monitoring.

In some configurations of the pump assembly 36, a very slow instroke movement may cause the air passing through the air whistles 54, 55, 172, 174 to pass through at a rate that is too slow to generate the sounds 28, 20, 32, 114. This problem becomes more severe as the number of air whistles 54, 55, 172, 174 increases, since each whistle 54, 55, 172, 174 expels a smaller share of the air displaced by the air displacement body 84 as the number of whistles 54, 55, 172, 174 increases. For example, in the configuration having four air whistles 54, 55, 172, 174 shown in FIG. 24, when the pump assembly 36 is activated at a very slow pace, the air within the air chamber 64 is able to escape through the whistles 54, 55, 172, 174 at a slow rate without producing any sounds 28, 30, 32, 114. The activation is thus undetectable by the sound sensing mechanism 14, and therefore interferes with accurate compliance monitoring.

Figure 30:
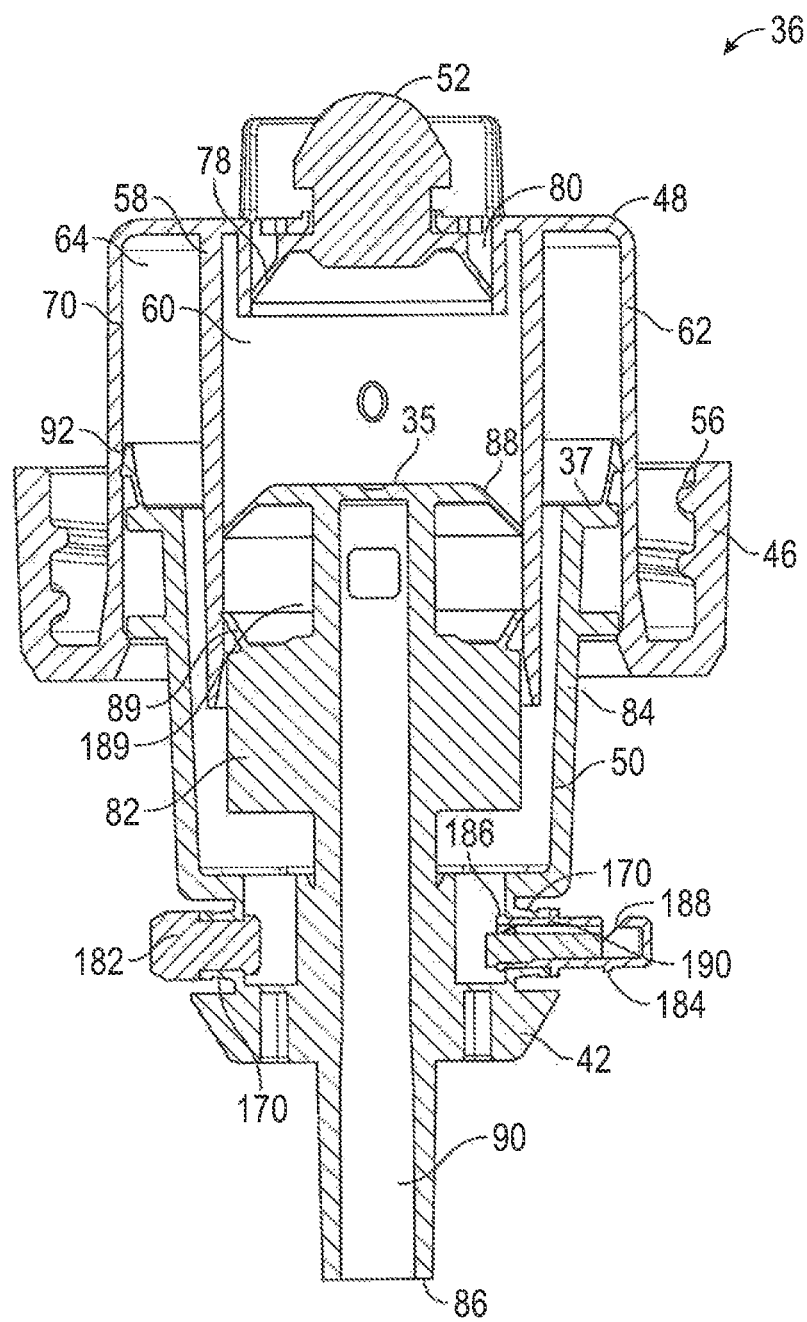
FIG. 30 is a cross-sectional view of the pump assembly shown in FIG. 24, configured to replace one of the air whistles with a plug, and with two of the remaining air whistles adapted to incorporate a pressure opening valve.
Figure 31:
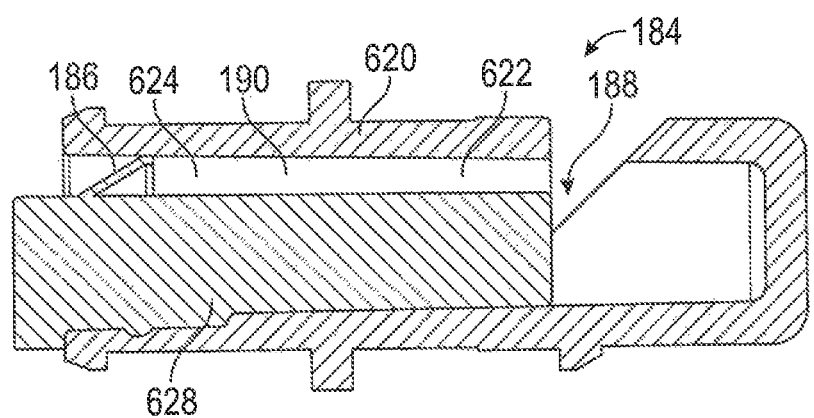
FIG. 31 is a detailed cross-sectional view of the air whistle adapted to incorporate a pressure opening valve shown in FIG. 30.

To avoid this difficulty, one or more and preferably all of the air whistles 54, 55, 172, 174 may be replaced with a modular pressure opening air whistle 184, as shown in FIGS. 30 and 31. The pressure opening air whistle 184 has a generally cylindrical whistle chamber forming body 620 defining an internal whistle chamber 622. The whistle chamber 622 has an air channel forming portion 624 that is open to the air chamber 64 and a sound generating portion 188 that is open to the atmosphere. An air channel narrowing body 628 is inserted into the air channel forming portion 624. The air channel narrowing body 628 is a segmented cylinder that partially obstructs the air channel forming portion 624 of the whistle chamber 622, leaving a narrow air channel 190 defined between the air channel narrowing body 628 and the whistle chamber forming body 620. The air channel narrowing body 628 has a pressure opening valve 186 that extends across the air channel 190 towards the whistle chamber forming body 620. The pressure opening valve 186 is a resiliently flexible disc segment that is angled towards the sound generating portion 188 of the whistle chamber 622 as it extends from the air channel narrowing body 628 to the whistle chamber forming body 620.

The pressure opening valve 186 is biased to sealingly engage with the whistle chamber forming body 620 so as to block the flow of air through the air channel 190 from the air chamber 64 to the sound generating portion 188 when the air pressure within the air chamber 64 is below a preselected threshold pressure. When the air pressure reaches or exceeds the preselected threshold, the pressure opening valve 186 is configured to deflect away from the whistle chamber forming body 620, allowing the pressurized air to pass through the air channel 190 from the air chamber 64 to the sound generating portion 188. The pressure opening valve 186 thus prevents air below the threshold pressure from slowly leaking out through the whistle 184 during a slow instroke movement, and allows pressure within the air chamber 64 to build up to the threshold pressure during the slow instroke. Once the threshold pressure is reached, the valve 186 opens and allows a stream of pressurized air to escape through the whistle 184, as long as the air pressure is above the threshold pressure. At the threshold pressure, the stream of air is forceful enough to cause the sound generating portion 188 of the whistle 184 to generate a sound 28, 30, 32, 114. The pressure opening air whistle 184 can cause the pump assembly 36 to produce a sound 28, 20, 32, 114 even during a very slow instroke movement, and thus allows for more accurate compliance monitoring.

Figure 39:
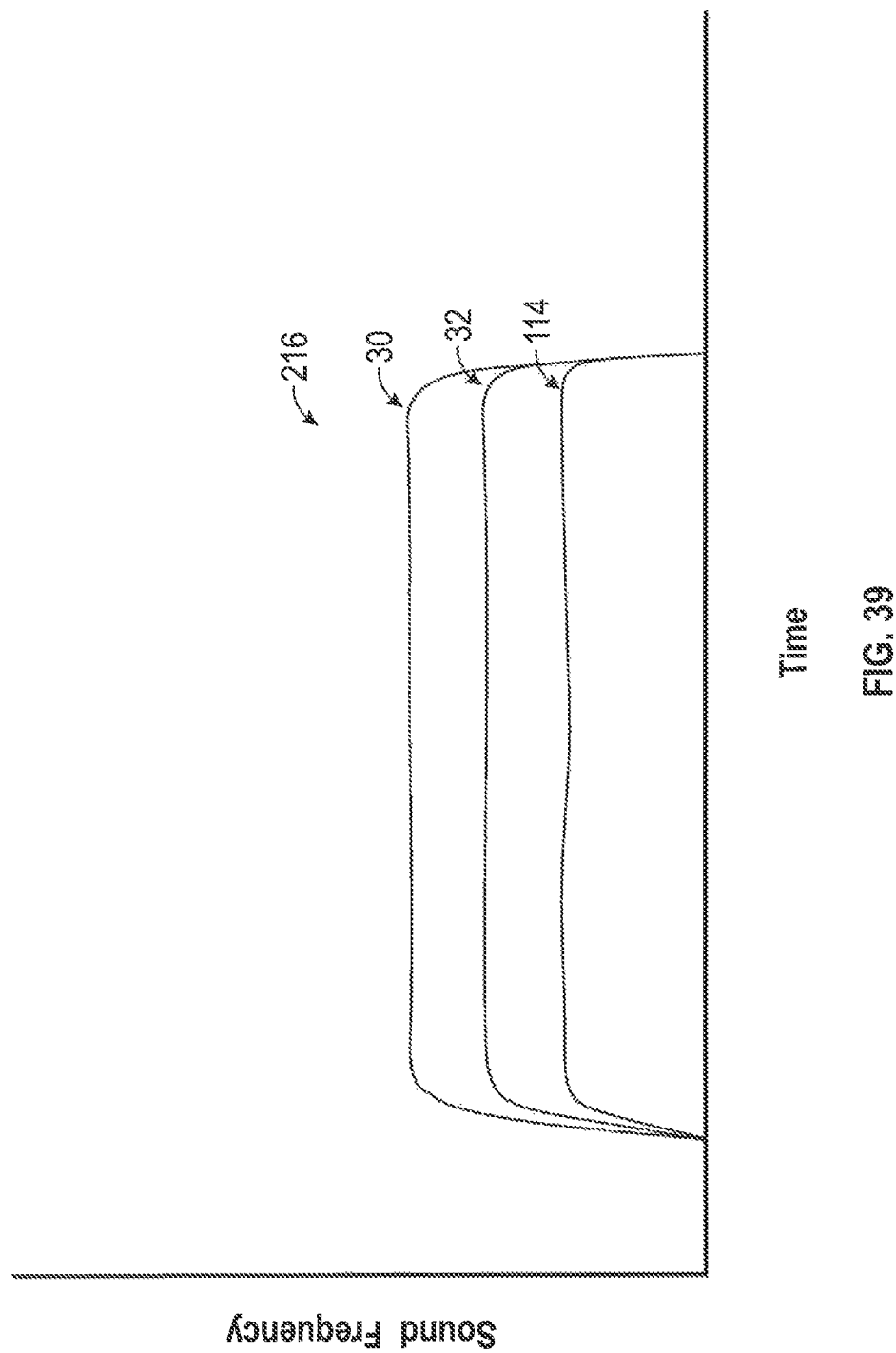
FIG. 39 is a line graph depicting the sound profile produced by the pump assembly shown in FIG. 30 during a normal speed instroke movement.
Figure 40:
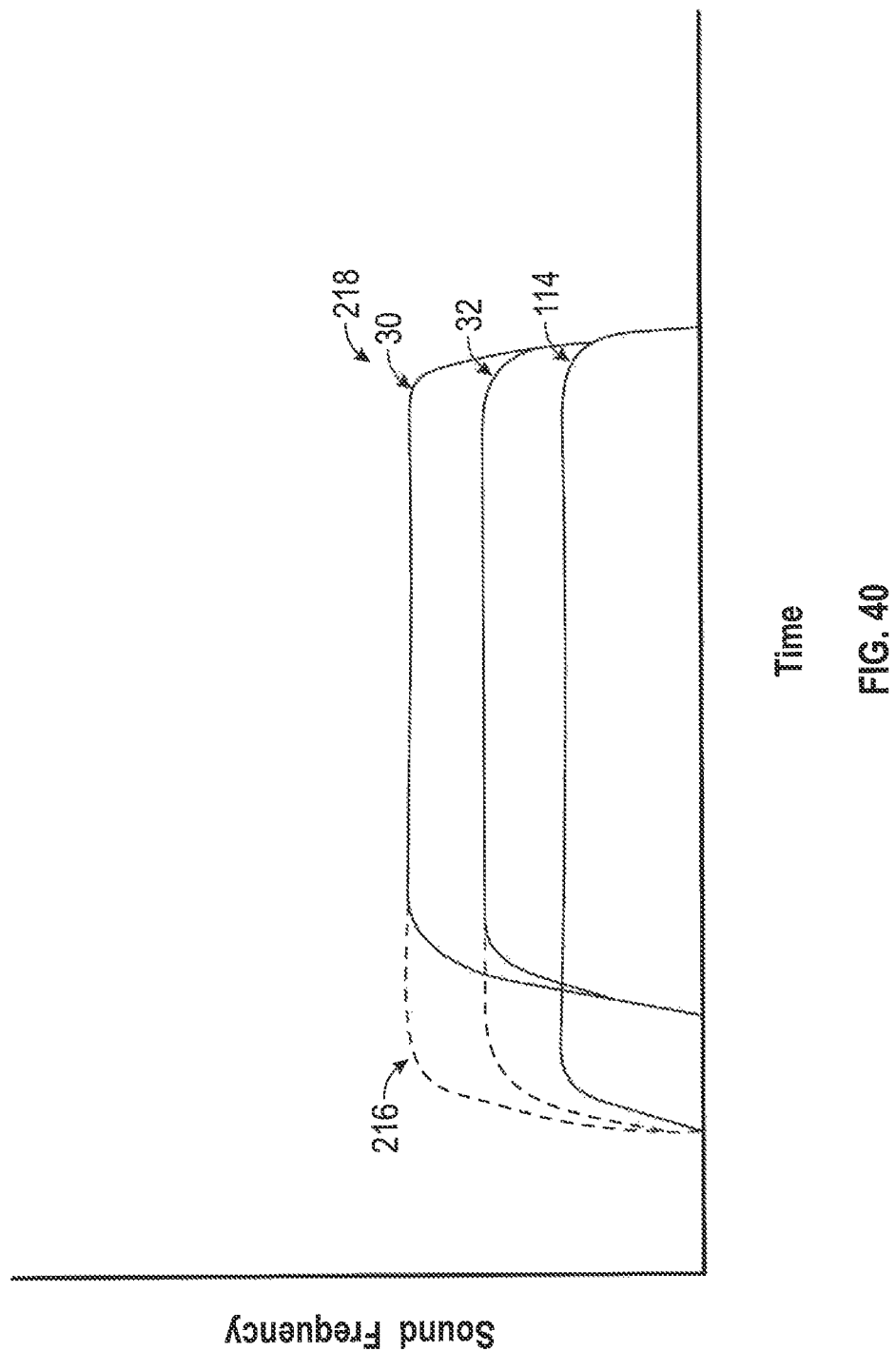
FIG. 40 is a line graph depicting the sound profile produced by the pump assembly shown in FIG. 30 during a slow speed instroke movement, with the sound profile of FIG. 39 shown in dotted lines for comparison.

In the configuration shown in FIG. 30, two pressure opening air whistles 184 have been inserted into two of the ports 170, a plug 182 has been inserted into one of the ports 170, and a regular air whistle 174 has been inserted into the remaining port 170. Only the plug 182 and one of the pressure opening air whistles 184 is visible in the cross-section shown in FIG. 30. During a normal instroke, the pressure within the air chamber 64 quickly exceeds the threshold pressure, and the two pressure opening air whistles 184 produce two sounds 30, 32 at roughly the same time that the regular air whistle 174 produces its sound 114. This results in the sound profile 216 shown in FIG. 39. During a slow instroke, the pressure within the chamber 64 takes longer to build, and so there is a delay before the sounds 30, 32 are produced by the pressure opening air whistles 184. Since the pressurized air can only escape through the one regular air whistle 174 until the threshold pressure is reached, the pressure may nonetheless eventually reach the threshold pressure, in contrast to the configuration shown in FIG. 24 in which all four ports 170 contain a regular whistle 54, 55, 172, 174. While the threshold pressure is reached and exceeded, the pressure opening valves 186 are open and the whistles 184 produce their sounds 30, 32, resulting in the sound profile 218 shown in FIG. 40. This sound profile 218 can then be detected and recognized by the sound sensing mechanism 14 and the computer 16 for compliance monitoring.

Figure 31A:
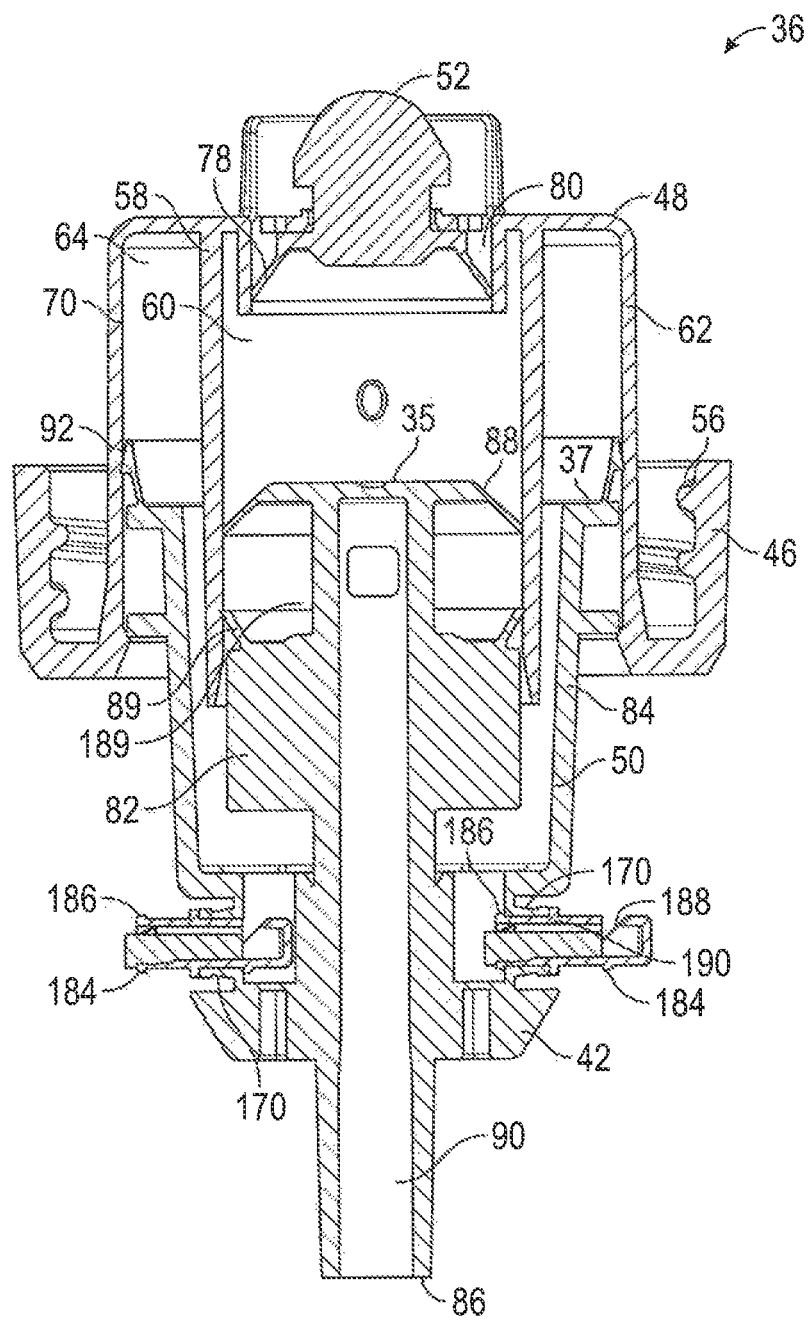
FIG. 31a is a cross-sectional view of the pump assembly shown in FIG. 24, configured to incorporate four pressure opening air whistles, one of which is in a backwards orientation and three of which are in a forwards orientation.

During the outstroke movement, air is returned to the air chamber 64 via the regular air whistle 174 only, since the pressure opening valves 186 do not allow air to enter the chamber 64 via the pressure opening whistles 184. In embodiments of the invention in which all four ports 170 contain a pressure opening whistle 184, the pump assembly 36 can be adapted to include a one-way air inlet valve (not shown) to allow air to enter the chamber 64 during the outstroke movement. Alternatively, one or more of the pressure opening whistles 184 may be inserted into their ports 170 in the backwards orientation, so that air can enter the chamber 64 through the backwardly oriented whistles 184. For example, in the configuration shown in FIG. 31a, one of the pressure opening whistles 184 is in the backwards orientation. Although only one is shown in cross-section, the remaining three pressure opening whistles 184 are in the forwards orientation. When the pump assembly 36 is in this configuration, the three forwards pressure opening whistles 184 release air from the air chamber 64 and produce sounds 30, 32, 114 when the threshold pressure is reached during the instroke, while the air channel 190 of the backwards pressure opening whistle 184 remains sealed by the pressure opening valve 186. In particular, when in the backwards orientation the increase in pressure within the air chamber 64 urges the pressure opening valve 186 into sealing engagement with the whistle chamber forming body 620. During the outstroke, when the pressure within the air chamber 64 falls to or below a threshold vacuum pressure, the pressure opening valve 186 is urged away from the whistle chamber forming body 620, allowing atmospheric air to enter the air chamber 64 through the air channel 190 and producing the sound 28. The air channels 190 of the forwards whistles 184 remain sealed during the outstroke. This configuration thus allows air to enter the air chamber 64 during the outstroke, and also produces sounds 28, 30, 32, 114 during both the instroke and outstroke movements.

Optionally, the pressure opening valves 186 could be configured to open at different threshold pressures. This would cause the sounds 28, 30, 32, 114 to begin at different times during the instroke movement, when the whistles 184 are oriented forwardly, as the pressure within the air chamber 64 reaches and is maintained at or above each respective threshold pressure. By combining different whistles 184 having different thresholds, a wide variety of sound profiles 200 could be produced for uniquely identifying different pump assemblies 36 and collecting more detailed compliance monitoring data. The sound profiles 200 could also be used to gather additional information about the operation of the pump assemblies 36, with the number and frequency of the sounds 28, 30, 32, 114 being used to determine the air pressure that was reached within the air chamber 64 during activation. For example, if one whistle 184, having a pressure opening valve 186 that opens at a first threshold pressure, produces a first sound 28 during an activation of the pump assembly 36, and another whistle 184, having a pressure opening valve 186 that opens at a higher second threshold pressure, does not produce a sound 30, then the computer 16 can determine that the pressure within the air chamber 64 was greater than the first threshold pressure but lower than the second threshold pressure.

Although a number of exemplary configurations have been illustrated and described, any other desired combination of modular components could be inserted into the ports 170. Furthermore, the pump assembly 36 could be adapted to incorporate a greater number of ports 170 or a lesser number of ports 170, and the ports 170 could be given a different size and shape, or could be arranged at different locations from those illustrated. Features of the sixth embodiment of the invention could also be combined with features from one or more of the previous embodiments, including by incorporating multiple air chambers 64, 65 and/or grooves 66, 68 so as to produce sequential sounds 28, 30, 32, 114. Different pressure stabilizers could also be used in place of the pressure relief valve 176 and bellows 178 described above. Any construction that collects or releases pressurized air from the air chamber 64 so as to stabilize the air pressure could be used. The bellows 178 could also be configured so that the air returned to the air chamber 64 at the end of the instroke movement is not sufficiently pressurized to extend the duration of the sounds 30, 32, 114. Furthermore, the pressure stabilizing components such as the pressure relief valve 176 and the bellows 178 could be connected to the air chamber 64 at locations other than the modular ports 170. Rather than having pressure opening valves 186 incorporated directly into the whistles 184, separate valves could be provided between the air chamber 64 and the whistles 54, 55, 172, 174. For example, a spring-loaded air poppet valve could be placed between the whistles 54, 55, 172, 174 and the air chamber 64 to prevent air from passing through the whistles 54, 55, 172, 174 until a threshold pressure has been reached. Optionally, in some embodiments of the invention a single multi-tonal whistle could be used instead of multiple air whistles 54, 55, 172, 174 to produce multiple sounds 28, 30, 32, 114 simultaneously. The use of pump constructions that draw air and/or fluid during the instroke and expel air and/or fluid during the outstroke, as described above, could be used in conjunction with any of the other features and embodiments described herein.

Figure 41:
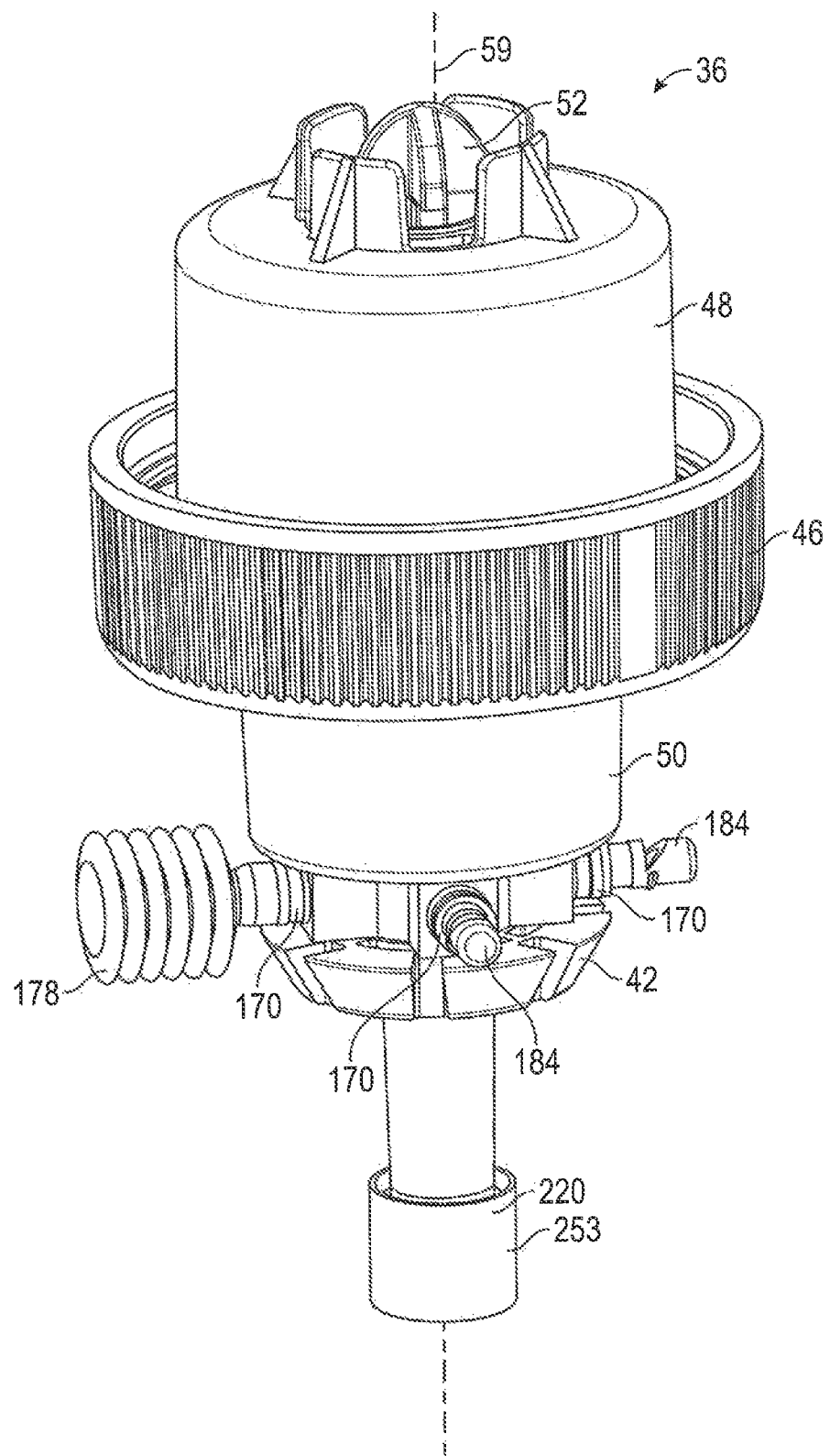
FIG. 41 is a perspective view of a pump assembly in accordance with a seventh embodiment of the invention.
Figure 42:
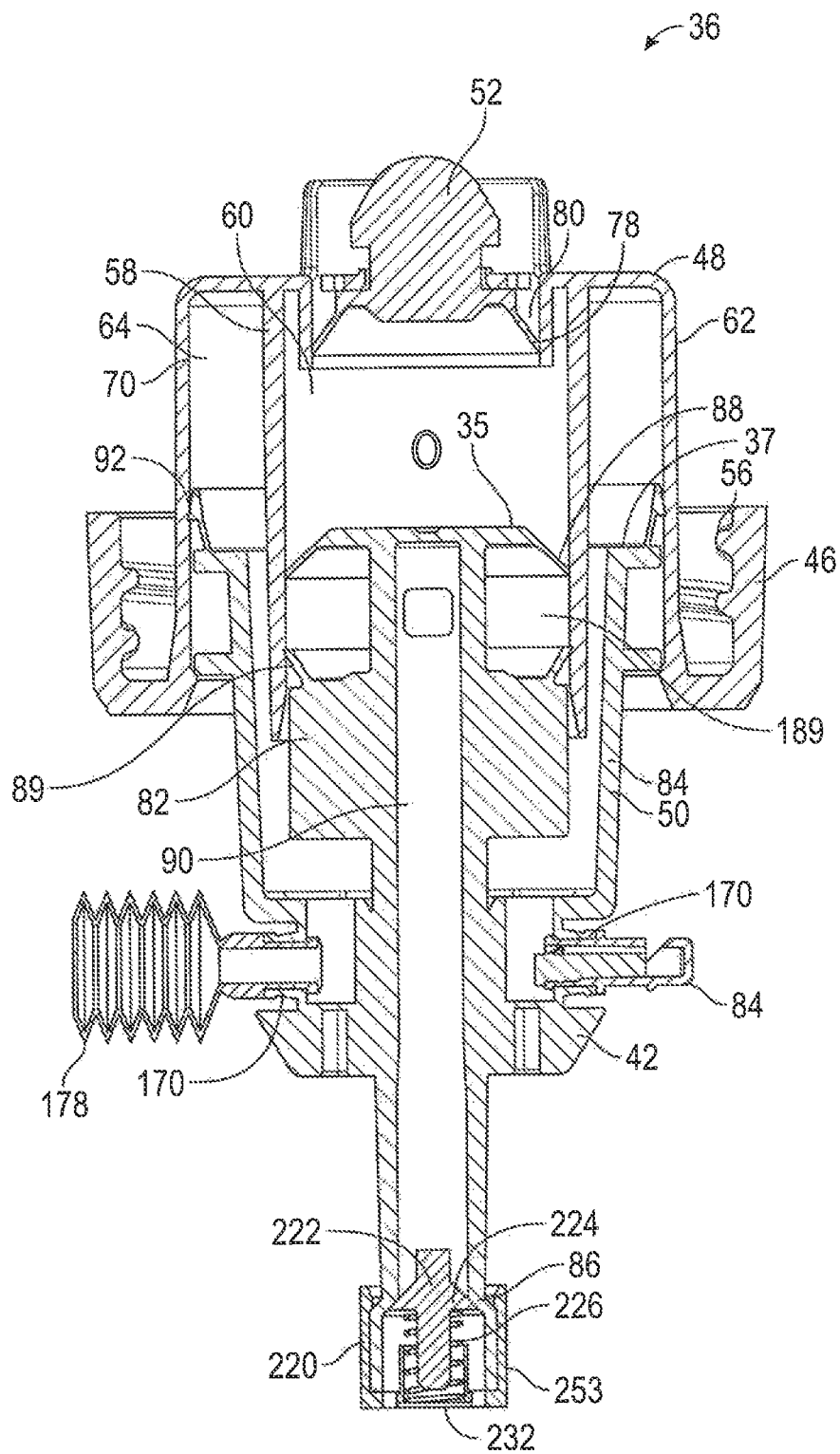
FIG. 42 is a cross-sectional view of the pump assembly shown in FIG. 41.

Other constructions could also be used to moderate fluctuations in the sound profile 200 produced by the pump assembly 36. For example, a pump assembly 36 in accordance with a seventh embodiment of the invention is shown in FIGS. 41 and 42. This embodiment of the invention is identical to the sixth embodiment of the invention described above and shown in FIG. 24, but further incorporates a resistance generator 220 at the fluid outlet 86. The resistance generator 220 is configured to provide resistance against the flow of fluid 26 from the fluid chamber 60 out through the fluid outlet 86. This causes the pressure of the fluid 26 contained within the fluid chamber 60 to increase during the instroke movement. In particular, the resistance generator 220 reduces the flow rate of the fluid 26 expelled from the fluid outlet 86 as the piston body 50 moves axially inwardly and upwards into the fluid chamber 60, leading to an increase in pressure. This increase in pressure increases the amount of force that is required to move the piston body 50 upwards into the fluid chamber 60 during the instroke movement.

As shown in FIG. 42, the resistance generator 220 comprises a spring-loaded pressurizing valve 222 that obstructs the fluid outlet 86. The valve 222 comprises a stop member 224 that is biased axially inwardly into a fluid tight engagement with the fluid outlet 86 by a spring 226. The spring 226 is compressed between an inner end in engagement with the valve 222 and an outer end in engagement with an aperture plate 232 of an end cap 253 secured on the outer end of the piston body 50. The valve 222 is configured to prevent fluid 26 from exiting the fluid outlet 86 until the pressure within the outlet channel 90 and the fluid chamber 60 is above a preselected threshold. This leads to an increase in pressure within the fluid chamber 60 during the instroke movement, which provides resistance against the rapid movement of the piston body 50 from the first position to the second position. The increased resistance makes it difficult for a user to rapidly activate the pump assembly 36, and thus leads to more consistent instroke speeds. This, in turn, leads to more consistent sound profiles 200 produced by the air whistles 184, assisting the computer 16 in recognizing the resulting sound profiles 200 as activations of the pump assembly 36.

Figure 43:
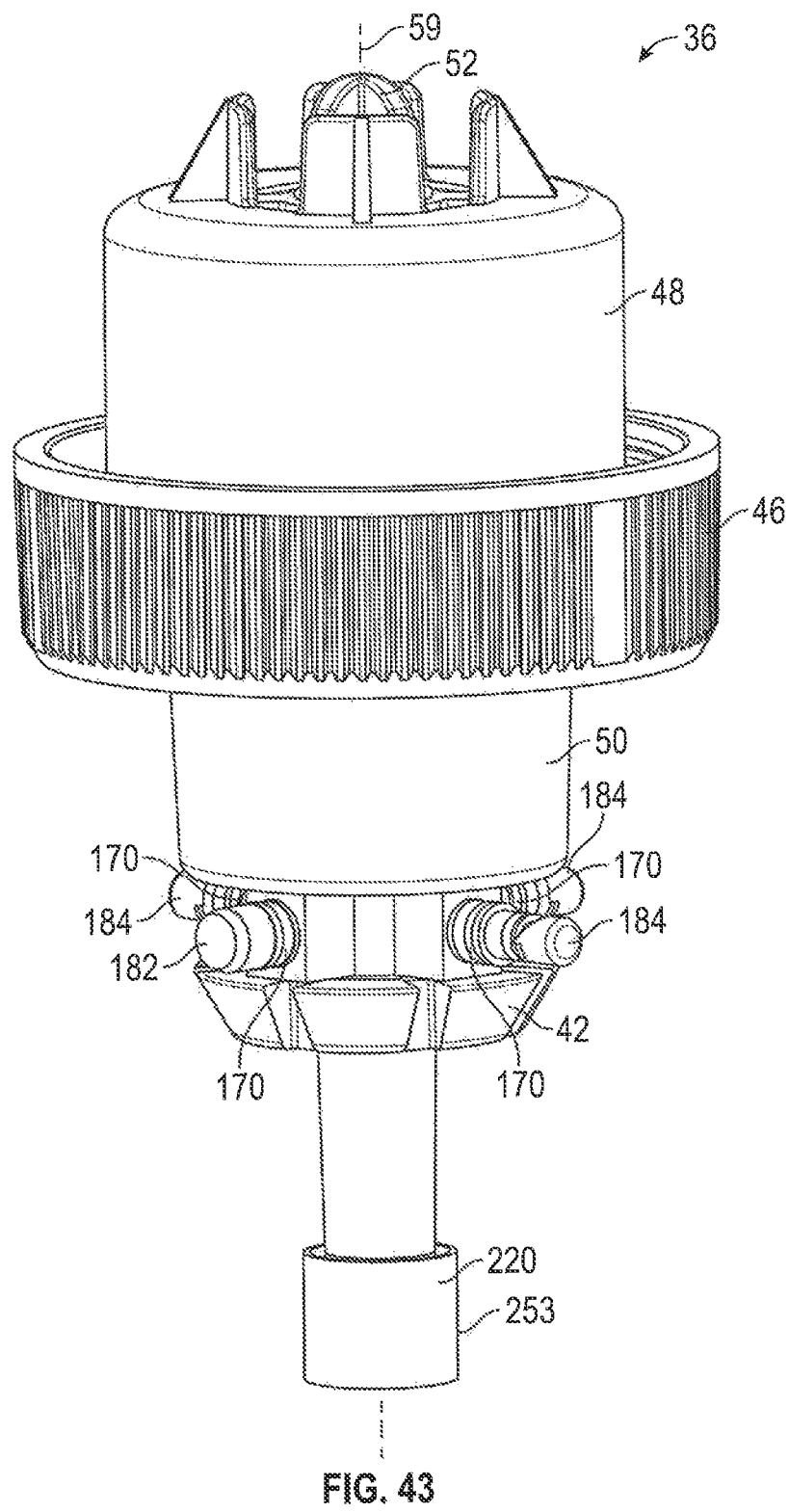
FIG. 43 is a perspective view of a pump assembly in accordance with an eighth embodiment of the invention.
Figure 44:
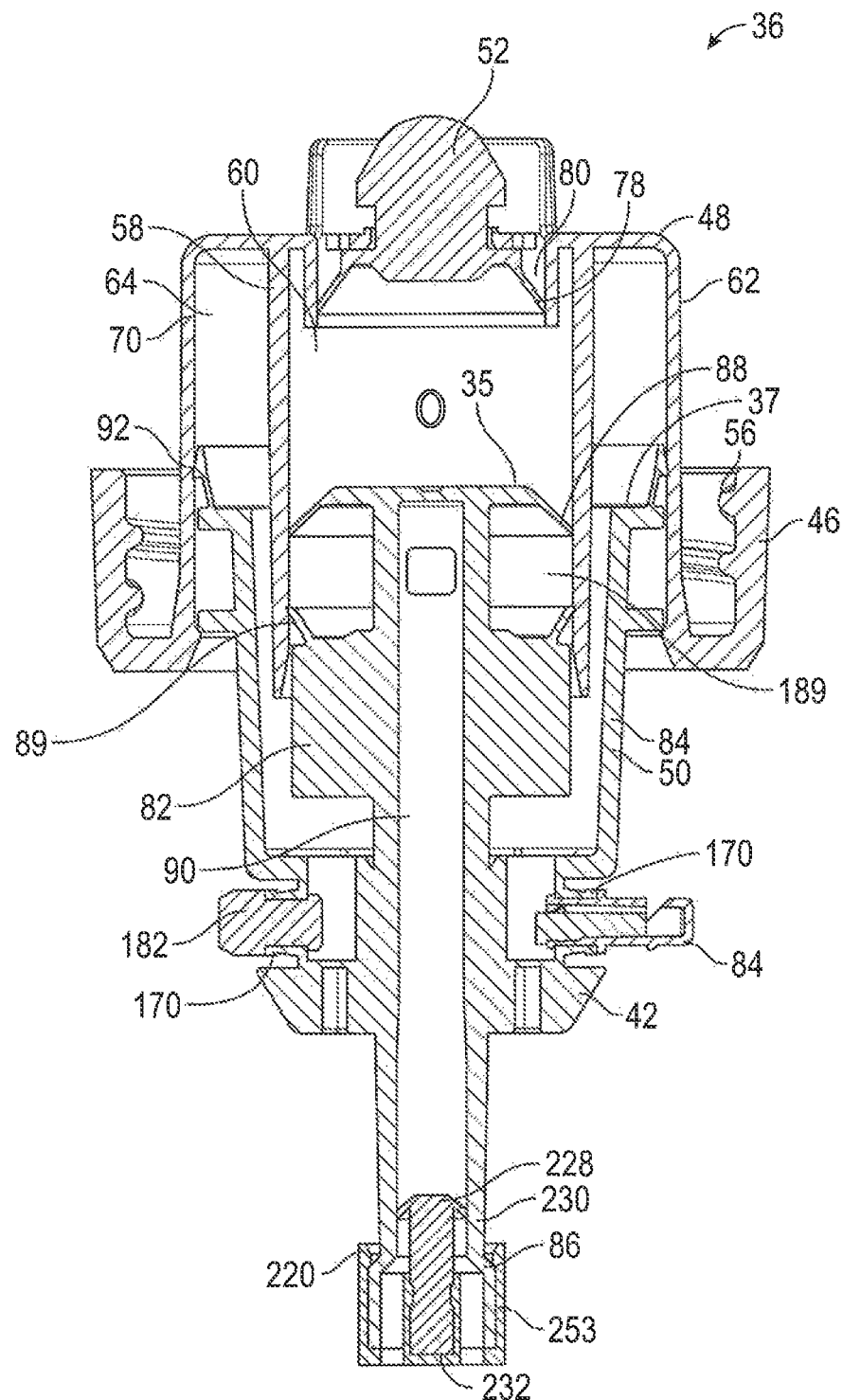
FIG. 44 is a cross-sectional view of the pump assembly shown in FIG. 43.

Other kinds of resistance generators 220 could also be used. For example, in the embodiment shown in FIGS. 43 and 44, the resistance generator 220 comprises a molded pressurizing valve 228 in place of the spring-loaded valve 222. This embodiment is otherwise identical to the previous embodiment (although different modular components are shown in the ports 170). The molded pressurizing valve 228 is fixed within the outlet channel 90 by being secured at its outer end in an inwardly extending central socket of the aperture plate 232. The valve 228 has an annular resiliently deformable pressurizing flange 230 that is angled axially downwards and radially outwards into fluid tight engagement with the annular inner surface of the outlet channel 90. The annular flange 230 can be deflected axially downwards and radially inwards by applying sufficient downwards pressure on the flange 230, and is biased to return to its original configuration upon release of the pressure. The flange 230 is configured to prevent fluid 26 from exiting the fluid outlet 86 until the pressure within the outlet channel 90 and the fluid chamber 60 is above a preselected threshold, as in the previous embodiment. When the preselected threshold is reached, the flange 230 deflects axially downwards and radially inwards, allowing the fluid 26 to flow past the valve 228 through the outlet channel 90 to be expelled from the fluid outlet 86. As in the previous embodiment, this increases the pressure within the fluid chamber 60 so as to resist inward movement of the piston body 50, leading to more consistent instroke speeds and more consistent sound profiles 200.

Figure 45:
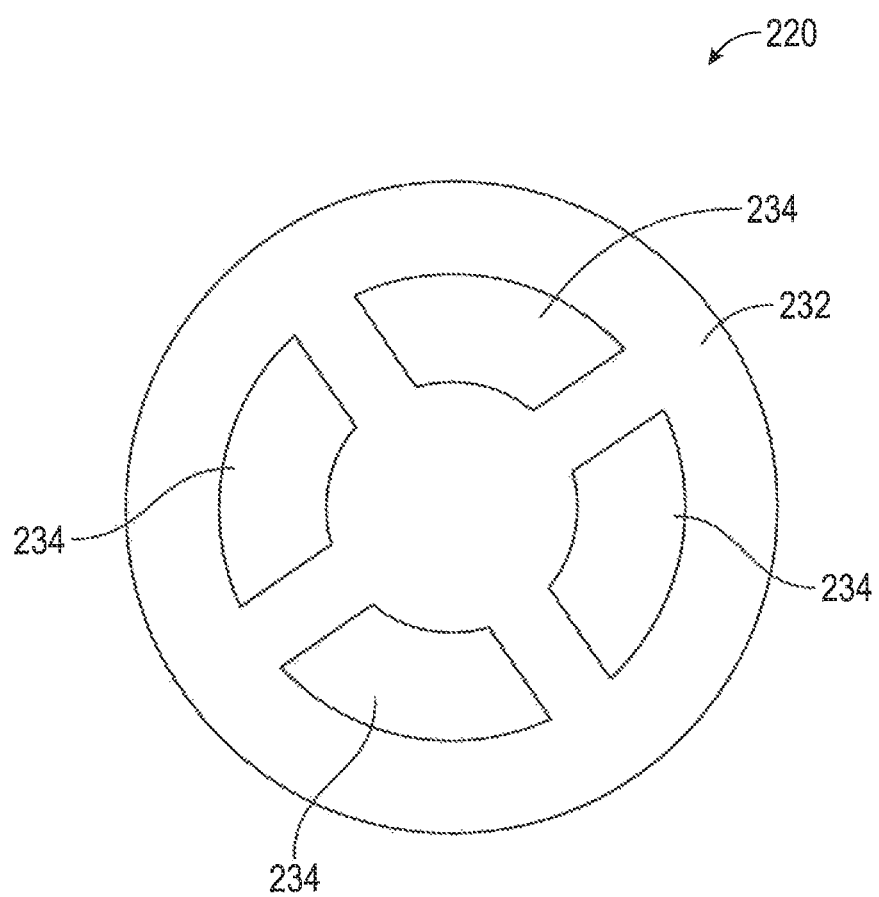
FIG. 45 is a bottom view of an aperture plate of the pump assembly shown in FIG. 43.

The resistance generator 220 also has an aperture plate 232 on its bottom end, as shown in FIG. 45. The aperture plate 232 defines four apertures 234 through which the fluid 26 must flow to dispense from the fluid outlet 86. This reduces the cross-sectional area of the pathway through which the fluid 26 flows, thus offering further resistance against the rapid dispensing of fluid 26 through a rapid instroke movement. Optionally, the pressurizing valve 228 may be omitted altogether, with the aperture plate 232 providing all of the resistance generator's 220 added resistance. The size of the apertures 234 is preferably selected based on the known viscosity of the fluid 26 being dispensed, so that adequate resistance is provided. The size of the apertures 234 may, for example, be selected to provide significant resistance against the flow of fluid 26 through the aperture plate 232 above a preselected threshold flow rate, while providing minimal resistance below that flow rate, with the preselected threshold flow rate corresponding to a preselected velocity of the piston body 50 during the instroke movement. This arrangement helps to keep the instroke movement at or below the preselected velocity, even when the actuator panel 24 is depressed forcefully, and thus leads to more consistent sound profiles 200 for compliance monitoring.

Although only certain exemplary constructions have been described and illustrated with respect to the seventh and eighth embodiments, other constructions for achieving the same results could be used instead, including differently shaped and positioned apertures 234 and valves 222, 228. Other mechanisms that provide resistance against the rapid movement of the piston body 50 from the first position to the second position could also be used, including mechanisms that do not rely on increasing the pressure within the fluid chamber 60. For example, the actuator panel 24 could be provided with a shock absorber or other mechanism that resists rapid movement. The various pressure stabilizing features described above could also be used in embodiments of the invention that lack modular ports 170 and/or incorporate only a single whistle 54. For example, alternative constructions are shown in FIGS. 46 to 49. Like reference numerals are used to denote like features.

Figure 46:
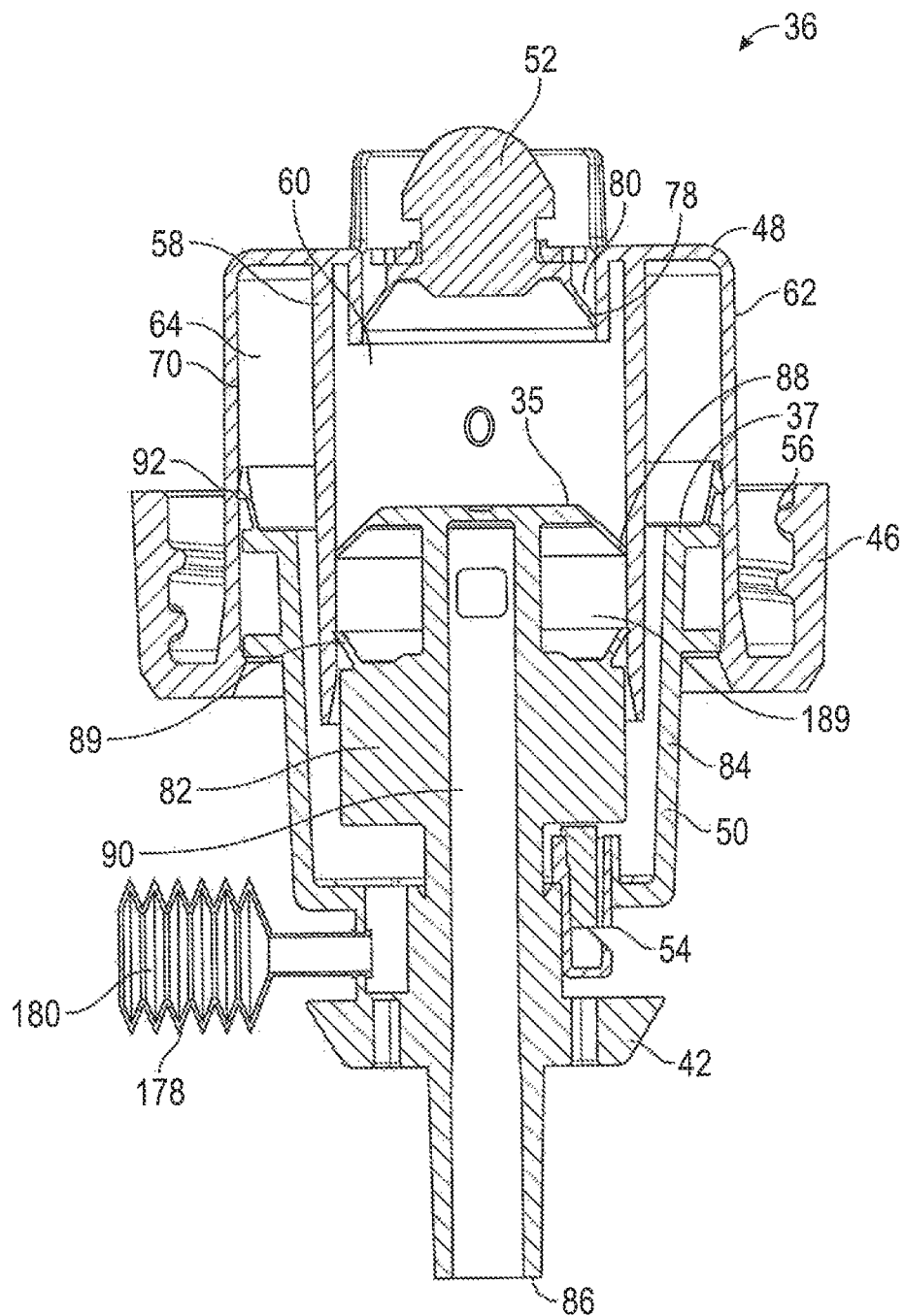
FIG. 46 is a cross-sectional view of a pump assembly in accordance with a ninth embodiment of the invention.

A pump assembly 36 in accordance with a ninth embodiment of the invention is shown in FIG. 46. This embodiment is identical to the pump assembly 36 shown in FIG. 27, but lacks the modular ports 170 and incorporates only a single air whistle 54 in fluid communication with the air chamber 64. The pump assembly 36 is operated in an identical manner as the configuration shown in FIG. 27, with the bellows 178 expanding when the pressure within the air chamber 64 exceeds a preselected threshold, to moderate fluctuations in the sound 28 produced by the air whistle 54.

Figure 47:
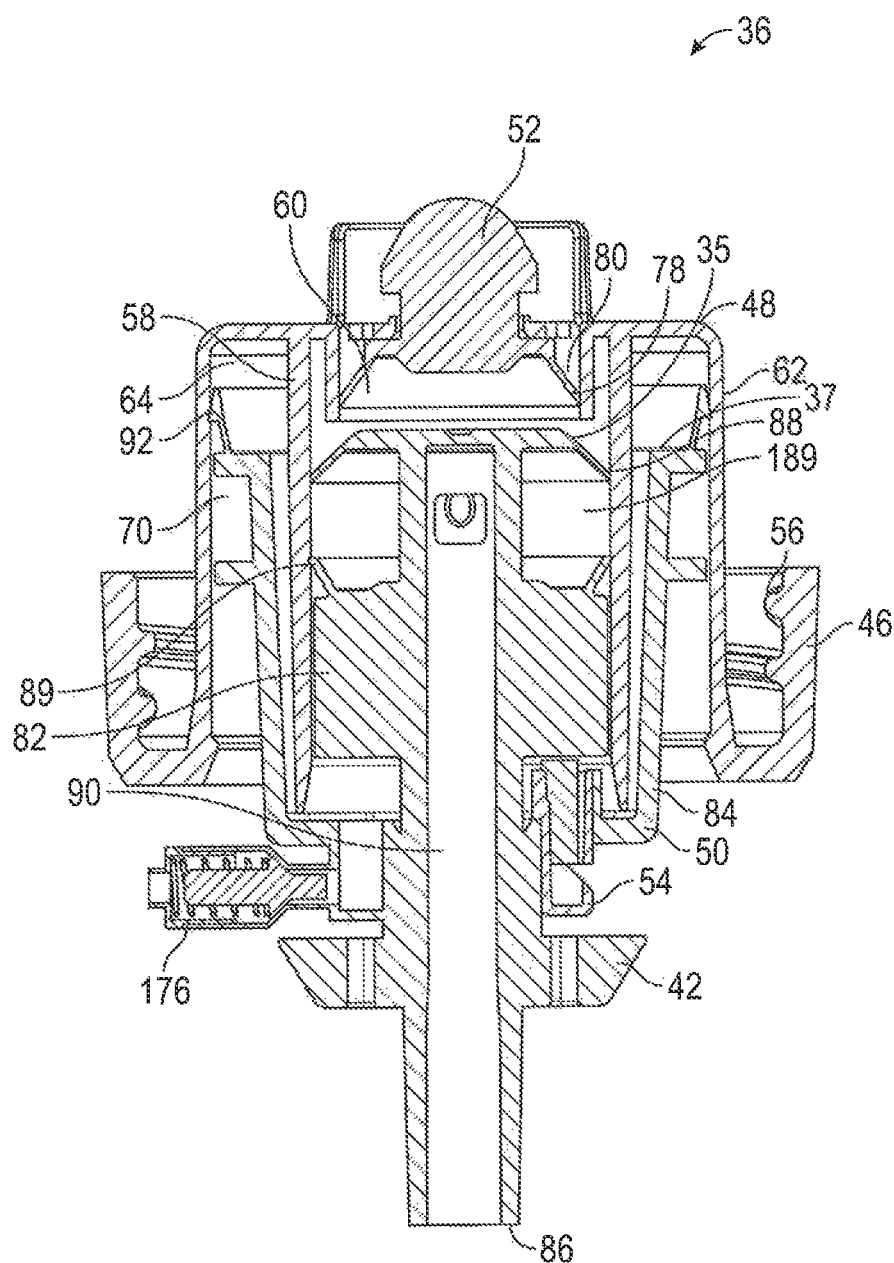
FIG. 47 is a cross-sectional view of a pump assembly in accordance with a tenth embodiment of the invention.

A pump assembly 36 in accordance with a tenth embodiment of the invention is shown in FIG. 47. This embodiment is identical to the pump assembly 36 shown in FIG. 26, but lacks the modular ports 170 and incorporates only a single air whistle 54 in fluid communication with the air chamber 64. The pump assembly 36 is operated in an identical manner as the configuration shown in FIG. 26, with the pressure relief valve 176 releasing air from the air chamber 64 when the pressure within the air chamber 64 exceeds a preselected threshold, to moderate fluctuations in the sound 28 produced by the air whistle 54.

Figure 48:
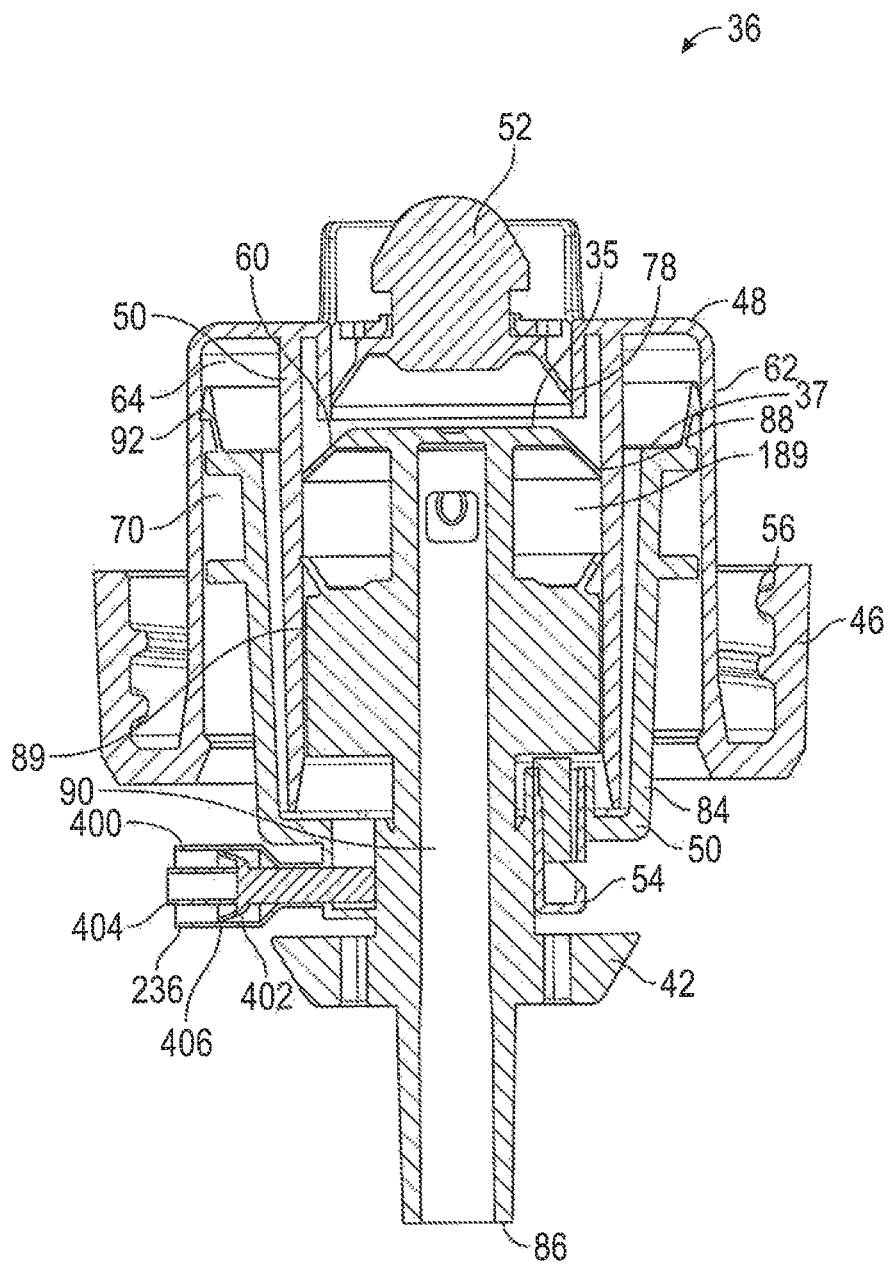
FIG. 48 is a cross-sectional view of a pump assembly in accordance with an eleventh embodiment of the invention.

A pump assembly 36 in accordance with an eleventh embodiment of the invention is shown in FIG. 48. This embodiment is identical to the tenth embodiment, but incorporates a molded pressure relief valve 236 in place of the spring-loaded pressure relief valve 176. The molded pressure relief valve 236 has a channel forming body 400 in fluid communication with the air chamber 64. The channel forming body 400 defines an annular valve channel 402. A molded valve member 404 is positioned within the valve channel 402. The valve member 404 has a resiliently flexible annular flange 406 that extends outwardly into fluid tight engagement with the inner surface of the valve channel 402. The flange 406 is configured to deflect inwardly, away from the inner surface of the valve channel 402, when sufficient pressure is applied thereto, providing a path for air to escape from the air chamber 64. The pump assembly 36 is operated in an identical manner as the tenth embodiment, with the molded pressure relief valve 236 releasing air from the air chamber 64 when the pressure within the air chamber 64 exceeds a preselected threshold, thereby causing the flange 406 to deflect away from the inner surface of the valve channel 402. As in the previous embodiment, this release of pressurized air from the air chamber 64 when the preselected threshold is reached or exceeded acts to moderate fluctuations in the sound 28 produced by the air whistle 54.

Figure 49:
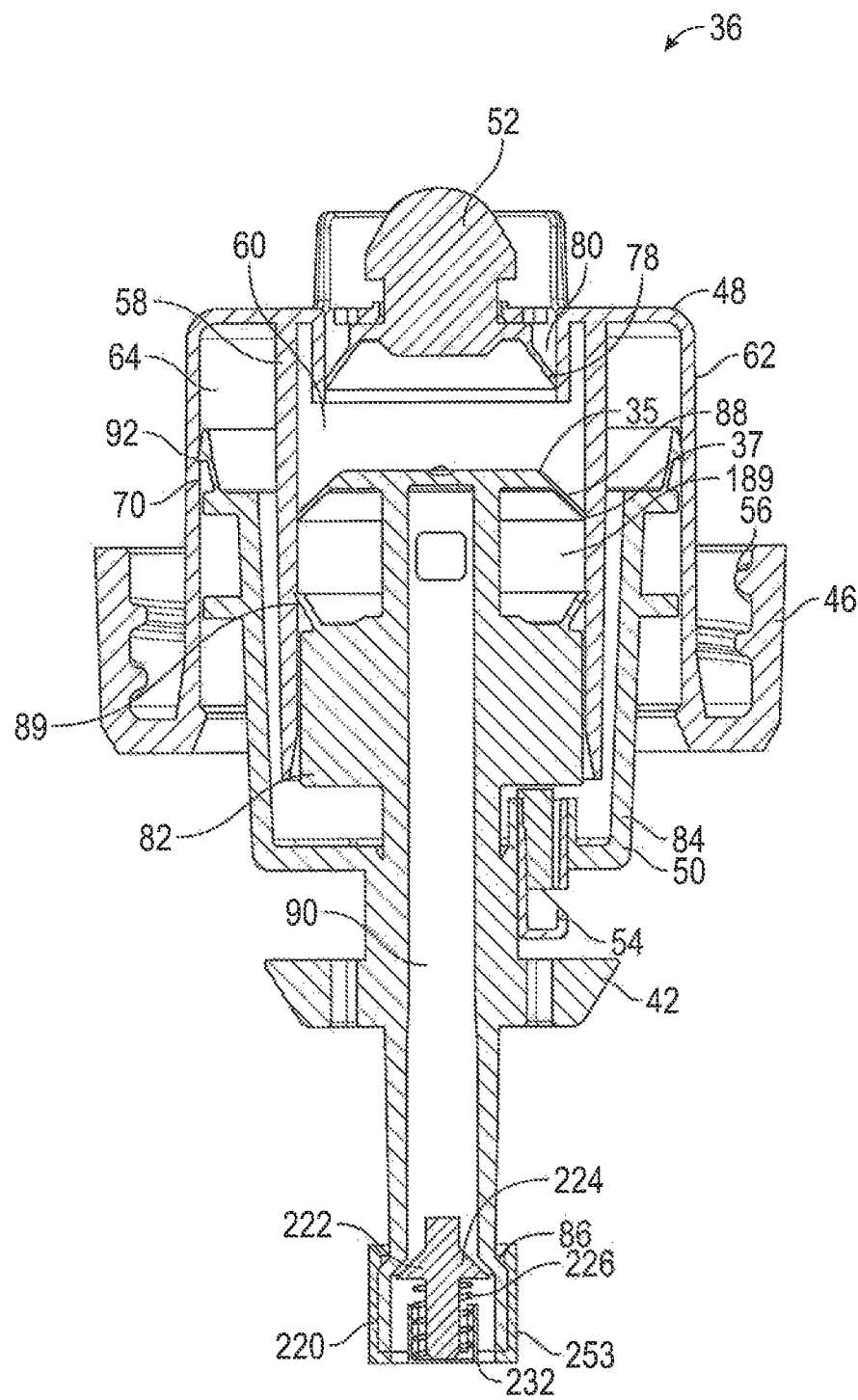
FIG. 49 is a cross-sectional view of a pump assembly in accordance with a twelfth embodiment of the invention.

A pump assembly 36 in accordance with a twelfth embodiment of the invention is shown in FIG. 49. This embodiment is identical to the pump assembly 36 shown in FIG. 42, but lacks the modular ports 170 and the bellows 178 and incorporates only a single air whistle 54 in fluid communication with the air chamber 64. The pump assembly 36 is operated in an identical manner as the configuration shown in FIG. 42, with the pressurizing valve 222 providing resistance against the rapid movement of the piston body 50 from the first position to the second position, to moderate fluctuations in the sound 28 produced by the air whistle 54.

Figure 50:
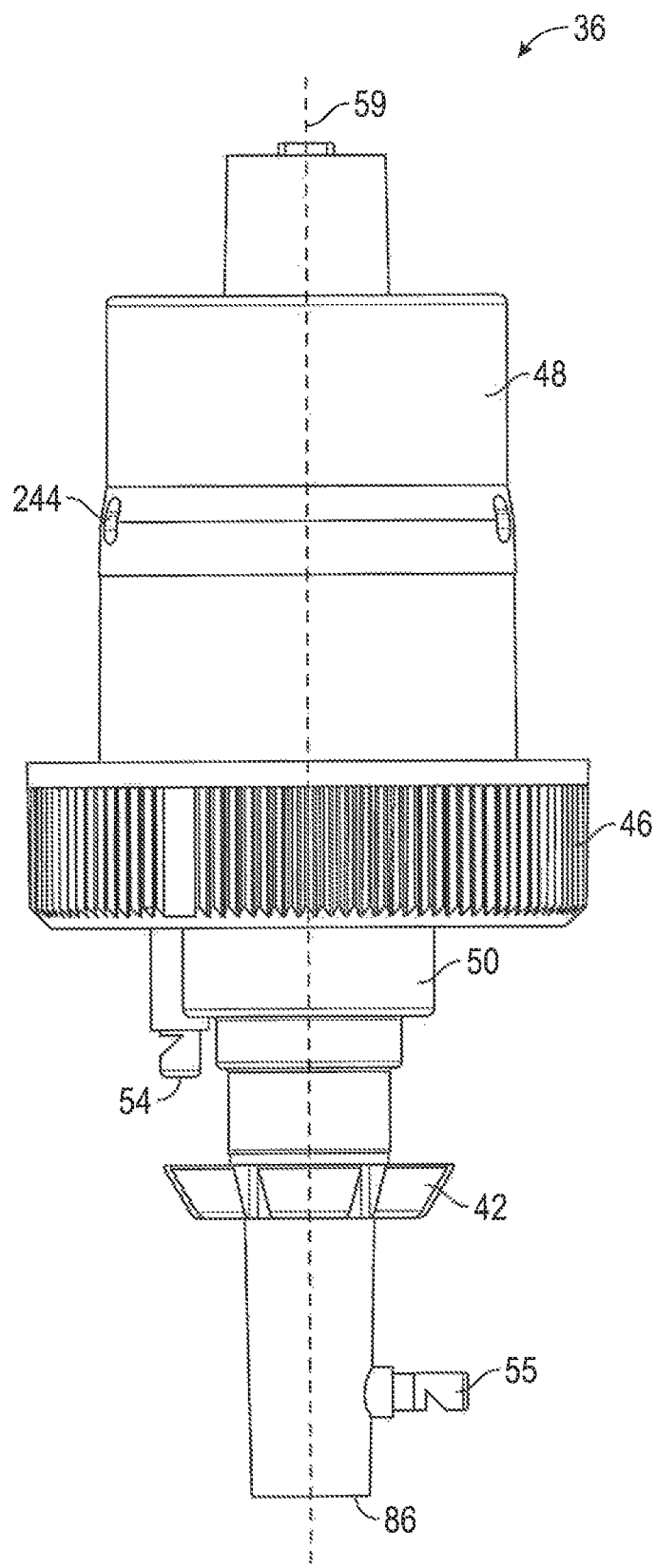
FIG. 50 is a front view of a pump assembly in accordance with a thirteenth embodiment of the invention.
Figure 51:
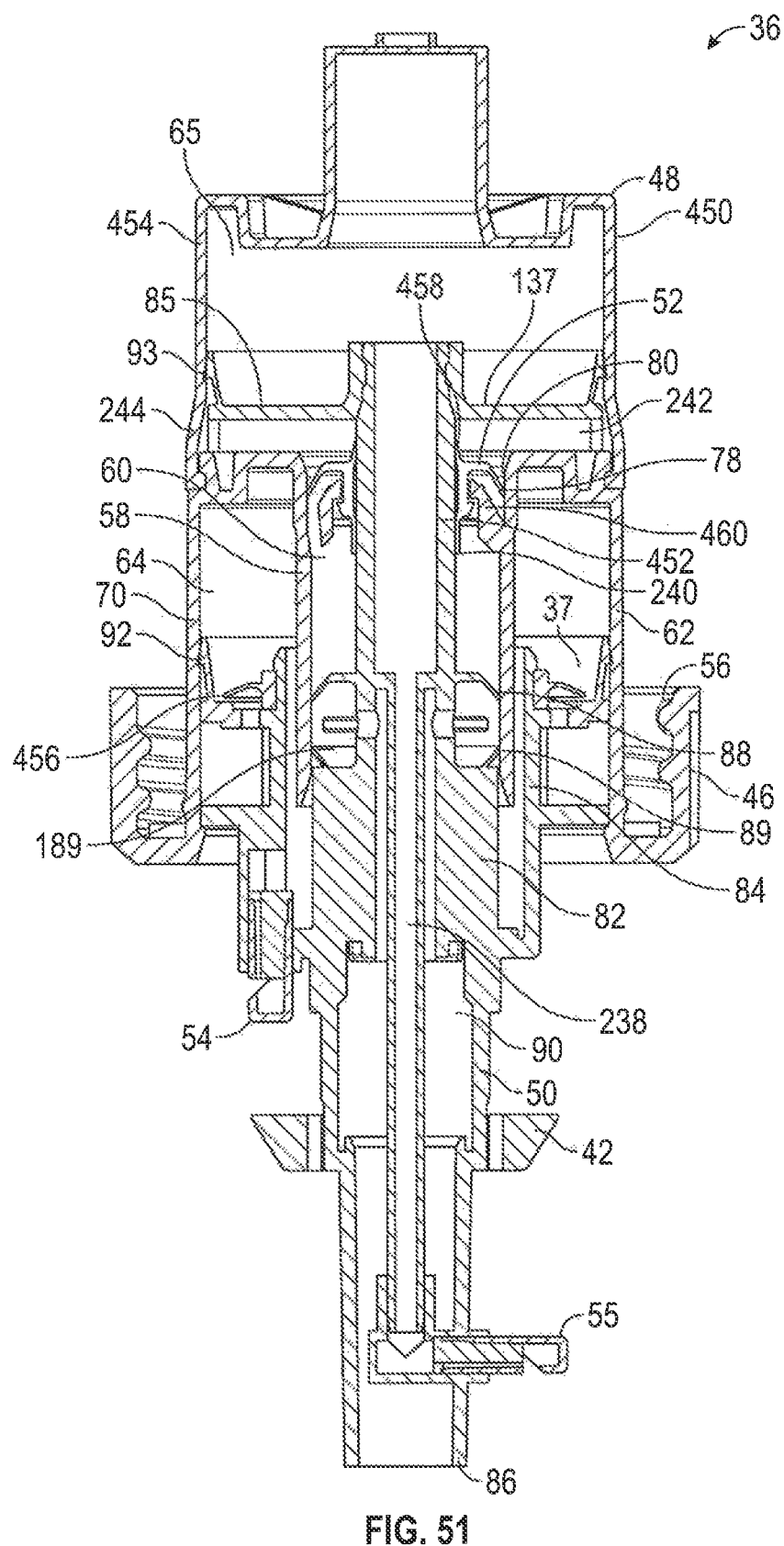
FIG. 51 is a cross-sectional view of the pump assembly shown in FIG. 50.

A pump assembly 36 in accordance with a thirteenth embodiment of the invention is shown in FIGS. 50 and 51. The pump assembly 36 shown in FIGS. 50 and 51 is functionally similar to the pump assembly 36 shown in FIG. 21, but has a different construction to provide a single fluid pump 35 and two air pumps 37 and 137. Like numerals are used to denote like features.

The pump assembly 36 includes two air whistles 54, 55 that produce the first and second sounds 28, 30 simultaneously, with each air stream coming from a separate air chamber 64, 65. The first annular air chamber 64 is defined between the inner wall 58 and the outer wall 62 of the piston chamber forming body 48. As in the previous embodiments, the first air whistle 54 is positioned adjacent to the fluid displacement body 82, and is in fluid communication with the first air chamber 64.

Unlike in the previous embodiments, the second annular air chamber 65 is located axially above the fluid chamber 60 and the first air chamber 64. The second air chamber 65 is defined by a cap portion 450 of the piston chamber forming body 48, which sits axially above the outer wall 62. The cap portion 450 also defines an intermediate fluid chamber 242 that is positioned between the first air chamber 64 and the second air chamber 64. The cap portion 450 has open fluid apertures 244 for receiving fluid 26 from the fluid reservoir 34 into the intermediate fluid chamber 242.

The second air whistle 65 extends laterally outwards from the piston body 50, and is positioned near the fluid outlet 86. The second air whistle 65 is fluidly connected to the second air chamber 65 by an air channel 238 which extends coaxially up through the fluid outlet channel 90, the fluid chamber 60, and the fluid inlet valve 52.

Also unlike the previous embodiments, the piston body 50 has an extension shaft 452 which extends coaxially up through the fluid chamber 60, the fluid inlet valve 52, and into the second air chamber 65. The second air displacement body 85 extends radially outwards from the extension shaft 452 towards an annular wall 454 of the cap portion 450 of the piston chamber forming body 48, so that the second sealing edge 93 sealingly engages with the annular wall 454 of the cap portion 450. The second air chamber 65 is defined above the second air displacement body 85, and the intermediate fluid chamber 242 is defined below the second air displacement body 85.

The first sealing edge 92 of the first air displacement body 84 engages with the inner surface 70 of the outer wall 62 of the piston chamber forming body 48, as in the previous embodiments. Optionally, a one-way air inlet valve 456 is positioned on the first air displacement body 84 for receiving atmospheric air into the first air chamber 64.

In order to accommodate the extension shaft 452, the fluid inlet valve 52 has a different construction than in the previous embodiments. In particular, the inlet valve 52 has an annular channel 458 through which the extension shaft 452 passes. Sealing lips 240 of the inlet valve 52 sealingly engage with the outer surface of the extension shaft 452 while allowing the extension shaft 452 to move coaxially through the channel 458. The inlet flange 78 deflects radially inwards to allow fluid 26 to enter the fluid chamber 60 when the pressure within the fluid chamber 60 is lower than the pressure within the intermediate fluid chamber 242. When the pressure within the fluid chamber 60 is higher than the pressure within the intermediate fluid chamber 242, the inlet flange 78 moves radially outwards into sealing engagement with the upper opening 80 of the piston chamber forming body 48, preventing the fluid 26 from exiting the fluid chamber 60 via the inlet valve 52. Locking fingers 460 extend radially inwardly from the inner wall 58 of the piston chamber forming body 48 to hold the inlet valve 52 in place.

As in the previous embodiments, the pump assembly 36 can be used for dispensing fluid 26 from a housing 18 similar to the one shown in FIG. 1. Prior to activation, the pump assembly 36 is in the extended first position shown in FIG. 51, with fluid 26 contained within the fluid chamber 60 and air contained within the first air chamber 64 and the second air chamber 65. When the actuator panel 24 is pressed by a user, the piston body 50 moves coaxially inwardly and upwards relative to the piston chamber forming body 48 in an instroke movement. This moves the fluid displacement body 82 upwards and axially inwardly within the fluid chamber 60; moves the first air displacement body 84 upwards and axially inwardly within the first air chamber 64; and moves the second air displacement body 85 upwards and axially inwardly within the second air chamber 65.

As in the previous embodiments, the upwards movement of the fluid displacement body 82 within the fluid chamber 60 pressurizes the fluid 26 and forces the fluid 26 out through the fluid outlet 86.

The upwards movement of the first air displacement body 84 within the first air chamber 64 also pressurizes the air within the first air chamber 64, thus delivering a first stream of pressurized air though the first air whistle 54, and causing the first air whistle 54 to emit the first sound 28. The upwards movement of the second air displacement body 85 within the second air chamber 65 likewise pressurizes the air within the second air chamber 65, thus delivering a second stream of pressurized air through the second air whistle 55, and causing the second air whistle 55 to emit the second sound 30. As in the sixth embodiment of the invention shown in FIG. 24, the first and second sounds 28, 30 are emitted simultaneously, preferably at different frequencies. The resulting sound profile 200 can be used for compliance monitoring, as in the previous embodiments.

During the outstroke movement, fluid 26 enters the fluid chamber 60 through the inlet valve 52; air enters the first air chamber 64 through the first air whistle 54 and/or the one-way air inlet valve 456; and air enters the second air chamber 65 through the second air whistle 55, similarly to the previously described embodiments. The fluid 26 enters the fluid chamber 60 indirectly from the fluid reservoir 34 via the intermediate fluid chamber 242.

Figure 52:
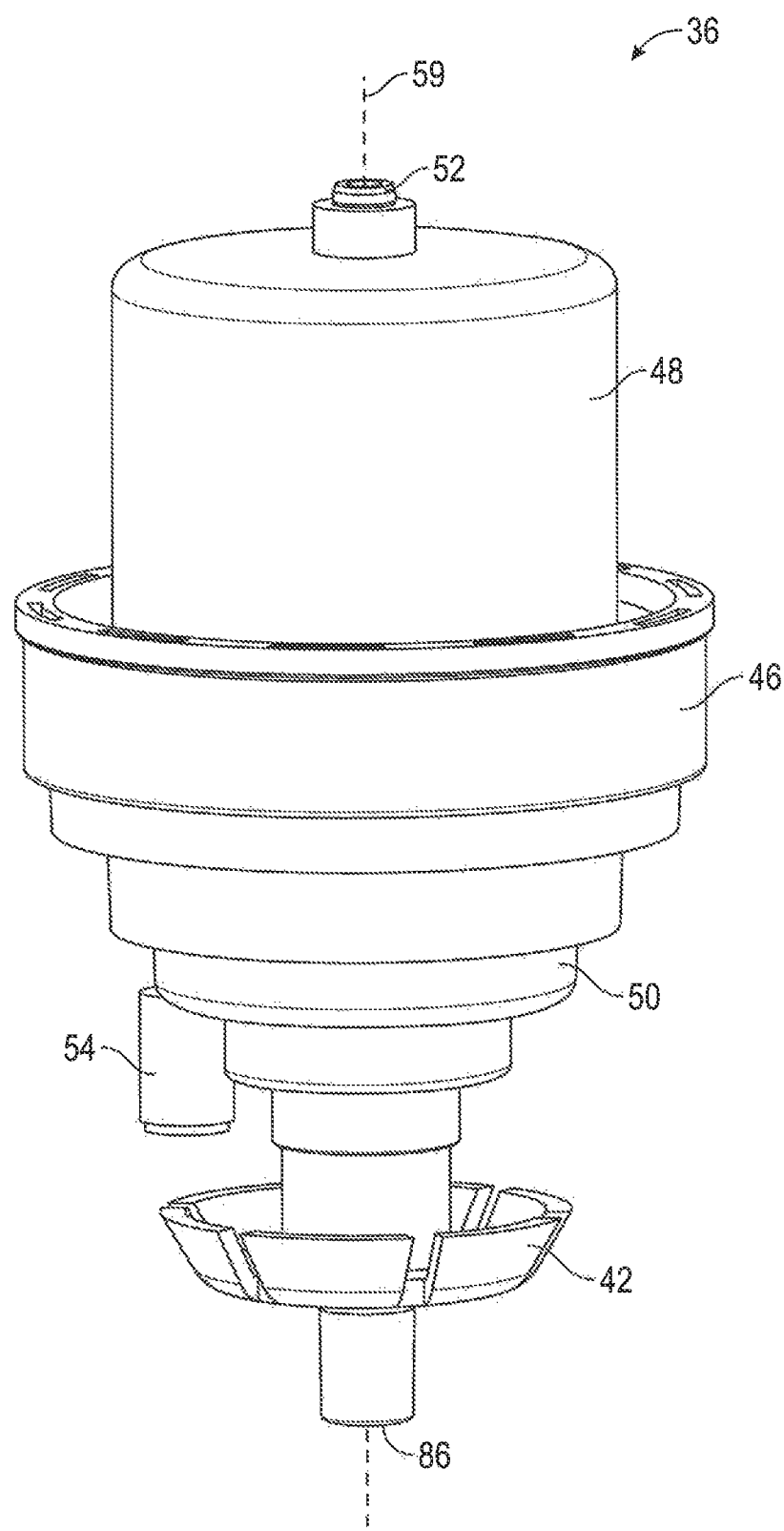
FIG. 52 is a perspective view of a pump assembly in accordance with a fourteenth embodiment of the invention.
Figure 53:
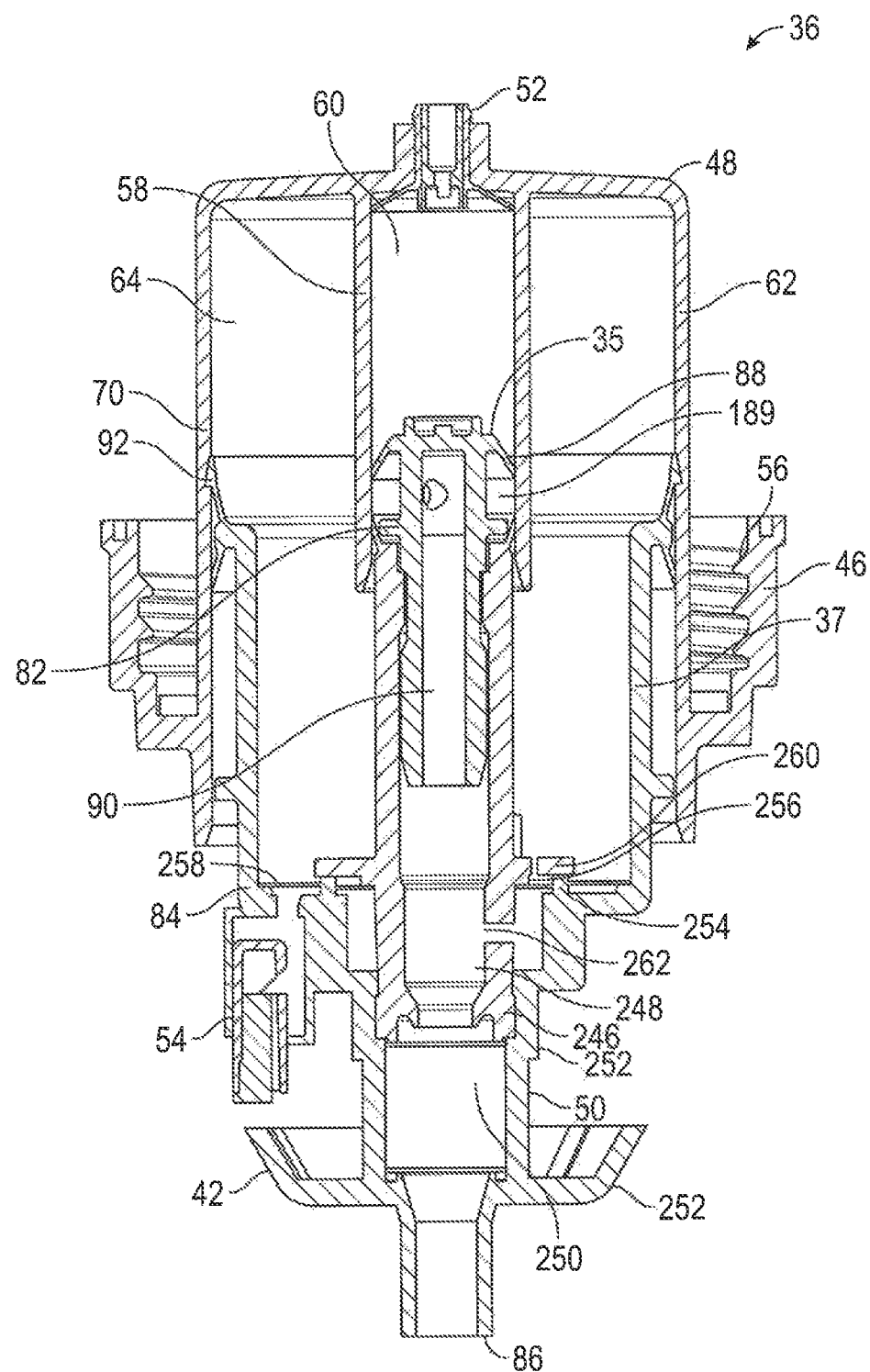
FIG. 53 is a cross-sectional view of the pump assembly shown in FIG. 52.

In other embodiments of the invention, one or more sound generating air whistles 54 may be used with a pump assembly 36 that generates foam. For example, in the fourteenth embodiment of the invention shown in FIGS. 52 and 53, the air that is used to generate foam is drawn in through an air whistle 54, so that the pump assembly 36 generates a sound 28 that can be used for compliance monitoring. This construction permits both foam and the sound 28 to be generated using a single air chamber 64. Like numerals are used to denote like features.

As in the previous embodiments, the pump assembly 36 includes a piston chamber forming body 48 and a piston body 50. The piston body 50 has a foam generator 246 positioned between the fluid outlet channel 90 and the fluid outlet 86. The foam generator 246 includes a mixing chamber 248 that receives fluid 26 from the fluid chamber 60 and air from the air chamber 64, and a solid foam plug 250 that is positioned between the mixing chamber 248 and the fluid outlet 86. Two screens 252 are positioned at respective axial ends of the foam plug 250, so that the air and the fluid 26 must pass through the screens 252 and the foam plug 250 when dispensed. This causes the air and the fluid 26 to thoroughly mix, generating foam.

The piston body 50 also has an annular valve body 254 that surrounds the mixing chamber 248 at the lower axial end of the air displacement body 84. The valve body 254 has a flexible inner ring 256 that extends radially inwards towards the mixing chamber 248, and a flexible outer ring 258 that extends radially outwards away from the mixing chamber 248. The flexible outer ring 258 extends over the air whistle 54 and is configured to deflect away from the air whistle 54 when the pressure within the air chamber 64 is lower than the pressure within the air whistle 54, thereby allowing atmospheric air to flow through the whistle 54 and into the air chamber 64. When the pressure within the air chamber 64 exceeds the pressure within the air whistle 54, the flexible outer ring 258 is urged downwards into fluid tight engagement with the air displacement body 84. The flexible outer ring 258 thus acts as a one-way air inlet valve, allowing atmospheric air to enter the air chamber 64 through the air whistle 54, and preventing the air contained within the air chamber 64 from exiting the air chamber 64 through the air whistle 54.

The flexible inner ring 256 is positioned between the air chamber 64 and the mixing chamber 248. In particular, the annular valve body 254 has apertures 260 that place the top surface of the flexible inner ring 256 in fluid communication with the air chamber 64, and the mixing chamber 248 has an opening 262 that places the bottom surface of the flexible inner ring 256 in fluid communication with the mixing chamber 248. When the pressure within the mixing chamber 248 exceeds the pressure within the air chamber 64, the flexible inner ring 256 is urged upwards into fluid tight engagement with the outer surface of the mixing chamber 248, preventing air and fluid 26 from passing past the flexible inner ring 256 between the air chamber 64 and the mixing chamber 248. When the pressure within the air chamber 64 exceeds the pressure within the mixing chamber 248, the flexible inner ring 256 is urged downwards, away from the outer surface of the mixing chamber 248, providing a path for air to flow from the air chamber 64 into the mixing chamber 248. The flexible inner ring 256 thus acts as a one-way air outlet valve, allowing air to pass from the air chamber 64 into the mixing chamber 248, and preventing air and fluid 26 from entering the air chamber 64 from the mixing chamber 248.

The pump assembly 36 can be used for dispensing the fluid 26 as foam, using a housing 18 similar to the one shown in FIG. 1. Prior to activation, the pump assembly 36 is in the extended first position shown in FIG. 53, with fluid 26 contained within the fluid chamber 60 and air contained within the air chamber 64. When the actuator panel 24 is pressed by a user, the piston body 50 moves coaxially inwardly and upwards relative to the piston chamber forming body 48 in an instroke movement. This moves the fluid displacement body 84 upwards and axially inwardly within the fluid chamber 60 and moves the air displacement body 84 upwards and axially inwardly within the air chamber 64. The upwards movement of the fluid displacement body 82 within the fluid chamber 60 pressurizes the fluid 26 and forces the fluid 26 into the mixing chamber 248.

At the same time, the upwards movement of the air displacement body 84 within the air chamber 64 pressurizes the air within the air chamber 64. The increased pressure within the air chamber 64 deflects the flexible inner ring 256 downwards, providing a path for the pressurized air to pass from the air chamber 64 into the mixing chamber 248, through the opening 262 in the wall of the mixing chamber 248. The increased pressure also urges the flexible outer ring 258 downwards into sealing engagement with the air displacement body 84, preventing the pressurized air from exiting through the air whistle 54.

As air and fluid 26 are forced into the mixing chamber 248, the pressure within the mixing chamber 248 also increases. This forces the air and the fluid 26 to pass through the screens 252 and the foam plug 250, thoroughly mixing the air and the fluid 26 to generate foam. The foam is then dispensed from the fluid outlet 86.

During the outstroke movement, fluid 26 enters the fluid chamber 60 through the inlet valve 52, as in the previous embodiments. As the air displacement body 84 is moved downwards the volume of air contained within the air chamber 64 increases. This creates a vacuum, which biases the flexible outer ring 258 upwards, allowing atmospheric air to be drawn in through the air whistle 54. The stream of air passing through the air whistle 54 causes the air whistle 54 to generate the sound 28. At the same time, the vacuum pulls the flexible inner ring 256 upwards into sealing engagement with the outer surface of the mixing chamber 248, preventing the air and fluid 26 contained within the mixing chamber 248 from being drawn into the air chamber 64. The sound 28 can be used to monitor activations of the pump assembly 36 using a sound sensing mechanism 14 and a computer 16, as in the previous embodiments.

Optionally, additional air whistles 55, 172, 174 may be added to provide additional sounds 30, 32, 114. For example, the additional air whistles 55, 172, 174 could be placed circumferentially about the air displacement body 84 below the flexible outer ring 258, so that atmospheric air is drawn in through the air whistles 55, 172, 174 to generate the additional sounds 30, 32, 114 during the outstroke, similarly to the first air whistle 54. The flexible outer ring 258 would furthermore prevent air within the air chamber 64 from escaping through the air whistles 55, 172, 174 during the instroke.

In other embodiments, the foam generating pump assembly 36 could be configured so that air is drawn into the air chamber 64 during the instroke rather than the outstroke. This could be achieved by using a stepped air chamber 64 construction as described previously and shown in U.S. Pat. No. 7,267,251 to Ophardt, which is incorporated herein by reference. The pump assembly 36 could be configured to generate the sound 28 during the inhalation of air into the air chamber 64 or during the exhalation of air from the air chamber 64. For example, the air whistle 54 could be positioned between the air chamber 64 and the foam generator 246, so that the sound 28 is generated as air passes from the air chamber 64 through the whistle 54 into the foam generator 246. The pump assembly 36 could also be configured so that some of the air that is expelled from the air chamber 64 passes through the whistle 54 to generate the sound 28, and some of the air passes through the foam generator 246 to generate foam. The pump assembly 36 could also incorporate multiple air chambers 64, 65, with one of the air chambers 64 providing air to the whistle 54 to generate the sound 28, and the other air chamber 65 providing air to the foam generator 246 to generate foam.

In still other embodiments of the invention, the housing 18 of the fluid dispenser 12 can be provided with its own air whistle 500, in addition to or in place of the air whistles 54, 55, 172, 174 incorporated into the pump assembly 36. For example, in the fifteenth embodiment of the invention shown in FIGS. 54 to 56, a fluid dispenser 12 is provided that is to removably receive a pump assembly 36 (not shown in FIGS. 55 and 56) between the stationary mount 44 and the movable seat 40 in identical manner as in the first embodiment of FIGS. 1 to 7, however the housing 18 includes a housing sound generator 499 that is activated by the movable seat 40 when the actuator panel 24 is pressed whether or not the pump assembly 36 is coupled to the housing 18. Like numerals are used to denote like features.

Figure 55:
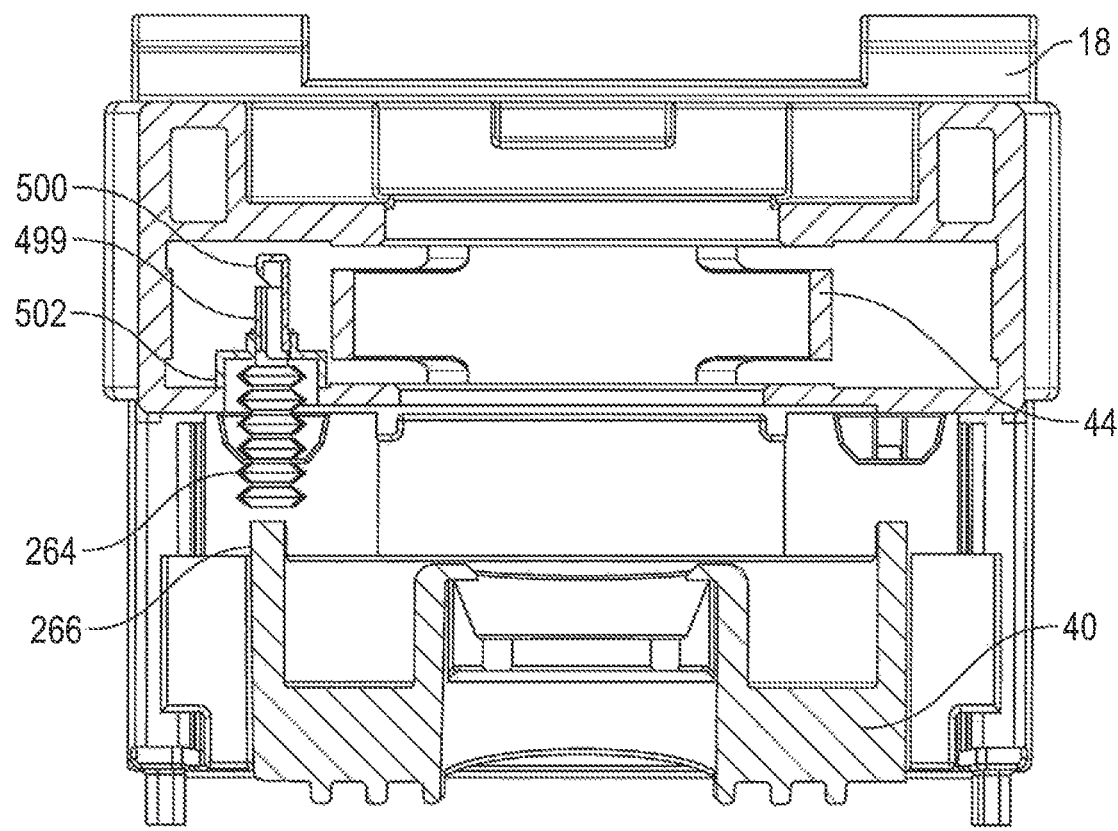
FIG. 55 is a cross-sectional front view of the fluid dispenser shown in FIG. 54 along section line A-A', with the movable seat in a lowered state and only a lower portion of the housing shown.
Figure 56:
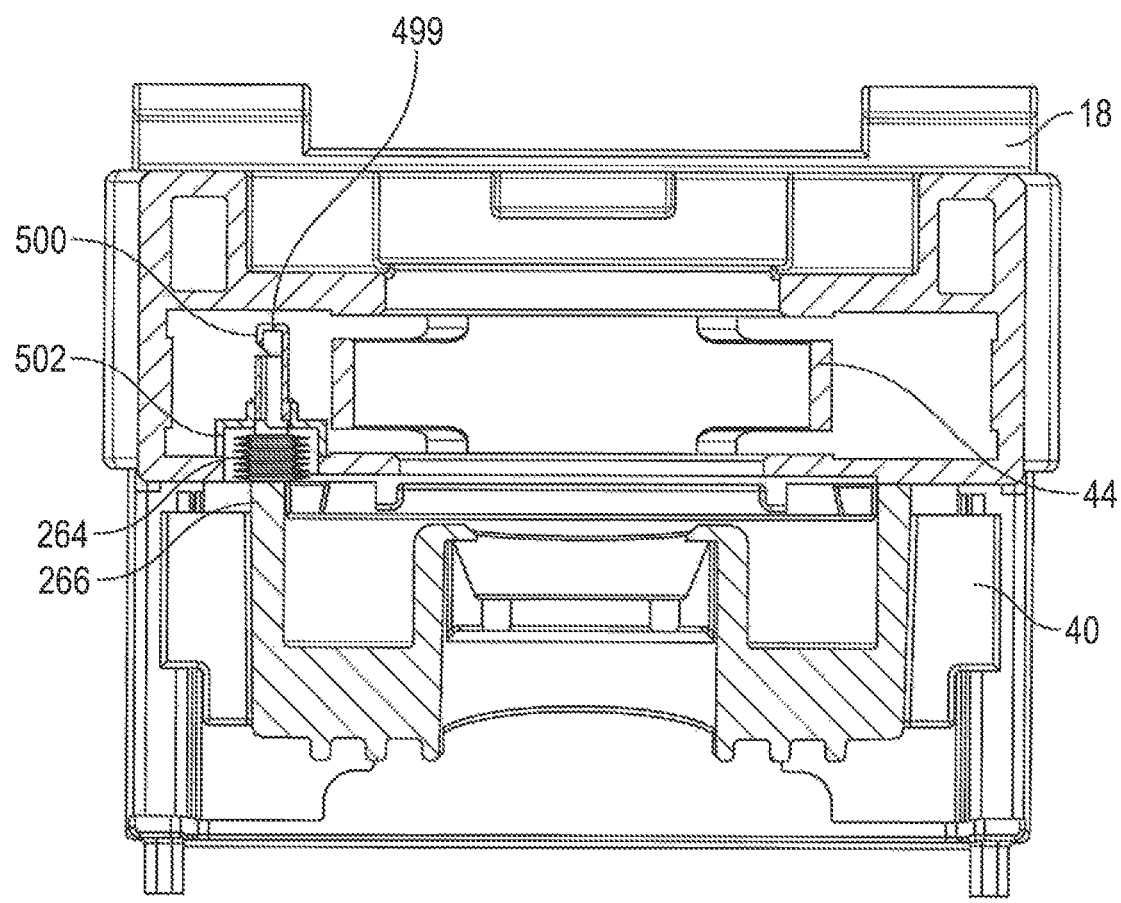
FIG. 56 is the same cross-sectional front view of the fluid dispenser shown in FIG. 55, with the movable seat in a raised state.

As shown in FIGS. 55 and 56, in this embodiment of the invention the housing sound generator 499 comprises an air whistle 500. The air whistle 500 is mounted in the stationary mount 44 above an annular compression chamber 502 in the stationary mount 44. The air whistle 500 is mounted to the housing 18 by being fixed to the stationary mount 44 of the support assembly 38. A resiliently compressible bellows 264 extends downwards from the air whistle 500 through the compression chamber 502 towards the movable seat 40. The resiliently compressible bellows is in fluid communication with the air whistle 500. The upper end of the bellows 264 is open to the air whistle 500 and the lower end of the bellows 264 is closed. The bellows 264 has an expanded state and a contracted state, and defines an internal volume of air that is greater in the expanded state than in the contracted state. The bellows 264 is in the expanded state in FIG. 55 and the contracted state in FIG. 56. As shown in FIG. 56, the bellows 264 fits almost entirely within the compression chamber 502 when in the contracted state. The bellows 264 is made from a resiliently deformable material that is biased towards the expanded state.

The movable seat 40 includes an upwardly extending whistle activation member 266 that is positioned below the bellows 264. As in the first embodiment of the invention described above, when the actuator panel 24 is pressed, the movable seat 40 raises from the lowered position shown in FIG. 55 to the raised position shown in FIG. 56. In addition to activating a pump assembly 36 (not shown) that may be coupled to the dispenser 12, the upwards movement of the movable seat 40 brings the whistle activation body 266 into engagement with the bellows 264, compressing the bellows 264 from the expanded state to the contracted state. This pressurizes the air within the bellows 264, forcing a stream of air to pass through the air whistle 500 and causing the air whistle 500 to emit the first sound 28.

A pump assembly 36 is not shown coupled to the dispenser 12 in FIGS. 55 and 56 for ease of illustration, but a pump assembly 36 as in the other embodiments is to be removably received on the dispenser 12 as illustrated in the previous embodiments. As in the previously described embodiments, when a pump assembly 36 such as the pump assembly 36 in FIGS. 1 to 7 is engaged on the dispenser 12, the upwards movement of the movable seat 40 moves the piston body 50 upwards within the piston chamber forming body 48 in an instroke movement, which causes the pump assembly 36 to dispense an allotment of fluid 26. Any of the pump assemblies 36 described in the previous embodiments could optionally be used.

When the actuator panel 24 is released by the user, springs 268 push the movable seat 40 back down to the lowered position shown in FIG. 55. The movement of the whistle activation body 266 away from the bellows 264 allows the bellows 264 to expand and return to the expanded state, taking in air through the air whistle 500. During the outstroke movement of the movable seat 40 back down relative the stationary mount 44 to the lowered position, the downwards movement of the movable seat 40 pulls the piston body 50 of the pump assembly 36 downwards relative to the piston chamber forming body 48 to draw air into the air chamber 64 and fluid 26 into the fluid chamber 60.

The housing 18 is intended to be installed in a facility for an extended period of time, whereas the pump assembly 36 and fluid reservoir 34 are replaceable. In particular, the gripping collar 46 of the pump assembly 36 is releasable from the stationary mount 44, so that the pump assembly 36 and the fluid reservoir 34 can be removed and replaced when the fluid reservoir 34 is empty. This allows different pumps 36 to be used at different times, including pumps 36 having a different arrangement of whistles 55, 172, 174 providing a different sound profile 300.

Figure 26:
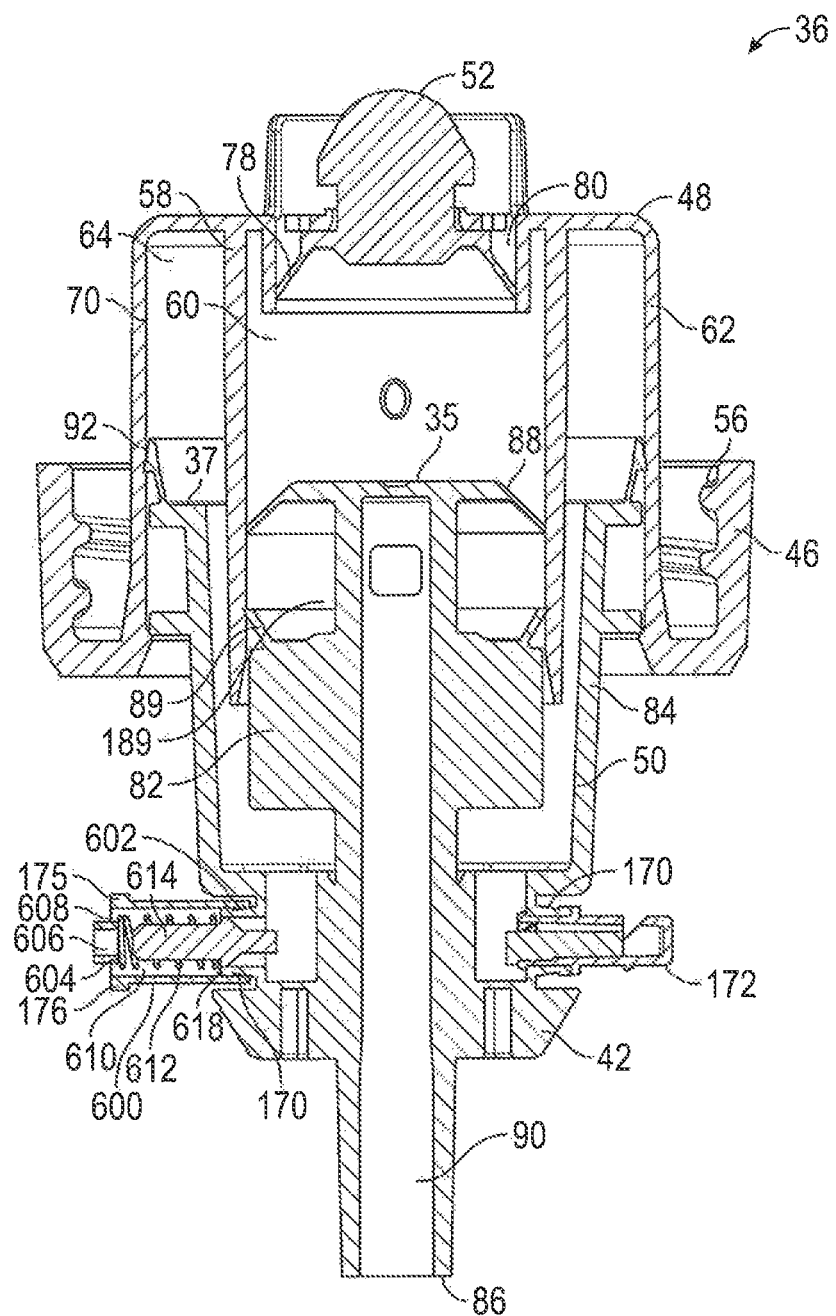
FIG. 26 is a cross-sectional view of the pump assembly shown in FIG. 24, configured to incorporate a pressure relief valve in place of one of the air whistles.
Figure 54:
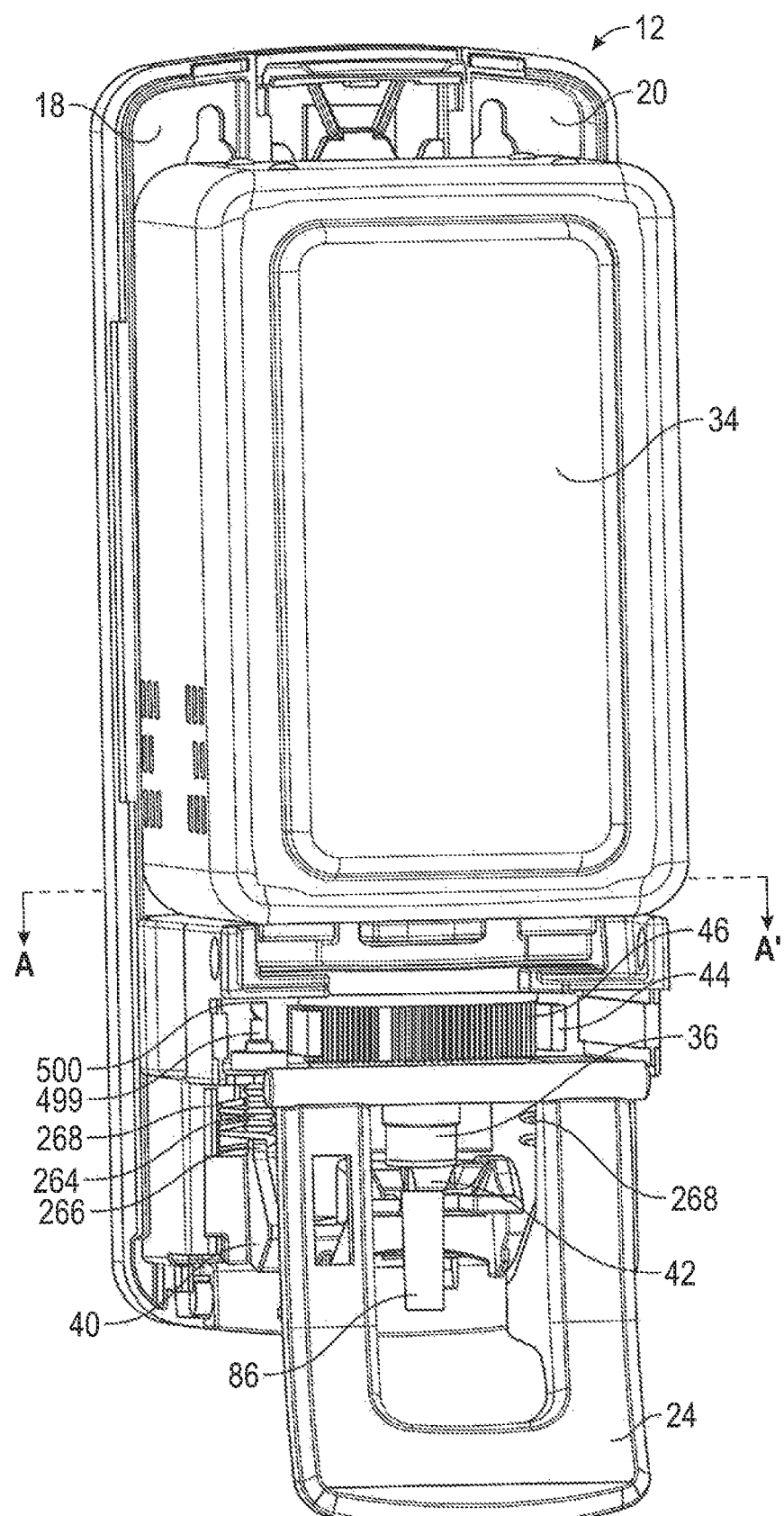
FIG. 54 is a perspective view of a fluid dispenser in accordance with a fifteenth embodiment of the invention, with a front cover of the housing removed.
Figure 57:
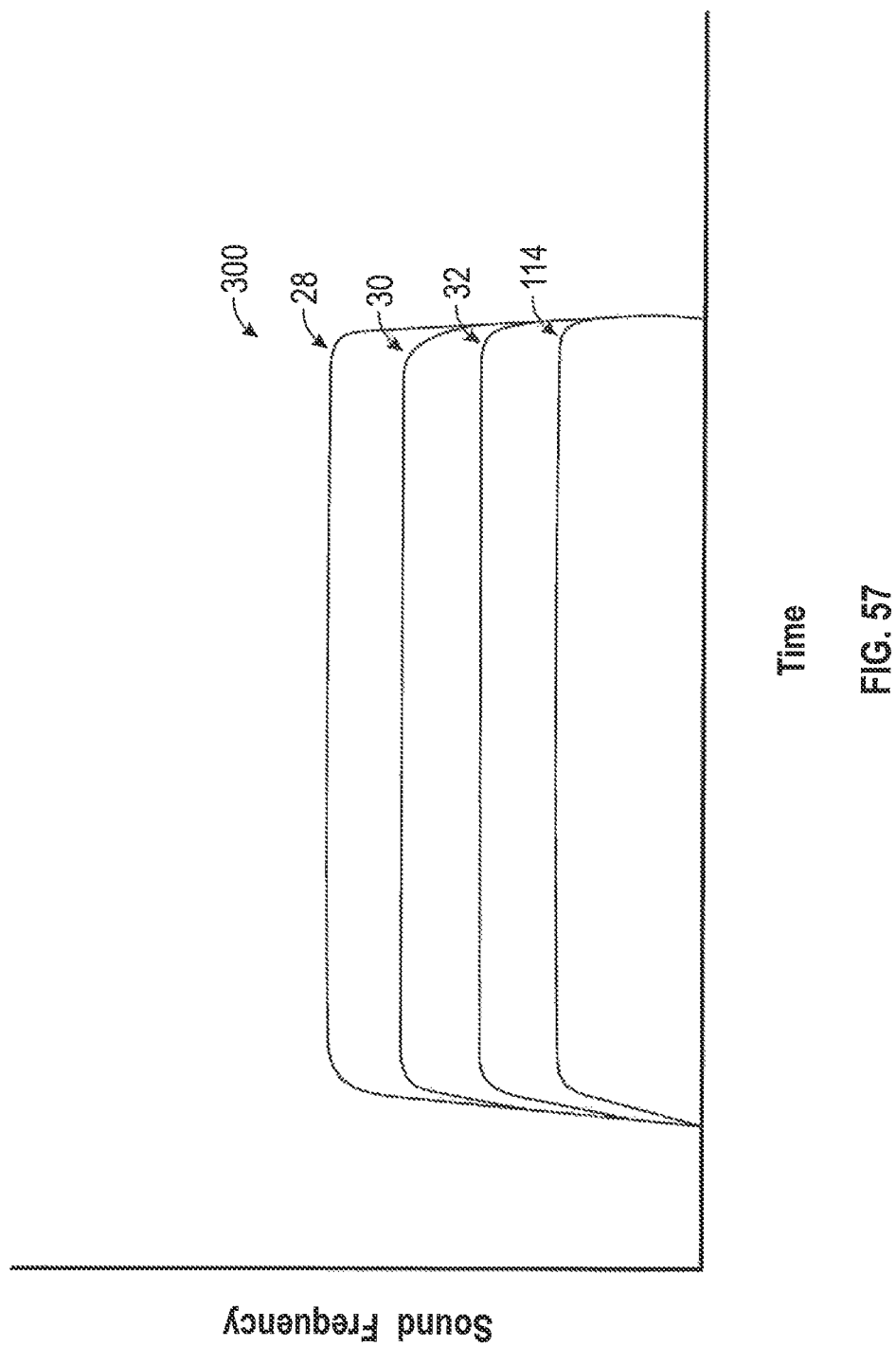
FIG. 57 is a line graph depicting the sound profile produced by the fluid dispenser shown in FIG. 54.

FIG. 57 shows a sound profile 300 produced by the fluid dispenser 12 shown in FIGS. 54 to 56. The sound profile 300 shows the sounds 28, 30, 32, 114 produced during the instroke movement when the pump assembly 36 shown in FIG. 26 is coupled to the housing 18. The sound profile 300 includes the first sound 28 produced by the air whistle 500 incorporated into the housing 18, as well as the second, third, and fourth sounds 30, 32, 114 produced by the three air whistles 55, 172, 174 incorporated into the pump assembly 36. Each of the sounds 28, 30, 32, 114 has a different sound frequency, resulting in a unique sound profile 300 that can be detected and analyzed by the sound sensing mechanism 14 and the computer 16 for compliance monitoring, as in the previous embodiments.

Incorporating one or more air whistles 500 into the housing 18 allows for even further information about the operation of the dispenser 12 to be collected. For example, there may be multiple dispensers 12 installed in any given area of a facility. By installing air whistles 500 producing sounds 28 at different frequencies in the housings 18 of each of these dispensers 12, it is possible for the computer 16 to identify and track the activations of each individual dispenser 12. This is true even if the dispensers 12 each make use of an identical pump assembly 36.

Figure 58:
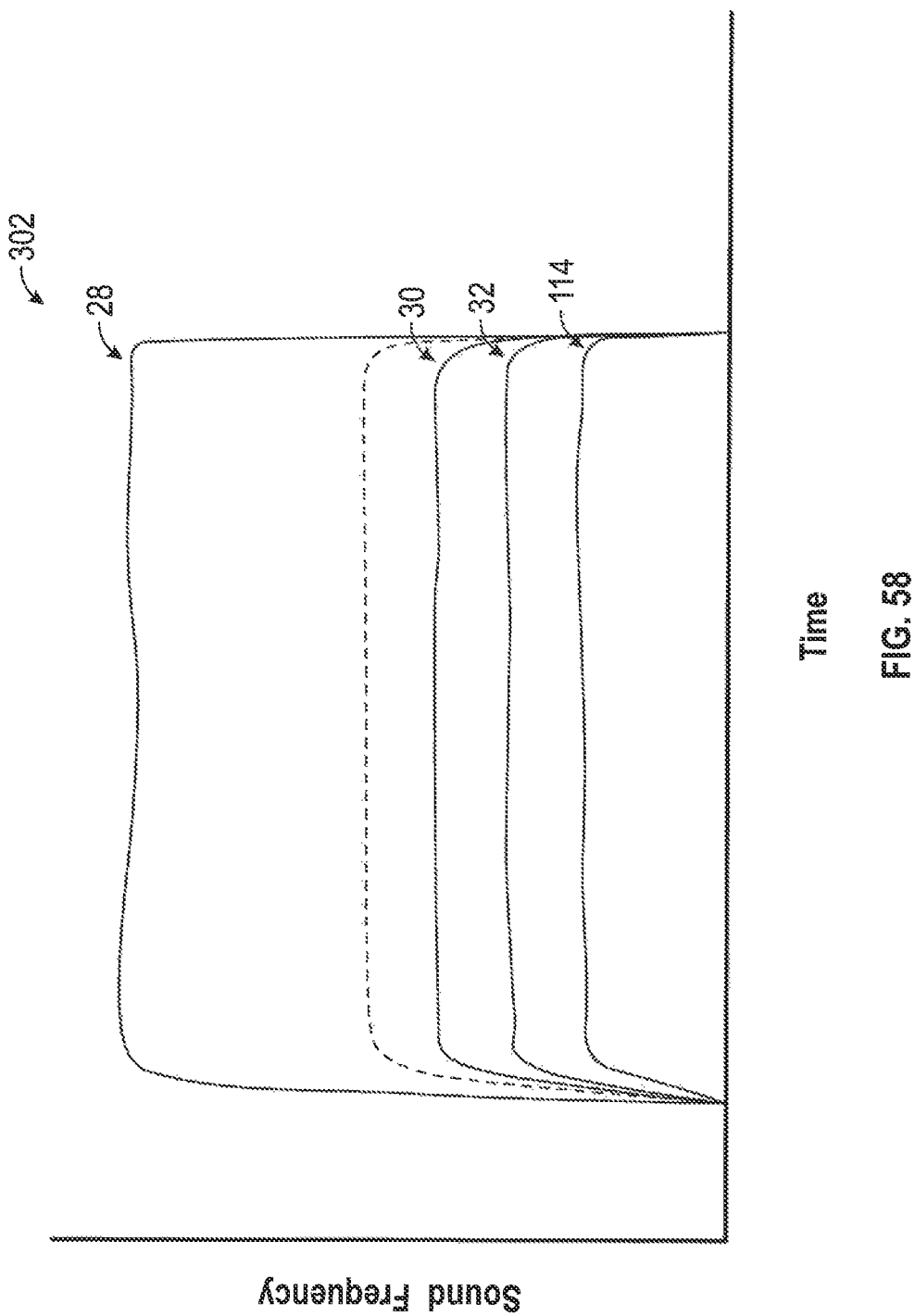
FIG. 58 is a line graph depicting the sound profile produced by a fluid dispenser similar to the one shown in FIG. 54, but with a different air whistle producing a different sound.

For example, FIG. 58 shows the sound profile 302 produced by a dispenser 12 identical to the one shown in FIGS. 54 to 56, but incorporating an air whistle 500 that produces the first sound 28 at a higher frequency. Although an identical pump assembly 36 is used, producing identical second, third, and fourth sounds 30, 32, 114, the differences in the first sound 28 result in a unique sound profile 302 that can be used to distinguish activations of this dispenser 12 from the previous one.

Figure 59:
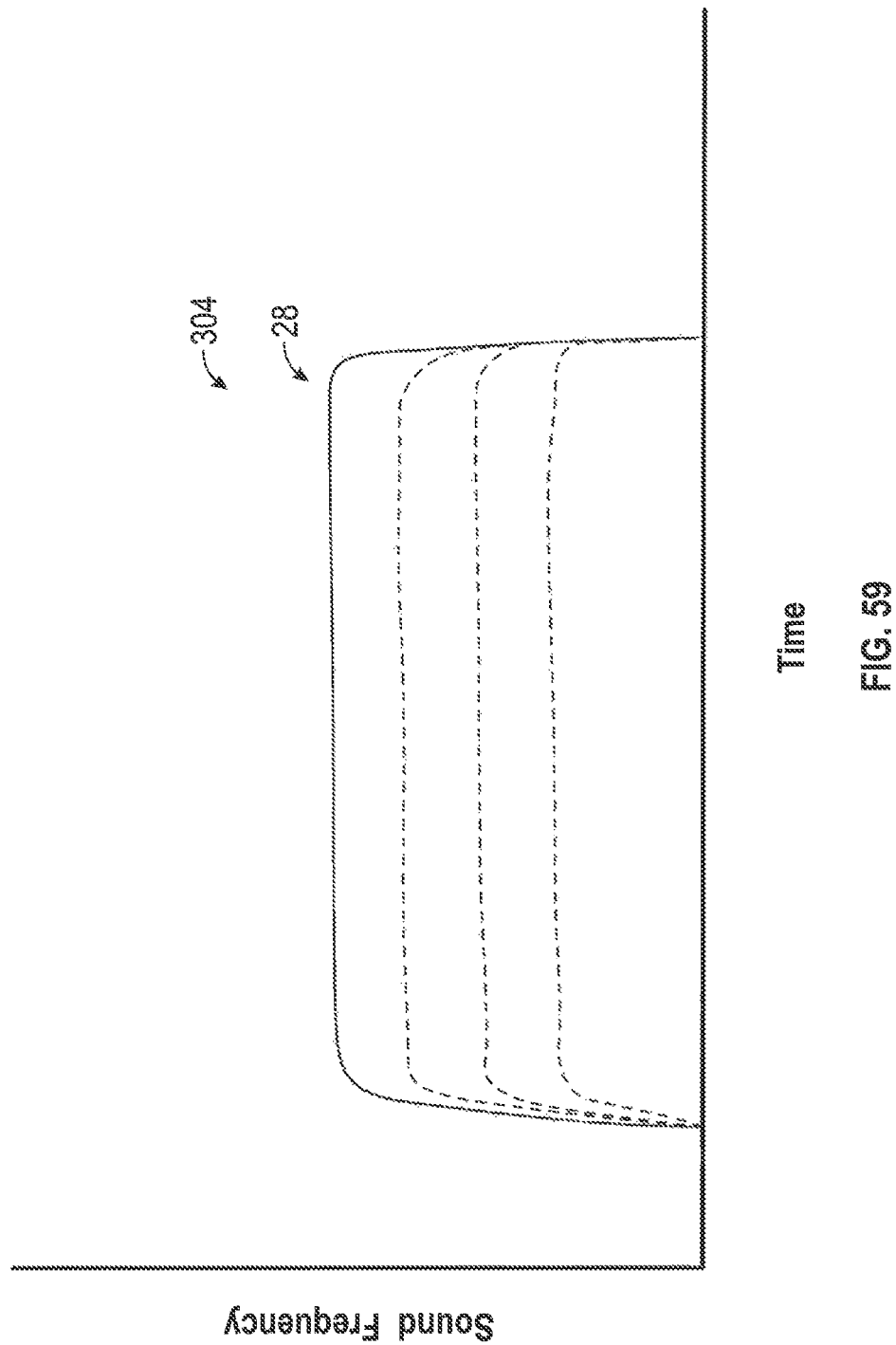
FIG. 59 is a line graph depicting the sound profile produced by the fluid dispenser shown in FIG. 54 when an unauthorized pump assembly is used.

By analyzing the sound profiles 300 produced by different activations, the computer 16 is able to determine both the identity of the housing 18 that has been activated, and the type of pump assembly 36 that is installed in that housing 18. This information can be tracked for compliance monitoring and other purposes, such as tracking the use patterns and inventory of pump assemblies 36 and reservoirs 34 within a facility. Furthermore, having a separate air whistle 500 installed in the housing 18 permits the use of unauthorized replacement pump assemblies 36 to be detected. For example, FIG. 59 shows the sound profile 304 that is produced when the dispenser 12 is activated with an unauthorized pump assembly 36, lacking the air whistles 55, 172, 174, installed. The sound profile 304 includes only the first sound 28 produced by the air whistle 500 installed in the housing 18, and can be detected and analyzed to determine both that the dispenser 12 has been activated and that an unauthorized pump assembly 36 is installed, or that the pump assembly 36 is missing or malfunctioning. In contrast, when the dispenser 12 shown in FIG. 1, lacking the air whistle 500 installed in the housing 18, is activated with an unauthorized pump assembly 36 installed, no sounds 28 are produced. The computer 16 is therefore unable to detect the activation of the dispenser 12, and is unable to determine that an unauthorized pump assembly 36 is installed.

Although many of the pump assembly 36 embodiments described herein including the embodiment of FIGS. 4 to 9 are configured to draw in air and fluid 26 during the outstroke movement and expel air and fluid 26 during the instroke, the invention is not so limited. Rather, the pump assembly 36 could alternatively be configured to draw in air during the outstroke and draw in fluid 26 during the instroke; to draw in air during the instroke and draw in fluid 26 during the outstroke; or to draw in air during the instroke and draw in fluid during the instroke. The air chamber 64 and/or the fluid chamber 60 can be made to expand during the instroke, and thus draw in air or fluid 26, by, for example, adopting the stepped construction described above and shown in U.S. Pat. No. 7,267,251 to Ophardt, which is incorporated by reference. In accordance with such alternatively configured arrangements of the embodiment of FIGS. 4 to 9 a first stroke during which the sounds 28, 30, 32 are produced by directing air through the whistle 54 can be either the instroke or the outstroke. Although many of the embodiments have been described as manually operable by pressing an actuator panel 24, the invention could also be used with motor driven dispensers 12 instead.

For ease of understanding, in the embodiments of the invention described above the sound profiles 98 produced by the pump assemblies 36 and dispensers 12 have been simplified. For example, in operation the speed at which the piston body 50 moves axially inwardly and upwards into the piston chamber forming body 48 is likely to vary over the span of the movement, rather than being perfectly uniform. This variability may cause fluctuations in the amplitude, frequency, or other characteristics of the emitted sounds 28, 30, 31, 114, which are not shown in the drawings. These fluctuations are especially likely to occur in the context of hand operated dispensers 12, but may also occur in motorized embodiments of the invention. Other variations in, for example, stroke length and acceleration are also likely to occur, and may affect the resulting sound profiles 98 in ways that have not been shown in the simplified drawings. Preferably, the computer 16 is configured to recognize an expected range of variability in the sound profiles 98 so as to accurately detect activations of the dispensers 12.

Unless otherwise stated, in the descriptions provided above it is assumed that the dispenser 12 is activated at a normal speed that is sufficient to cause the air whistles 54, 55, 172, 174 to emit their sounds 28, 30, 32, 114. It should be appreciated that, in some embodiments of the invention, if the dispenser 12 is activated very slowly there will not be sufficient air flow through the whistles 54, 55, 172, 174 to generate the sounds 28, 30, 32, 114. Preferably, the dispenser 12 is configured to emit the sounds 28, 30, 32, 114 whenever activated within an expected range of normal activation speeds.

In addition to the compliance monitoring systems 10, dispensers 12, and other products and components described above, the invention also includes methods of using and operating those systems 10, dispensers 12, and other products and components. The invention includes, for example, a method of monitoring the activation of a fluid dispenser 12 as described herein, including detecting the sounds 28, 30, 32 produced by the fluid dispenser 12 when activated and generating data representative of a sound profile 98 of the detected sounds 28, 30, 32. The invention includes all methods of using and operating the described systems 10, dispensers 12, and other products and components as would be apparent to a person skilled in the art in view of the above description, regardless of whether those methods have been explicitly identified or are implied by the described structures and functions.

It is to be appreciated that the term "fluid" as used herein is intended to refer broadly to any flowable substance, including liquids, gels, creams, foams, emulsions, suspensions, and the like. Although the preferred embodiments have described the fluid as being a hand cleaning fluid 26, it is to be appreciated that the invention could also be used with dispensers for other types of products, such as beverages or condiments. The invention could also be used with dispensers that dispense non-liquid products.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A fluid dispenser comprising:
   a fluid pump for drawing fluid from a reservoir and dispensing the fluid on movement of an actuator in a cycle of operation;
   the actuator reciprocally movable in the cycle of operation between a first position and a second position with movement from the first position to the second position comprising a first stroke and movement from the second position to the first position comprising a second stroke,
   a sound generator mechanism which generates two sounds on movement of the actuator in the cycle of operation in the first stroke, the sound generator mechanism being configured to produce each sound from a respective one of two streams of air passing through the sound generator mechanism; and
   an air pump mechanism that delivers both of the two streams of air through the sound generator mechanism on movement of the actuator in the cycle of operation in the first stroke;
   wherein the sound generator mechanism produces the two sounds as the actuator is moved in the first stroke, with each sound produced in a different non-overlapping time period during the first stroke than the time period of the other sound, the time period of each sound in the first stroke being a function of the relative location of the actuator between the first position and the second position.

2. The fluid dispenser according to claim 1, wherein the air pump mechanism delivers one of the streams of air through the sound generator mechanism as a first air stream during a first time period in the first stroke when the actuator moves between the first position and a first intermediate position between the first position and the second position; and
   wherein the air pump mechanism delivers one of the streams of air through the sound generator mechanism as a second air stream during a second time period in the first stroke different than the first time period when the actuator moves between the first intermediate position and a second intermediate position between the first intermediate position and the second position.

3. The fluid dispenser according to claim 2, wherein the air pump mechanism comprises:
   an air chamber forming body in fluid communication with the sound generator mechanism;
   an air passage for carrying air into or out of the air chamber forming body; and
   a sealing body configured to seal the air passage during the first time period and during the second time period, and to unseal the air passage during a first intermediate time period between the first time period and the second time period.

4. The fluid dispenser as claimed in claim 3, wherein the actuator is configured to reduce a volume of air contained within the air chamber forming body during movement in the first stroke from the first position to the second position, forcing at least some of the air to discharge from the air chamber forming body;
   wherein:
   during the first time period the air is discharged through the sound generator mechanism as the first air stream;
   during the first intermediate time period at least some of the air is discharged through the unsealed air passage, thereby reducing or eliminating air flow through the sound generator mechanism; and
   during the second time period the air is discharged through the sound generator mechanism as the second air stream.

5. The fluid dispenser as claimed in claim 4, wherein the sound generator mechanism produces a first sound during the first time period, produces little or no sound during the first intermediate time period, and produces a second sound during the second time period.

6. The fluid dispenser as claimed in claim 5, wherein the actuator comprises a piston body; and
   wherein movement of the actuator in the first stroke from the first position to the second position comprises an instroke movement of the piston body within the air chamber forming body, thereby pressurizing the air contained within the air chamber forming body and forcing at least some of the air to discharge from the air chamber forming body.

7. The fluid dispenser as claimed in claim 6, wherein the air passage is defined between the piston body and the air chamber forming body;
   wherein the air chamber forming body comprises a sealing zone and an unsealing zone;
   wherein the piston body is configured to sealingly engage with the air chamber forming body when positioned within the sealing zone, thereby sealing the air passage; and
   wherein the piston body is configured to at least partially disengage from the air chamber forming body when positioned within the unsealing zone, thereby unsealing the air passage.

8. The fluid dispenser as claimed in claim 7, wherein the air chamber forming body comprises a cylindrical outer wall, the outer wall having a first diameter in the sealing zone and a second diameter in the unsealing zone, the second diameter being larger than the first diameter;
  wherein the piston body comprises an outer edge that is configured to sealingly engage with the air chamber forming body when positioned within the sealing zone, and to at least partially disengage from the air chamber forming body when positioned within the unsealing zone.

9. The fluid dispenser as claimed in claim 8, wherein the sealing zone comprises a first sealing area and a second sealing area, and wherein the unsealing zone comprises a first unsealing area;
  wherein the instroke movement of the piston body comprises:
  a first segment of movement in which the outer edge of the piston body moves along and sealingly engages with the first sealing area of the air chamber forming body, thereby compressing the air contained within the air chamber forming body and forcing the first air stream through the sound generator mechanism;
  a second segment of movement in which the outer edge of the piston body moves past the first unsealing area of the air chamber forming body, thereby unsealing the air passage and allowing the air contained within the air chamber forming body to discharge through the air passage, reducing or eliminating the air flow through the sound generator mechanism; and
  a third segment of movement in which the outer edge of the piston body moves along and sealingly engages with the second sealing area of the air chamber forming body, thereby compressing the air contained within the air chamber forming body and forcing the second air stream through the sound generator mechanism.

10. The fluid dispenser as claimed in claim 9, wherein the sealing zone further comprises a third sealing area, and wherein the unsealing zone further comprises a second unsealing area;
  wherein the instroke movement of the piston body further comprises:
  a fourth segment of movement in which the outer edge of the piston body moves past the second unsealing area of the air chamber forming body, thereby unsealing the air passage and allowing the air contained within the air chamber forming body to discharge through the air passage, reducing or eliminating the air flow through the sound generator mechanism; and
  a fifth segment of movement in which the outer edge of the piston body moves along and sealingly engages with the third sealing area of the air chamber forming body, thereby compressing the air contained within the air chamber forming body and forcing a third air stream through the sound generator, causing the sound generator mechanism to produce a third sound.

11. The fluid dispenser as claimed in claim 3, wherein the actuator comprises a piston body;
  wherein movement of the actuator from the first position to the second position comprises an outstroke movement of the piston body within the air chamber forming body, which produces a vacuum within the air chamber forming body, thereby causing atmospheric air to be drawn into the air chamber forming body;
  wherein the sound generator mechanism produces a first sound during the first time period, produces little or no sound during the first intermediate time period, and produces a second sound during the second time period;

wherein:
  during the first time period the atmospheric air is drawn into the air chamber forming body through the sound generator mechanism as the first air stream;
  during the first intermediate time period the atmospheric air is drawn into the air chamber forming body through the unsealed air passage, thereby reducing or eliminating air flow through the sound generator mechanism; and
  during the second time period the atmospheric air is drawn into the air chamber forming body through the sound generator mechanism as the second air stream;
  wherein the air passage is defined between the piston body and the air chamber forming body;
  wherein the air chamber forming body comprises a sealing zone and an unsealing zone;
  wherein the piston body is configured to sealingly engage with the air chamber forming body when positioned within the sealing zone, thereby sealing the air passage;
  wherein the piston body is configured to at least partially disengage from the air chamber forming body when positioned within the unsealing zone, thereby unsealing the air passage;
  wherein the air chamber forming body comprises a cylindrical outer wall, the outer wall having a first diameter in the sealing zone and a second diameter in the unsealing zone, the second diameter being larger than the first diameter;
  wherein the piston body comprises an outer edge that is configured to sealingly engage with the air chamber forming body when positioned within the sealing zone, and to at least partially disengage from the air chamber forming body when positioned within the unsealing zone;
  wherein the sealing zone comprises a first sealing area and a second sealing area, and wherein the unsealing zone comprises a first unsealing area;
  wherein the outstroke movement of the piston body comprises:
  a first segment of movement in which the outer edge of the piston body moves along and sealingly engages with the first sealing area of the air chamber forming body, thereby producing a vacuum within the air chamber forming body and drawing the first stream of air through the sound generator mechanism into the air chamber forming body;
  a second segment of movement in which the outer edge of the piston body moves past the first unsealing area of the air chamber forming body, thereby unsealing the air passage and allowing the atmospheric air to be drawn into the air chamber forming body through the air passage, reducing or eliminating the air flow through the sound generator mechanism; and
  a third segment of movement in which the outer edge of the piston body moves along and sealingly engages with the second sealing area of the air chamber forming body, thereby producing a vacuum within the air chamber forming body and drawing the second stream of air through the sound generator mechanism into the air chamber forming body.

12. The fluid dispenser according to claim 1, further comprising:
  a fluid chamber containing the fluid to be dispensed; and
  a fluid outlet in fluid communication with the fluid chamber, for dispensing the fluid from the fluid chamber;

wherein movement of the actuator from the first position to the second position pressurizes the fluid contained within the fluid chamber, forcing the dose of the fluid to be expelled from the fluid outlet.

13. The fluid dispenser according to claim 1, wherein the sound generator mechanism comprises an air whistle.

14. The fluid dispenser according to claim 1, wherein the fluid dispenser is a manually operated dispenser in which the actuator is moved by a user to dispense the fluid.

15. The fluid dispenser according to claim 1, wherein the fluid is a hand cleaning fluid.

16. A system for monitoring activation of a fluid dispenser, comprising:
the fluid dispenser as claimed in claim 1; and
a sound sensing mechanism spaced from the fluid dispenser, comprising:
a sound sensor to sense the two sounds produced by the sound generator mechanism; and
a communication mechanism to transmit data representative of the sounds sensed by the sound sensor to a remote computer.

17. The system as claimed in claim 16, wherein the computer is configured to calculate a volume of the fluid dispensed from the fluid dispenser based on a sound profile of the two sounds.

18. The system as claimed in claim 16, wherein the computer is configured to identify the fluid dispenser based on a sound profile of the two sounds.

19. The system as claimed in claim 16, wherein the computer is configured to distinguish the two sounds from other sounds based on a sound profile of the two sounds.

20. The system as claimed in claim 16, wherein the computer is configured to calculate at least one of:
a movement speed of the actuator based on a sound profile of the two sounds; and
a movement distance of the actuator based on the sound profile of the two sounds.

* * * * *